(12) United States Patent
Chae

(10) Patent No.: US 8,410,621 B2
(45) Date of Patent: Apr. 2, 2013

(54) HEAT ENGINE

(76) Inventor: Soo-Joh Chae, Seoul (KR)

(*) Notice: Subject to any disclaimer, the term of this patent is extended or adjusted under 35 U.S.C. 154(b) by 0 days.

(21) Appl. No.: 13/117,524

(22) Filed: May 27, 2011

(65) Prior Publication Data

US 2011/0227347 A1    Sep. 22, 2011

Related U.S. Application Data

(63) Continuation of application No. PCT/KR2009/007032, filed on Nov. 27, 2009.

(30) Foreign Application Priority Data

| Nov. 27, 2008 | (KR) | 10-2008-0118884 |
| Nov. 27, 2008 | (KR) | 10-2008-0118888 |
| Mar. 31, 2009 | (KR) | 10-2009-0027279 |
| Apr. 17, 2009 | (KR) | 10-2009-0033494 |

(51) Int. Cl.
*H02K 7/18* (2006.01)
*F02B 63/04* (2006.01)

(52) U.S. Cl. ........................................ 290/1 A
(58) Field of Classification Search ............... 290/1 A, 290/1 R; 60/516–519, 682
See application file for complete search history.

(56) References Cited

U.S. PATENT DOCUMENTS 4,458,488 A * 7/1984 Negishi ................. 60/517
5,095,699 A   3/1992 Blackshear

FOREIGN PATENT DOCUMENTS

| JP | 57099249 | 6/1982 |
| JP | 3078554 | 4/1991 |
| JP | 2003075007 | 3/2003 |

OTHER PUBLICATIONS

International Search Report dated Jul. 2, 2010, received in corresponding PCT Application No. PCT/KR2009/007032.
Written Opinion dated Jul. 2, 2010, received in corresponding PCT Application No. PCT/KR2009/007032.

* cited by examiner

*Primary Examiner* — Javaid Nasri
(74) *Attorney, Agent, or Firm* — Grossman Tucker Perreault & Pfleger, PLLC

(57) ABSTRACT

Disclosed is a heat engine following an intermediate form between an ideal Carnot engine and a Stirling engine and having high thermal efficiency. The heat engine includes a cylinder in which operating gas is filled; a high temperature heater which heats a front end part of the cylinder and thermally expands the operating gas; a low temperature cooler which cools a rear end part of the cylinder and contracts the operating gas; and a piston which is accommodated inside the cylinder to rectilinearly reciprocate as the operating gas is thermally expanded and contracted, and includes a heat opening to make the operating gas directly contact the high temperature heater or the low temperature cooler.

23 Claims, 60 Drawing Sheets

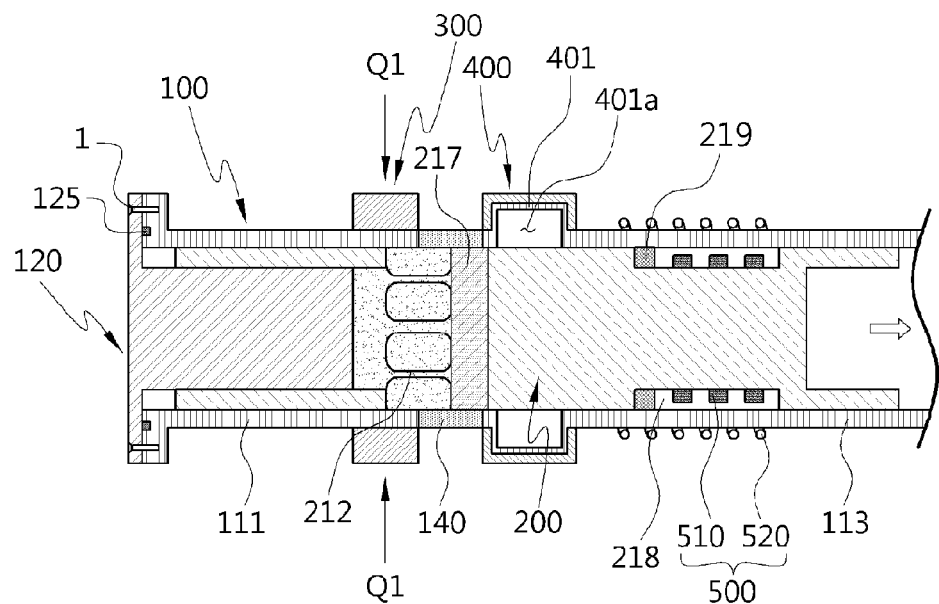
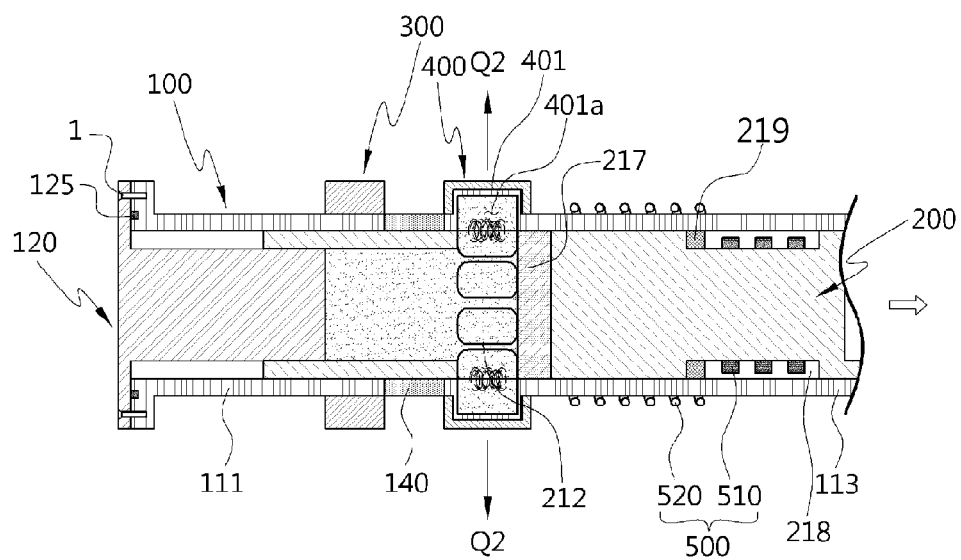

HEAT ENGINE

CROSS-REFERENCE TO RELATED APPLICATIONS

The present application is a continuation of PCT/KR09/07032 filed on Nov. 27, 2009, which is fully incorporated herein by reference.

TECHNICAL FIELD

The present invention relates to a heat engine, and more particularly, a heat engine having an intermediate form between an ideal Carnot engine and a Stirling engine.

BACKGROUND ART

As a kind of external-combustion engine, a Carnot engine is an ideal engine, and thus all actual engines cannot surpass the thermal efficiency of the Carnot engine. As compared with an internal-combustion engine, the external-combustion engine has a high thermal efficiency, low vibration and low noise, and is also an environment-friendly engine that emits fewer pollutants while fuel burns up. Further, only an external heat source and a medium (e.g., a heat sink) needed for cooling, i.e., only the media having temperature difference are enough to operate the external-combustion engine, and the external-combustion engine can be operated by all energy sources such as solar heat, etc.

Among the external-combustion engines, a commercial engine includes a Stirling engine and a turbine engine based on a Brayton cycle. The Stirling engine is a kind of external-combustion engine in which a space formed by a cylinder and a piston and filled with hydrogen, helium, or the like operating gas is sealed up, and the piston is moved up and down as the operating gas is heated and cooled through heat exchange by the exterior, thereby getting mechanical energy. The Stirling engine has high thermal efficiency similar to that of the Carnot engine.

However, the whole size and structure of the above Stirling engine are respectively so large and complicated that high manufacturing costs and a high level of technology are disadvantageously required. Further, the Stirling engine is disadvantageously applicable to only a restricted field due to its difficult maintenance.

Also, most engines change a rectilinear motion due to thermal expansion of gas inside the cylinder into a rotary motion using a crank, in which much power loss is caused by friction. Accordingly, a linear thermal engine for driving a leaner generator configured with a free piston is being developed, but is still in a developmental stage because it has low efficiency and many problems with controlling noise and vibration.

DISCLOSURE

[Technical Problem]

Therefore, the present invention is directed to solve the problems of the related art as described above, and an aspect of the present invention is to provide a heat engine that follows a thermodynamic cycle of an intermediate form between a Carnot engine as an ideal heat engine cycle and a Stirling engine as an external-combustion engine and has a high efficiency.

Another aspect of the present invention is to provide a heat engine that has a simple structure as opposed to a conventional complicated Stirling engine, thereby causing low manufacturing costs and easy maintenance.

The aspects of the present invention are not limited to the foregoing aspects, and other aspects not mentioned above will be clearly understood by those skilled in the art from the following description.

[Technical Solution]

According to an aspect of the present invention, there is provided a heat engine including a cylinder in which operating gas is filled; a high temperature heater which heats a front end part of the cylinder and thermally expands the operating gas; a low temperature cooler which cools a rear end part of the cylinder and contracts the operating gas; and a piston which is accommodated inside the cylinder to rectilinearly reciprocate as the operating gas is thermally expanded and contracted, and includes a heat opening to make the operating gas directly contact the high temperature heater or the low temperature cooler.

The heat engine may further include a generator to transform mechanical energy based on a rectilinear reciprocating motion of the piston into electric energy.

The generator may include a magnet installed on an outer circumference of the piston along a lengthwise direction; and a coil wound on an outer circumference of the cylinder along a lengthwise direction, and generating an induced electromotive force as the magnet rectilinearly reciprocates.

The heat engine may further include a converter to change a rectilinear reciprocating motion of the piston into a rotary motion, and provide the rotary motive force to an outside.

The cylinder may include a cylinder insulating unit placed between the high temperature heater and the low temperature cooler.

The cylinder may include the front end part opened outward, and the heat engine may further include a cylinder head unit coupled to and hermetically closing up the front end part of the cylinder.

The piston may include a hollow in a front end part thereof, and the cylinder head unit may include a head cover coupled to the front end part of the cylinder; and a head protrusion protruding from the head cover and formed with a guide groove spaced apart at a predetermined distance from an inner surface of the cylinder and receiving the front end part of the piston therein.

The high temperature heater may include a combustion chamber arranged in the form of a ring on the outer circumference of the front end part of the cylinder; and a fuel supplying unit supplying fuel to the combustion chamber.

The high temperature heater may include a housing arranged in the form of a ring on the outer circumference of the front end part of the cylinder; a hot-wire member wound on the outer circumference of the front end part of the cylinder and placed inside the housing; and a power unit supplying electricity to the hot-wire member.

The high temperature heater may include a sunlight concentrating module for concentrating the light of the sun; and a light transmission window formed in the front end part of the cylinder so that the operating gas can be directly exposed to the light of the sun concentrated by the sunlight concentrating module.

The low temperature cooler may include a cooling fin formed on the outer circumference of the rear end part of the cylinder; and a cooling fan for blowing air to and cooling the cooling fin.

The low temperature cooler may include a cooling tube wound on the outer circumference of the rear end part of the cylinder; and a cooling pump supplying cooling water to the cooling tube.

The heat opening may be formed in plural along the outer circumference in front of the rear end part of the piston.

The front end part of the piston may include an insulating material.

The heat engine may further include a restoration unit to provide a restoration force to the piston so that a rectilinear reciprocating motion of the piston can be continuously maintained.

The low temperature cooler may include a cooling chamber placed in the rear end part of the cylinder and formed with a cooling space communicating with an inside of the cylinder to cool the operating gas.

The cooling space may be formed to have the same length as the heat opening.

The cooling chamber may be formed integrally with the cylinder by extending a part of the outer circumference of the rear end part of the cylinder in a radius direction.

The cooling chamber may be installed in the form of a ring on the outer circumference of the rear end part of the cylinder, and at least one chamber communicating hole is formed in the rear end part of the cylinder and communicates the cooling space inside the cooling chamber with the inside of the cylinder.

The low temperature cooler may further include at least one sealing member installed in a contact part between the cylinder and the cooling chamber.

The low temperature cooler may include a housing formed to surround an outside of the cooling chamber and formed with a plurality of cooling fins; and a cooling fan blowing air to and cooling the housing.

The low temperature cooler may include a tube housing formed to surround an outside of the cooling chamber; a cooling tube placed inside the tub housing and wound on an outer wall of the cooling chamber; and a cooling pump supplying cooling water to the cooling tube.

The heat engine may further include a restoration unit to provide a restoration force to the piston so that a rectilinear reciprocating motion of the piston can be continuously maintained.

According to another aspect of the present invention, there is provided a heat engine including a cylinder which is filled with operating gas inside opposite end parts thereof; a pair of high temperature heaters which heat opposite front end parts of the cylinder and thermally expand the operating gas; a pair of low temperature coolers which cool opposite rear end parts of the cylinder and contract the operating gas; and a piston which includes opposite ends contacting the operating gas, is accommodated inside the cylinder to rectilinearly reciprocate as the operating gas is thermally expanded and contracted, and includes heat openings at opposite ends to make the operating gas directly contact the high temperature heater or the low temperature cooler.

The heat engine may further include a generator to transform mechanical energy based on a rectilinear reciprocating motion of the piston into electric energy.

The generator may include a magnet installed in the piston; and a coil generating an induced electromotive force together with the magnet as the piston rectilinearly reciprocates with respect to the cylinder.

The cylinder may include a pair of cylinder insulating units to insulate heat between each high temperature heater and each low temperature cooler.

Each cylinder insulating unit may be formed to have the same length as the heat opening.

The high temperature heater, the low temperature cooler, the cylinder insulating unit and the heat opening may be formed to have the same length with one another.

The cylinder may include the opposite front end parts opened outward, and the heat engine further includes a pair of cylinder head units coupled to and hermetically closing up the opposite front end parts of the cylinder, respectively.

The piston may include a hollow in each of the opposite front end parts thereof, and each cylinder head unit may include a head cover coupled to each front end part of the cylinder; and a head protrusion protruding from each head cover and formed with a guide groove spaced apart at a predetermined distance from an inner surface of the cylinder and receiving each front end part of the piston therein.

The high temperature heater may provide combustion, a molten-salt heat storage material, or the light of the sun as a heat source.

The pair of high temperature heaters may include a first high temperature heater which heats and thermally expands first operating gas filled in one end part of the cylinder; and a second high temperature heater which heats and thermally expands second operating gas filled in the other end part of the cylinder.

The pair of low temperature coolers may include a first low temperature cooler which is spaced apart at a predetermined distance from the first high temperature heater, and cools and contracts the first operating gas thermally expanded by the first high temperature heater; and a second low temperature cooler which is spaced apart at a predetermined distance from the second high temperature heater, and cools and contracts the second operating gas thermally expanded by the second high temperature heater.

The piston may include a first piston accommodated in one inner side of the cylinder so as to be in contact with the first operating gas and rectilinearly reciprocate as the first operating gas is thermally expanded and contracted; and a second piston coupled to the first piston and accommodated in the other inner side of the cylinder so as to be in contact with the second operating gas and rectilinearly reciprocate as the second operating gas is thermally expanded and contracted.

The first piston may include a first heat opening to make the first operating gas directly contact the first high temperature heater or the first low temperature cooler in accordance with a thermodynamic cycle.

The first heat opening may be formed in plural along the outer circumference in front of the rear end part of the first piston.

The heat engine may further include a first piston insulating unit arranged in a rear portion of the first heat opening of the first piston.

The second piston may include a second heat opening to make the second operating gas directly contact the second high temperature heater or the second low temperature cooler in accordance with a thermodynamic cycle.

The second heat opening may be formed in plural along the outer circumference in front of the rear end part of the second piston.

The heat engine may further include a second piston insulating unit arranged in a rear portion of the second heat opening of the second piston.

The first operating gas may become a maximum compressed state and the second operating gas may become a maximum expanded state if the piston moves following the thermodynamic cycle so that the first heat opening contacts the first high temperature heater and the second heat opening contacts the second low temperature cooler, and the first operating gas may become a maximum expanded state and the second operating gas may become a maximum compressed state if the piston moves following the thermodynamic cycle so that the first heat opening contacts the first low temperature cooler and the second heat opening contacts the second high temperature heater.

The heat engine may further include at least one piston ring installed on an outer circumference of the piston so that the cylinder and the piston can be sealed up.

Each low temperature cooler may include a cooling chamber placed in each rear end part of the cylinder and formed with a cooling space communicating with an inside of the cylinder to cool the operating gas.

Each cooling space may be formed to have the same length as each heat opening.

Each cooling chamber may be formed integrally with the cylinder by extending a part of the outer circumference of each rear end part of the cylinder in a radius direction.

Each cooling chamber may be installed in the form of a ring on the outer circumference of each rear end part of the cylinder, and at least one chamber communicating hole may be formed in each rear end part of the cylinder and communicates the cooling space inside each cooling chamber with the inside of the cylinder.

Each low temperature cooler may further include at least one sealing member installed in a contact part between the cylinder and each cooling chamber.

Each low temperature cooler may include a housing formed to surround an outside of each cooling chamber and formed with a plurality of cooling fins; and a cooling fan blowing air to and cooling each housing.

Each low temperature cooler may include a tube housing formed to surround an outside of each cooling chamber; a cooling tube placed inside each tub housing and wound on an outer wall of each cooling chamber; and a cooling pump supplying cooling water to each cooling tube.

The heat engine may further include a restoration unit to provide a restoration force to the piston so that a rectilinear reciprocating motion of the piston can be continuously maintained.

Specific maters of other exemplary embodiments are contained in detailed description and drawings.

[Advantageous Effects]

According to the foregoing heat engine according to the exemplary embodiments of the present invention, there are one or more effects as follows.

High thermal efficiency can be expected like the conventional Stirling engine on the basis of a new thermodynamic cycle formed by heating and cooling due to direct contact with an external high temperature heater and low temperature cooler, more particularly, an intermediate form a heat engine thermodynamic cycle of an intermediate form between a Carnot engine and a Stirling engine.

Also, without any complicated valve, only a high temperature heater for supplying an external heat source and a low temperature cooler capable of cooling it are enough to get necessary power. That is, a thermodynamic cycle is completed as operating gas alternately meets high temperature and low temperature through the heat opening of the piston by a reciprocating motion of the piston, so that it can be achieved by a very simpler structure as opposed to a conventional Stirling engine where the operating gas has to move between a high temperature part and a low temperature part.

Further, high pressure gas is available with an airtight structure where a free piston can vibrate within a hermetically closed-up cylinder, so that high output density can be obtained per volume.

Since the present heat engine is an external-combustion engine using an external heat source, lubricating oil can be almost permanently used on the contrary to an internal-combustion engine where the lubricating oil inside the cylinder is changed in quality. In addition, a lubricating region is located inside the low temperature part, and it is thus possible to use various lubricating oil.

There is only rectilinear motion due to thermal expansion and contraction of gas, and therefore it is possible to largely reduce friction between the cylinder and the piston as compared with a rotary-type engine.

It is possible to adjust vibrating width and period by changing the weight of the piston, an elastic coefficient of a spring, a gas pressure, the temperature of high/low temperature parts, etc.

Gas filled in a spring part under the piston is compressed and expanded as the piston reciprocates, so that it can serve as a gas spring by itself, thereby making a more elastic vibrating motion possible.

The high temperature operating gas heated by the high temperature heater and thermally expanded in the cylinder meets the low temperature operating gas cooled by the cooling chamber provided in the low temperature cooler, and a turbulent flow can be actively generated by difference in temperature and pressure, so that the operating gas is rapidly decreased in pressure and contracted while being cooled, thereby more actively making the piston rectilinearly reciprocate. As the rectilinear motion of the piston becomes more active in the cylinder, the thermal efficiency of the heat engine is improved.

Because the generator is placed in the center or the free piston, i.e., a low temperature region, the magnet (permanent magnet) provided in the piston is free from being thermally deformed.

With regard to even a relatively low heat source, electricity can be generated using difference in temperature. Thus, various heat sources can be used for generating electricity.

The present heat engine has higher efficiency, lower vibration and noise and fewer pollutants in discharged gas than the internal-combustion engine, so that it can be applied as the most ideal generator for charging a storage battery of an electric car.

With a symmetrical structure, the piston can continuously reciprocate in the cylinder.

As above, the present heat engine has higher efficiency, lower vibration and noise and fewer pollutants in discharged gas than the internal-combustion engine, so that it can be applied as the most ideal generator for charging a storage battery of an electric car.

The effects of the present invention are not limited to the above mentioned effects, and other effects not mentioned above may be clearly understood through claims by those skilled in the art.

DESCRIPTION OF DRAWINGS

FIGS. 43 to 46 are views for sequentially explaining operations of the heat engine according to still another exemplary embodiment of the present invention.

BEST MODE

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims. Throughout this specification, like numerals refer to like elements.

Hereinafter, a heat engine according to exemplary embodiments of the present invention will be described with reference to accompanying drawings. For reference, if it is determined that specific description about a well-known function or configuration related to explanation of the present invention may unnecessarily make the idea of the present invention vague, detailed descriptions thereof will be omitted.

Figure 1:
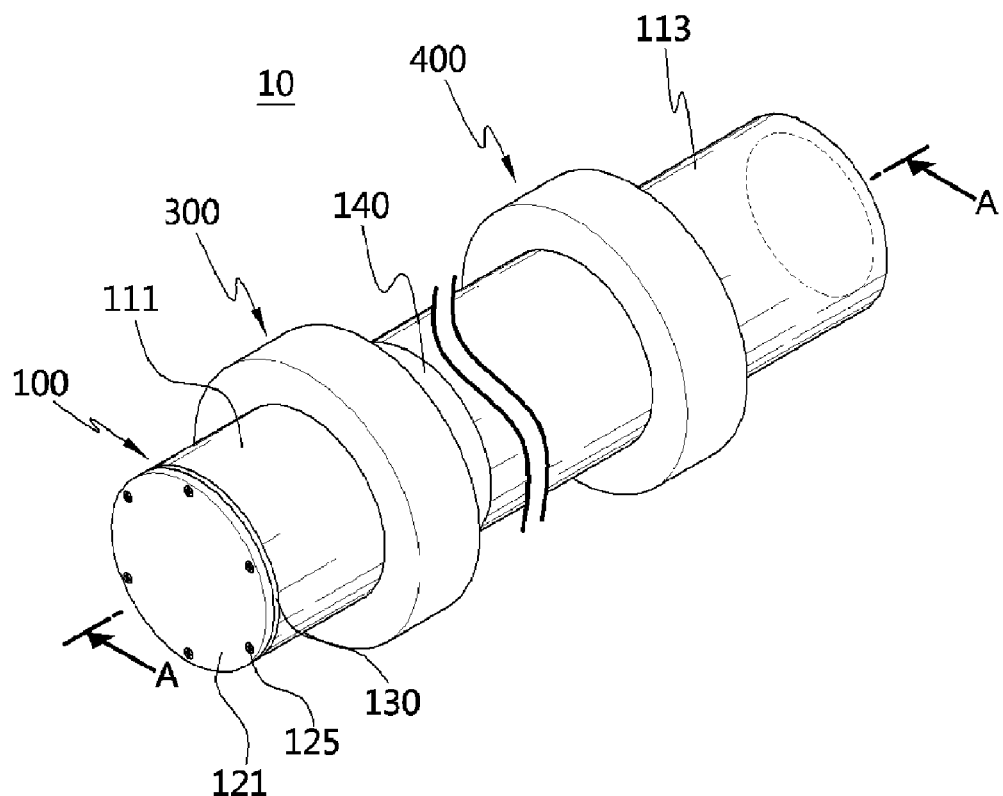
FIG. 1 is a perspective view schematically showing a heat engine according to an exemplary embodiment of the present invention.
Figure 2:
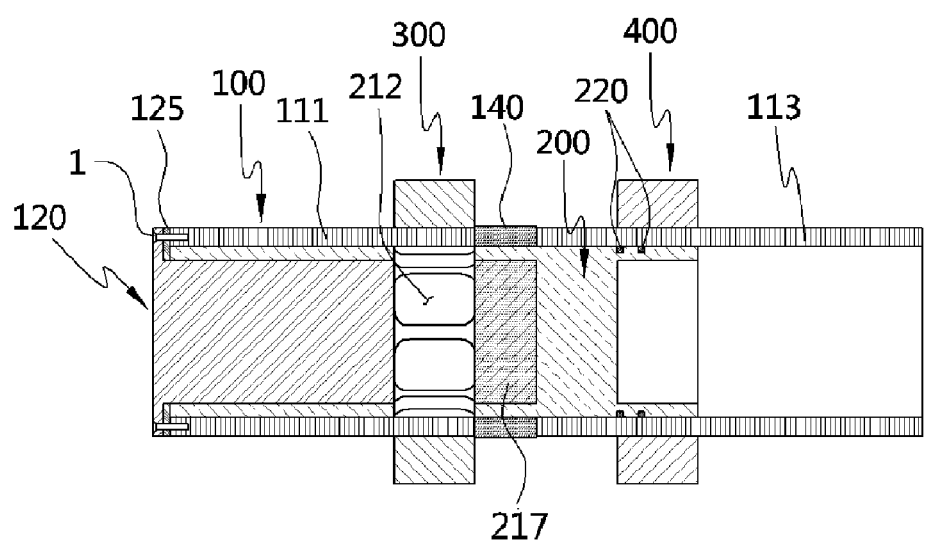
FIG. 2 is a cross-section view taken along line A-A of FIG. 1.
Figure 3:
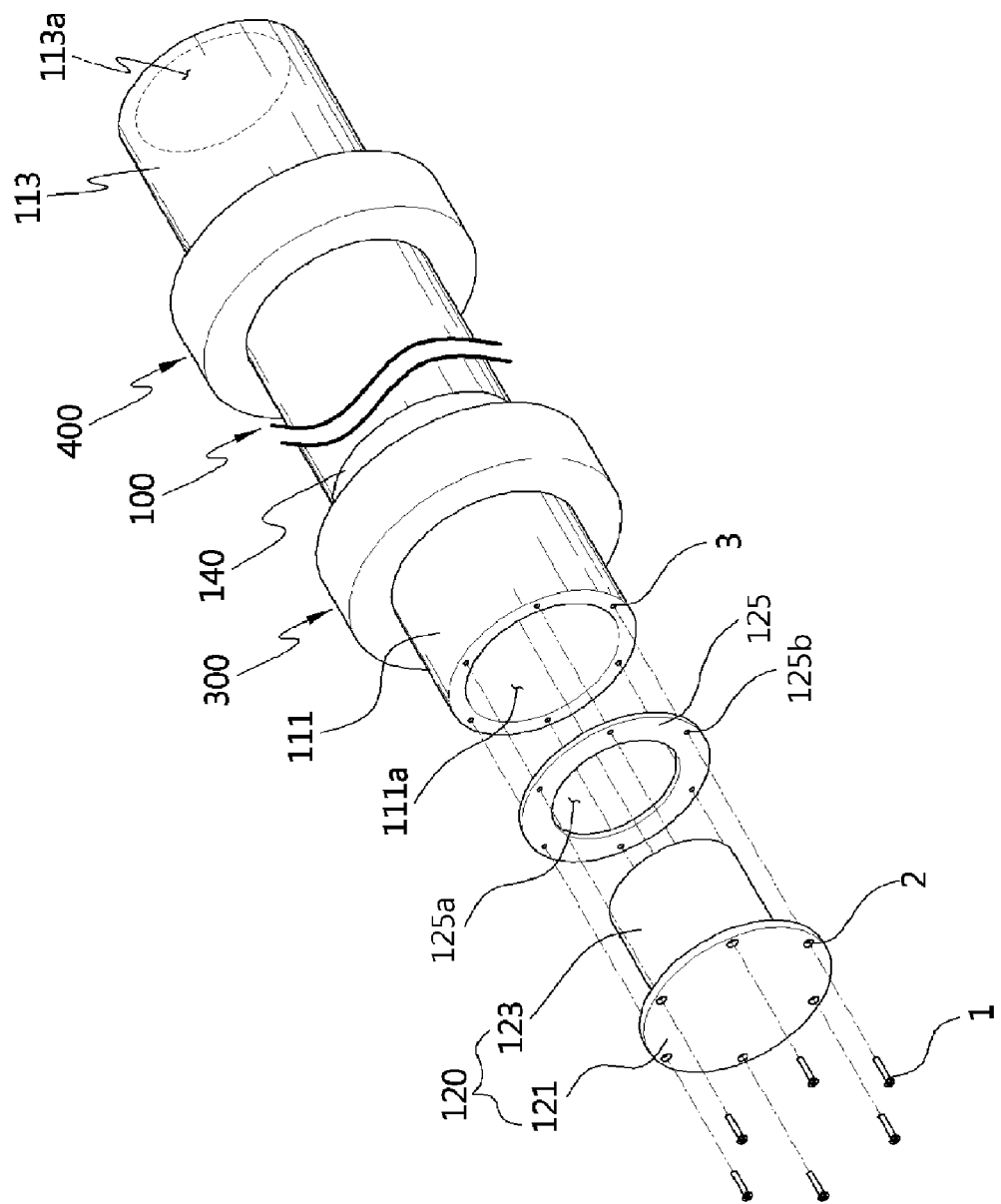
FIG. 3 is a perspective view of a cylinder in the heat engine according to an exemplary embodiment of the present invention.
Figure 4:
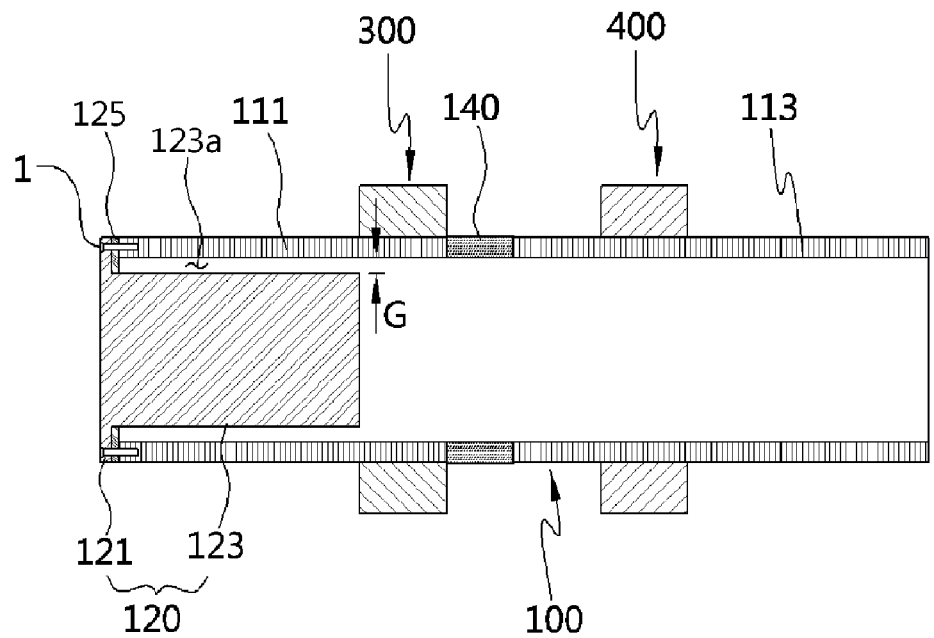
FIG. 4 is a cross-section view of the cylinder in the heat engine according to an exemplary embodiment of the present invention.
Figure 5:
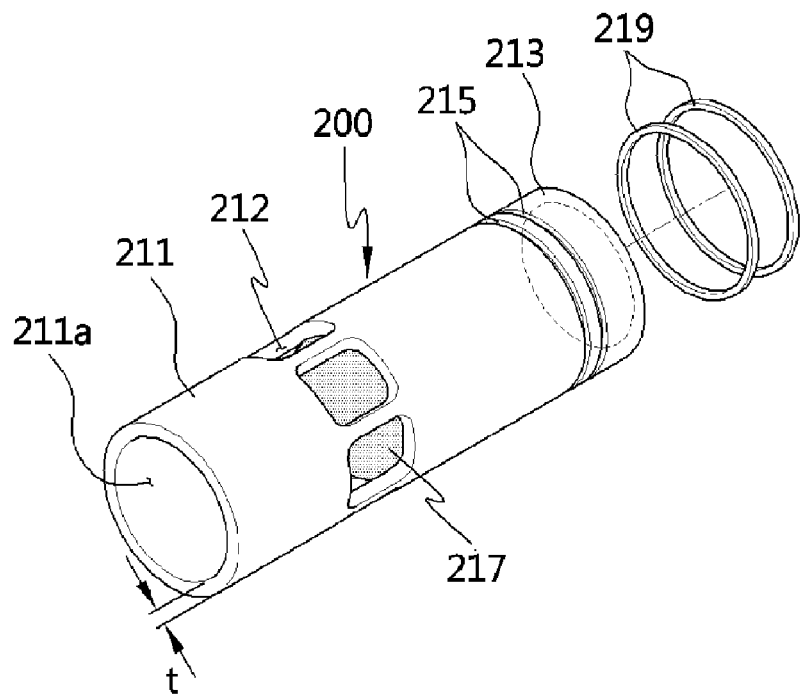
FIG. 5 is a perspective view of a piston in the heat engine according to an exemplary embodiment of the present invention.
Figure 6:
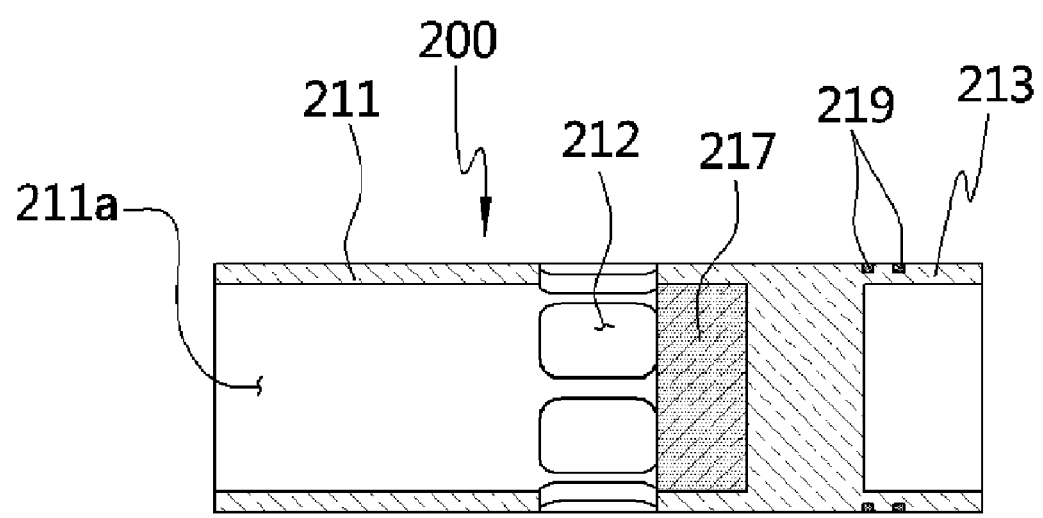
FIG. 6 is a cross-section view of the piston in the heat engine according to an exemplary embodiment of the present invention.

FIG. 1 is a perspective view schematically showing a heat engine according to an exemplary embodiment of the present invention, FIG. 2 is a cross-section view taken along line A-A of FIG. 1, FIG. 3 is a perspective view of a cylinder in the heat engine according to an exemplary embodiment of the present invention, FIG. 4 is a cross-section view of the cylinder in the heat engine according to an exemplary embodiment of the present invention, FIG. 5 is a perspective view of a piston in the heat engine according to an exemplary embodiment of the present invention, and FIG. 6 is a cross-section view of the piston in the heat engine according to an exemplary embodiment of the present invention.

As shown in FIGS. 1 to 6, a heat engine 10 according to an exemplary embodiment of the present invention includes a cylinder 100, a piston 200, a high temperature heater 300, a low temperature cooler 400, etc.

The cylinder 100 has a cylindrical shape, and is internally filled with hydrogen, helium, or the like operating gas. Also, the operating gas is mixed with carbon black having a form of particles to improve capacity to absorb thermal energy transferred from the high temperature heater 300 to be described later, thereby enhancing a heat transfer effect of the operating gas.

According to an exemplary embodiment, the cylinder 100 may be formed with a front end part 111 opened outward. In this case, the heat engine 10 may further include a cylinder head unit 120 for hermetically closing up the opened front end part 111. Alternatively, there may be proposed a cylinder having a closed front end part.

The cylinder head unit 120 is coupled to the front end part 111 of the cylinder 100 and hermetically closes up an opening 111a of the front end part 111 of the cylinder 100. For example, a bolt 1, a rivet, welding, etc. may be used for coupling the cylinder head unit 120 to the front end part 111 of the cylinder 100. In this case, the front end part 111 of the cylinder 100 may be formed with a plurality of bolt holes 3 to which the bolt 1 is fastened.

The cylinder head unit 120 may include a head cover 121 and a head protrusion 123. The head cover 121 has a circular plate having a predetermined thickness and has a diameter equal to or larger than that of the front end part 111 of the cylinder 100. Also, the head cover 121 is formed with a plurality of bolt holes 2 along the edge thereof so as to correspond to the bolt holes 3 of the front end part 111 of the cylinder 100, and coupled to the front end part 111 of the cylinder 100 by the bolt 1 or the like. In this case, a ring-shaped sealing member 125, e.g., silicon packing may be provided between the head cover 121 and the front end part 111 of the cylinder 100, thereby enhancing a sealing effect on preventing the operating gas from leaking from the inside of the cylinder 100 to the outside. The sealing member 125 is formed with a circular hollow 125a at the center thereof, in which the head protrusion 123 of the cylinder head 120 can be inserted. Further, the sealing member 125 is formed with bolt holes 125b at the edge thereof, through which the bolt 1 can pass.

The head protrusion 123 protrudes from one surface of the head cover 121 in the form of a cylinder as being opposite to the piston 200, and is thus inserted in the opening 111a of the front end part 111 of the cylinder 100. The head protrusion 123 is spaced apart from an inner surface of the front end part 111 of the cylinder 100 leaving a predetermined gap G, and forms a guide groove 123a in which a front end part 211 of the piston 200 is inserted. In this case, the gap G between the head protrusion 123 and the cylinder 100 may correspond to the thickness of the front end part 211 of the piston 200.

In this case, the length of the head protrusion 123, i.e., the length of the guide groove 123a may be almost equal to a distance from the front end portion of the piston 200 to the front end portion of a heat opening 212 so that the heat opening 212 of the piston 200 can be placed at the high temperature heater 300 when the operating gas has the minimum volume, i.e., the operating gas is maximally compressed.

The cylinder 100 may include an opening 113a at a rear end part 113 thereof so that the piston 200 can be inserted therein.

The cylinder 100 may include a cylinder insulating unit 140 for insulating heat between the high temperature heater 300 and the low temperature cooler 400 to be described later. In this case, the cylinder insulating unit 140 may be placed in a thermal emitter 300 and a thermal absorber 400.

The cylinder 100 is mostly made of stainless steel, and the cylinder insulating unit 140 of the cylinder 100 may be made of ceramic, silica, or the like material.

The piston 200 is accommodated in the cylinder 100 so as to be rectilinearly reciprocated by thermal expansion and thermal contraction of the operating gas hermetically filled between the cylinder 100 and the piston 200. In this exemplary embodiment, a free piston 200 is configured by way of example, but not limited thereto. Alternatively, various types of piston may be achieved.

The piston 200 is shaped like a cylinder having a diameter corresponding to the inner diameter of the cylinder 100. Further, the front end part 211 of the piston 200 may include metal having low thermal conductivity, an insulating material such as ceramic, or etc.

The piston 200 may include a hollow 211a in the front end part 211 thereof. The hollow 211a may be extended to the rear end part of the heat opening 212 to be described later. Thus, the head protrusion 123 of the cylinder head unit 120 can be inserted in the hollow 211*a*. The piston 200 may be shaped to be closed up at a rear portion of the heat opening 212. The rear portion of the heat opening 212 of the piston 200, i.e., a rear end part 213 of the piston 200 may be installed with a piston insulating unit 217.

The piston 200 is formed with the heat opening 212 so that the operating gas can directly contact the high temperature heater 300 or the low temperature cooler 400. For example, a plurality of heat openings 212 may be formed along an outer circumference in front of the rear end part 213 of the piston 200. The heat opening 212 may have various shapes such as a circle, a quadrangle, etc.

The front end part 211 of the piston 200 may have a thickness t corresponding to the gap G of the guide groove 123*a* formed between an inner wall of the cylinder 100 and the head protrusion 123 of the cylinder head unit 120. Also, the front end part 211 of the piston 200 may have a length enough to prevent the operating gas from contacting the high temperature heater 300 when the operating gas expands maximally, i.e., when the piston 200 has the maximum moving width. For example, according to an exemplary embodiment, if three regions of the high temperature heater 300, the cylinder insulating unit 140, and the low temperature cooler 400 have the same length with one another, the front end part 211 of the piston 200 has a length enough to cover the length of the three regions, and has almost the same length as the length of the head protrusion 123 of the cylinder head unit 120, i.e., the length of the guide groove 123*a*.

The heat engine 10 may further include at least one piston ring 219 installed at the rear end part 213 of the piston 200 and hermetically closing up a part being in contact with an inner wall of the cylinder 100. To this end, at least one piston ring receiving groove 215 may be formed on the outer circumference of the piston 200, so that the piston ring 219 can be received in and fastened to the piston ring receiving groove 215. Since the piston ring 219 is placed inside the low temperature cooler 400 of the cylinder 100 when the piston 200 rectilinearly reciprocates, it may be made of a Teflon ring or the like material useful at a low temperature. In this exemplary embodiment, the piston ring 219 is used, but not limited thereto. Instead of the piston ring 219, a fastening ring may be arranged in the form of a vertical bearing on the inner wall of the cylinder 100.

The high temperature heater 300 is an element for heating the front end part 111 of the cylinder 100 and expanding the operating gas. The high temperature heater 300 is made of metal having good heat transfer efficiency, and provided in the form of a ring on the outer circumference of the cylinder 100, but not limited thereto. Alternatively, the high temperature heater 300 may be selectively embodied in various forms.

For example, the high temperature heater 300 may heat the front end part 111 of the cylinder 100 by thermal energy based on combustion, electric heat or light of the sun.

Figure 7:
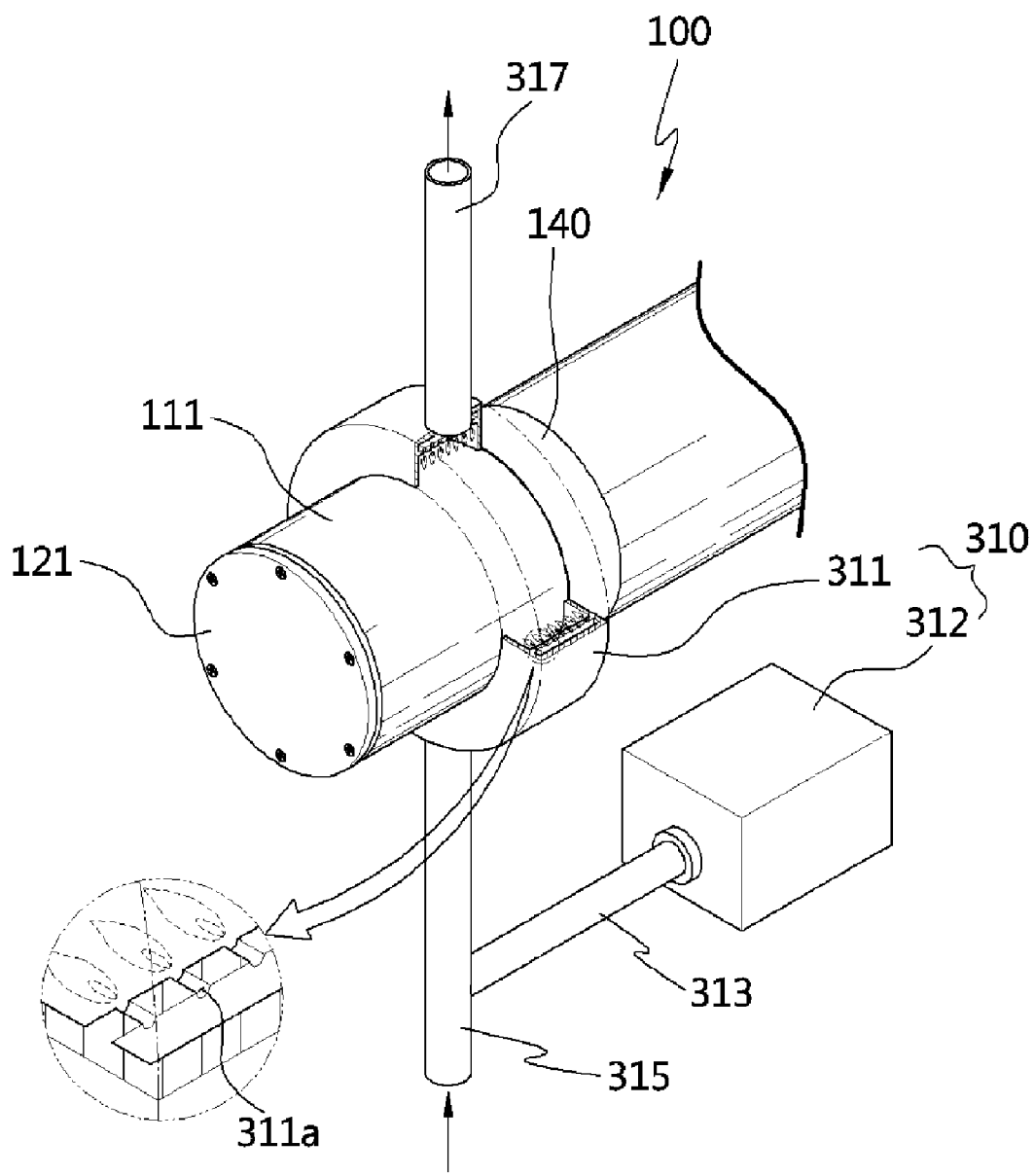
FIG. 7 is a partial perspective view showing a first exemplary embodiment of a high temperature heater in the heat engine according to an exemplary embodiment of the present invention.

More specifically, as shown in FIG. 7, a high temperature heater 310 may use thermal energy based on combustion to heat the front end part 111 of the cylinder 100. To this end, the high temperature heater 310 may include a combustion chamber 311 arranged in the form of a ring on the outer circumference of the front end part 111 of the cylinder 100, and a fuel supplying unit 312 supplying fuel to the combustion chamber 311 through a fuel pipe 313. In this case, a plurality of burners 311*a* may be placed inside the combustion chamber 311. Further, an air pipe 315 for injecting air into the combustion chamber 311 and an exhaust pipe 317 for exhausting the combustion gas may be connected to the connected to the combustion chamber 311.

Figure 8:
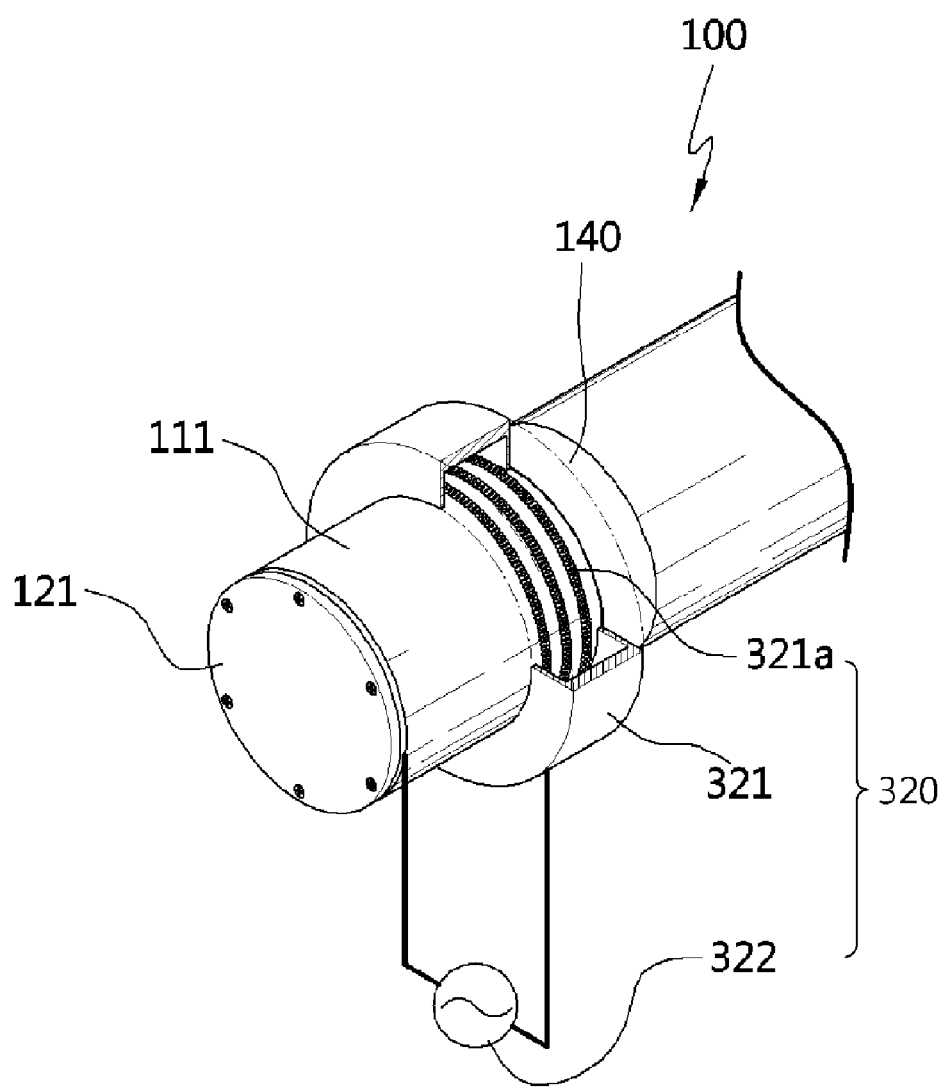
FIG. 8 is a partial perspective view showing a second exemplary embodiment of a high temperature heater in the heat engine according to an exemplary embodiment of the present invention.

Also, as shown in FIG. 8, a high temperature heater 320 may use thermal energy based on electric heat to heat the front end part 111 of the cylinder 100. To this end, the high temperature heater 320 may include a housing 321 arranged in the form of a ring on the outer circumference of the front end part 111 of the cylinder 100, a hot-wire member 321*a* wound on the outer circumference of the front end part 111 of the cylinder 100 and placed inside the housing 321, and a power unit 322 supplying electricity to the hot-wire member 321.

Figure 9:
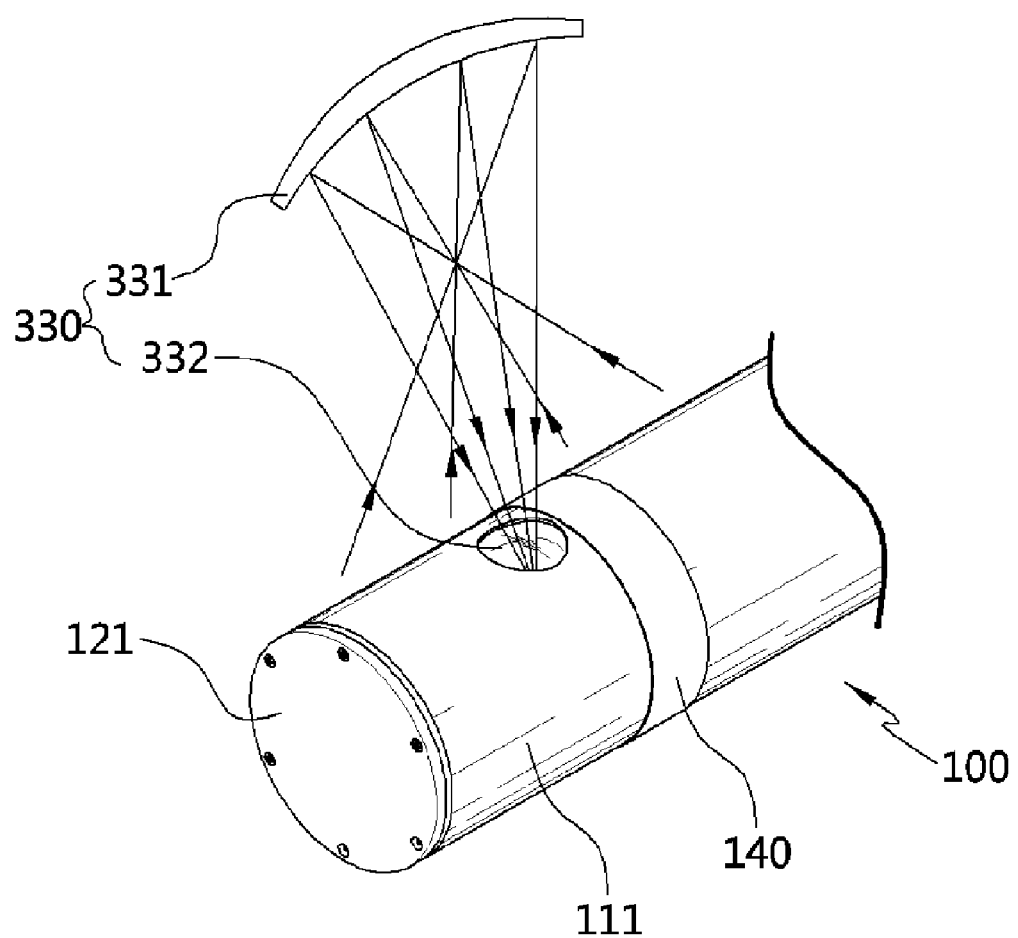
FIG. 9 is a partial perspective view showing a third exemplary embodiment of a high temperature heater in the heat engine according to an exemplary embodiment of the present invention.

Further, as shown in FIG. 9, a high temperature heater 330 may use thermal energy based on the highly concentrated light of the sun to heat the front end part 111 of the cylinder 100. To this end, the high temperature heater 330 may include a sunlight concentrating module 331 for concentrating the light of the sun, and a light transmission window 332 formed in the front end part 111 of the cylinder 100 so that the operating gas can be directly exposed to the sunlight concentrated by the sunlight concentrating module 331. The sunlight concentrating module 331 may be achieved by refractive type light concentration where a lens such as a magnifying glass is used to refract the light of the sun and concentrate it at one point, and reflective type light concentration where a curved mirror is used to reflect the light of the sun and concentrate it at one point. As compared with the refractive type light concentration, the reflective type light concentration as shown in FIG. 9 is more advantageous to highly concentrate the light of the sun. Here, the reflective type light concentration may be variously configured in accordance with the number of reflecting times or a reflecting form.

According to an exemplary embodiment of the present invention, the high temperature heaters 310, 320 and 330, which use the combustion, the electric heat or the light of the sun as heat sources, are shown, but not limited thereto. Alternatively, the high temperature heaters may be variously embodied. For example, the high temperature heater 300 may include any kind of heat source capable of keeping temperature higher than those of the low temperature cooler 400 or surroundings.

The low temperature cooler 400 is an element for cooling the rear end part 113 of the cylinder 100 and contracting the operating gas. The low temperature cooler 400 may be provided in the form of a ring on the outer circumference of the cylinder 100, but not limited thereto. Alternatively, the low temperature cooler 400 may be embodied in various forms.

Figure 10:
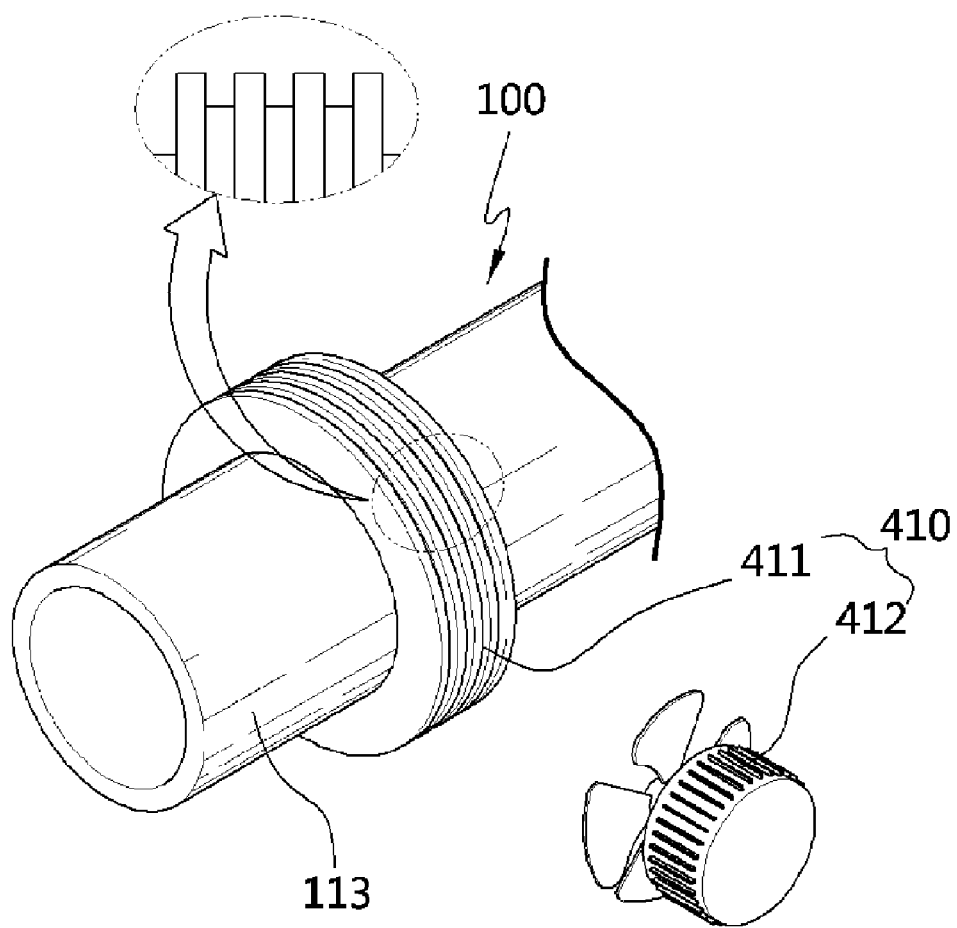
FIG. 10 is a partial perspective view showing a first exemplary embodiment of a low temperature cooler in the heat engine according to an exemplary embodiment of the present invention.

For example, as shown in FIG. 10, a low temperature cooler 410 may be achieved by an air-cooling type, which includes a cooling fin 411 formed on the outer circumference of the rear end part 113 of the cylinder 100, and a cooling fan 412 for blowing air to and cooling the cooling fin 411. Here, the cooling fin 411 may be formed unevenly to increase an area to contact the air so that cooling can be more quickly carried out under the atmosphere.

Figure 11:
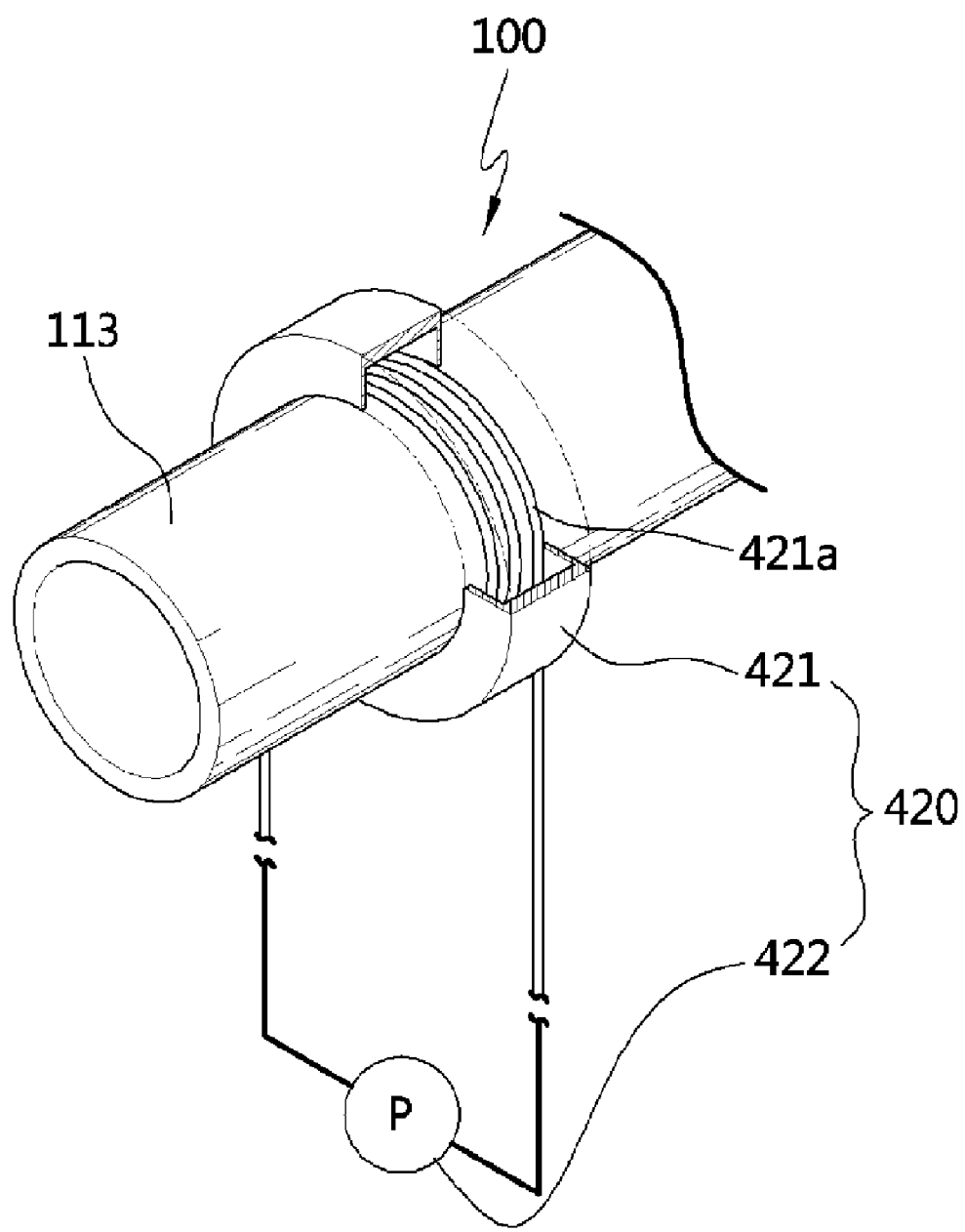
FIG. 11 is a partial perspective view showing a second exemplary embodiment of a low temperature cooler in the heat engine according to an exemplary embodiment of the present invention.

Also, as shown in FIG. 11, a low temperature cooler 420 may be achieved by a water-cooling type, which includes a cooling tube 421*a* wound on the outer circumference of the rear end part 113 of the cylinder 100, and a cooling pump 422 supplying cooling water to the cooling tube 421*a*. In this case, the low temperature cooler 420 is provided as a ring shape on the outer circumference of the rear end part 113 of the cylinder 100, and may further include a housing 421 in which the cooling tube 421*a* is placed.

Figure 12:
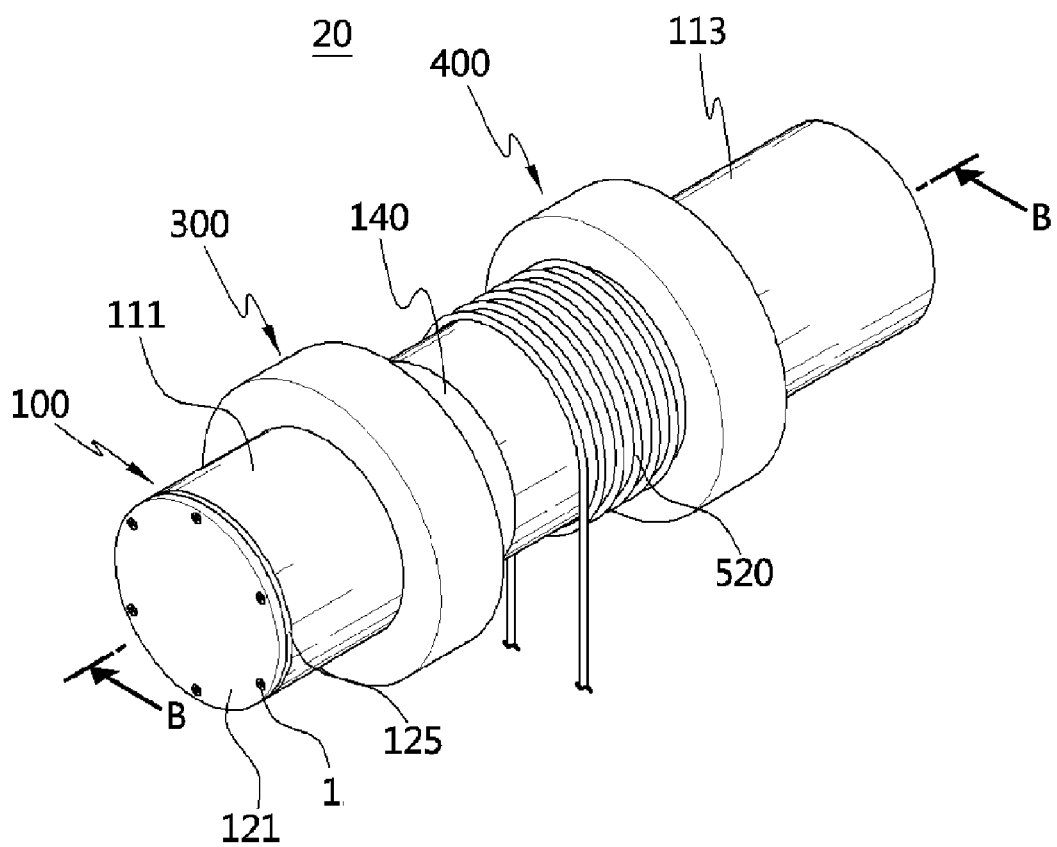
FIG. 12 is a perspective view schematically showing a heat engine according to another exemplary embodiment of the present invention.
Figure 13:
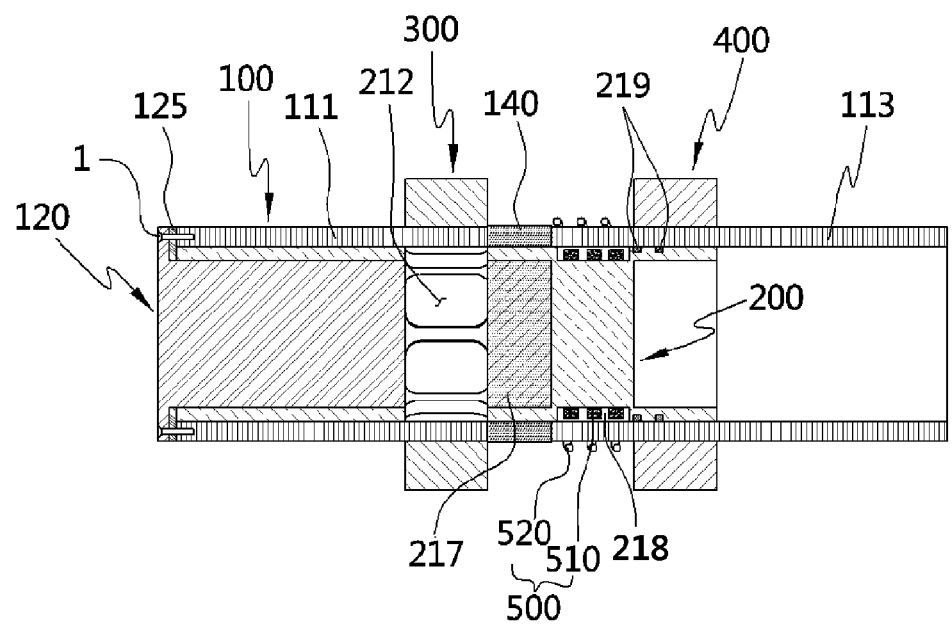
FIG. 13 is a cross-section view taken along line B-B of FIG. 12.

FIG. 12 is a perspective view schematically showing a heat engine according to another exemplary embodiment of the present invention, and FIG. 13 is a cross-section view taken along line B-B of FIG. 12.

As shown in FIGS. 12 and 13, a heat engine 20 according to another exemplary embodiment includes a cylinder 100, a piston 200, a high temperature heater 300, a low temperature cooler 400, and a generator 500.

This exemplary embodiment is the same as the foregoing exemplary embodiment described with reference to FIGS. 1 to 8 except the generator 500 that changes mechanical energy based on a rectilinear reciprocating motion of the piston 200 into electric energy. Accordingly, like numerals refer to like elements, and repetitive descriptions thereof will be avoided as necessary.

The generator 500 is an element that transforms the mechanical energy based on the rectilinear reciprocating motion of the piston 200 into the electric energy, which may include a magnet 510, a coil 520, etc.

A plurality of magnets 510 may be installed in a magnet receiving groove 217 formed on the outer circumference of the piston 200 along a lengthwise direction of the piston 200.

The coil 520 is wound on the outer circumference of the cylinder 100 along the lengthwise direction between the high temperature heater 300 and the low temperature cooler 400, and generates an induced electromotive force as the magnet 510 rectilinearly reciprocates together with the piston 200.

The generator 500 operates to generate an electric current in the coil 520 as the magnet 510 rectilinearly reciprocates together with the piston 200 with respect to the cylinder 100 on which the coil 520 is wound. The generator 500 is a linear generator which is formed integrally with the cylinder 100 and the piston 200 of the heat engine and transforms the mechanical energy into the electric energy. Like that a magnetic field is generated around a place where an electric current flows, if the magnetic field of the magnet 510 is generated around the coil 520, there occurs electromagnetic induction causing an electron to move. Electricity generated from the coil 520 by vibration of the magnet 510 is the induced electromotive force. If the induced electromotive force generated from the coil 520 is connected to a primary side of a transformer (not shown) configured with an LC resonance circuit, alternating current (AC) can be generated at a secondary side of the transformer.

Figure 14:
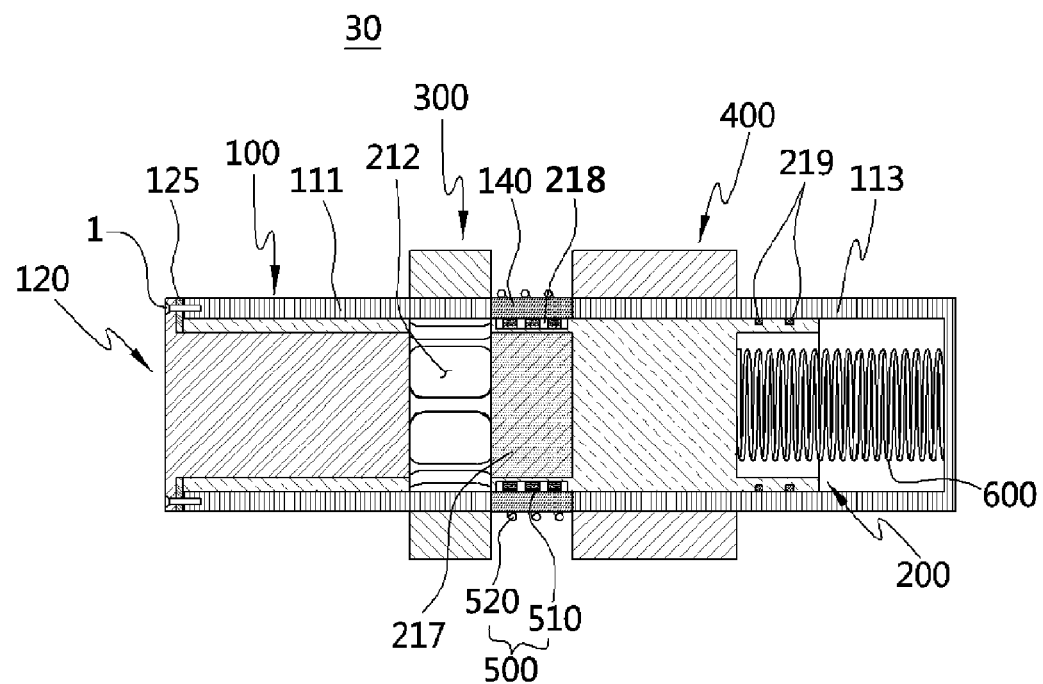
FIG. 14 is a cross-section view schematically showing a heat engine according to still another exemplary embodiment of the present invention.

FIG. 14 is a cross-section view schematically showing a heat engine according to still another exemplary embodiment of the present invention.

As shown in FIG. 14, a heat engine 30 according to still another exemplary embodiment of the present invention includes a cylinder 100, a piston 200, a high temperature heater 300, a low temperature cooler 400, a generator 500 and a restoration unit 600.

This exemplary embodiment is the same as the foregoing exemplary embodiment described with reference to FIGS. 1 to 13 except the configuration where all the cylinder insulating unit 140 of the cylinder 100, the heat opening 212 of the piston 200, and the high temperature heater 300 have the same length with one another, and the restoration unit 600 is additionally provided at the rear end part of the piston 200. Accordingly, like numerals refer to like elements, and repetitive descriptions thereof will be avoided as necessary.

In this exemplary embodiment, all the cylinder insulating unit 140 of the cylinder 100, the heat opening 212 of the piston 200, and the high temperature heater 300 have the same length with one another, so that the operating gas can be efficiently expand or contract to thereby rectilinearly reciprocate the piston 200 when directly heated or cooled by the exterior while following the thermodynamic cycle as shown in FIG. 12. Here, the length of the low temperature cooler 400 may be equal to or a little longer than each length of the heat opening 212 and the high temperature heater 300.

Also, in order to continue to rectilinearly reciprocate the piston 200, there is a need of a restoration force for compressing the expended operating gas again. The restoration unit 600 may include a coil spring, a flat spring, a magnet for generating a repulsive force, or etc. interposed between the closed rear end part of the cylinder 100 and the rear end part of the piston 200 so that the restoration force can be provided to the piston 200 when the operating gas expands. Here, the rear end part of the cylinder 100 where the restoration unit 600 is placed serves as a gas spring that compresses and expands the sealed gas as the piston 200 vibrates.

Figure 17:
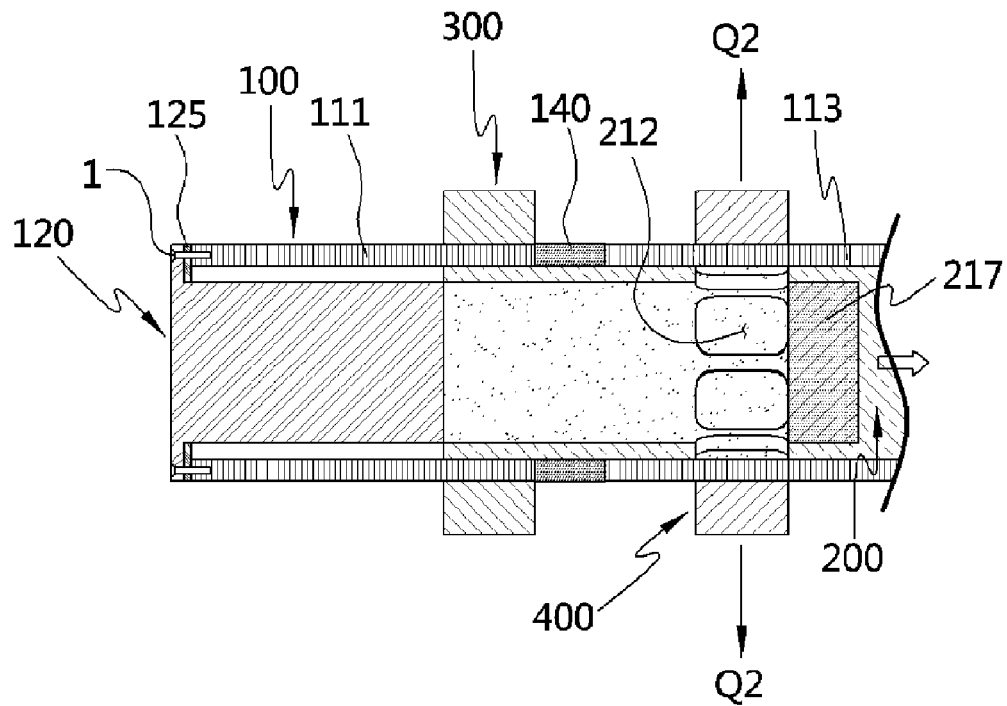
Figure 18:
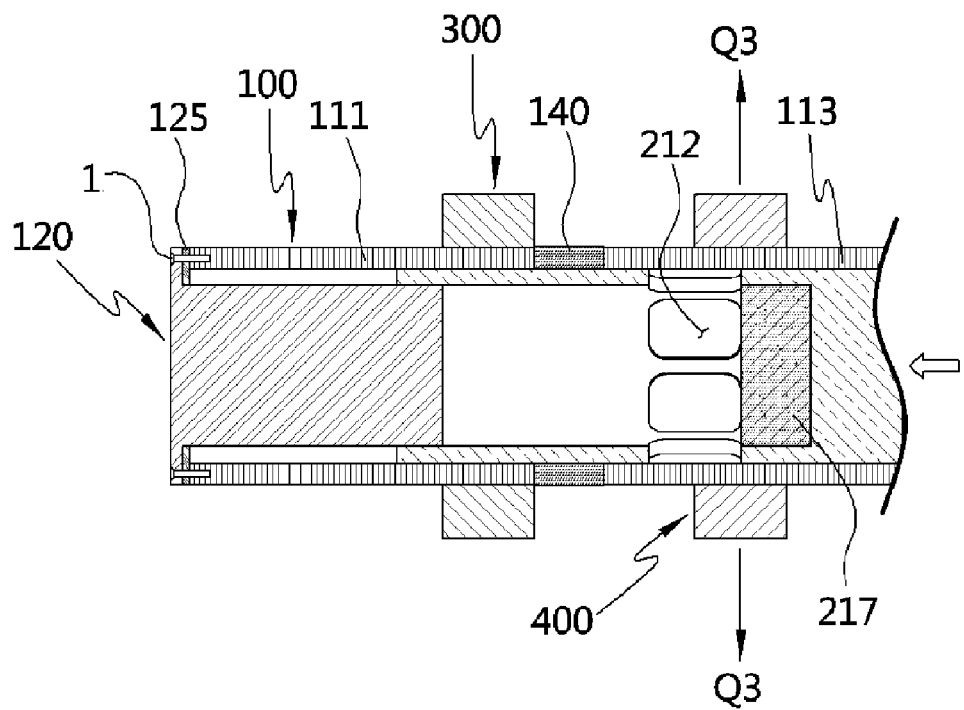
Figure 19:
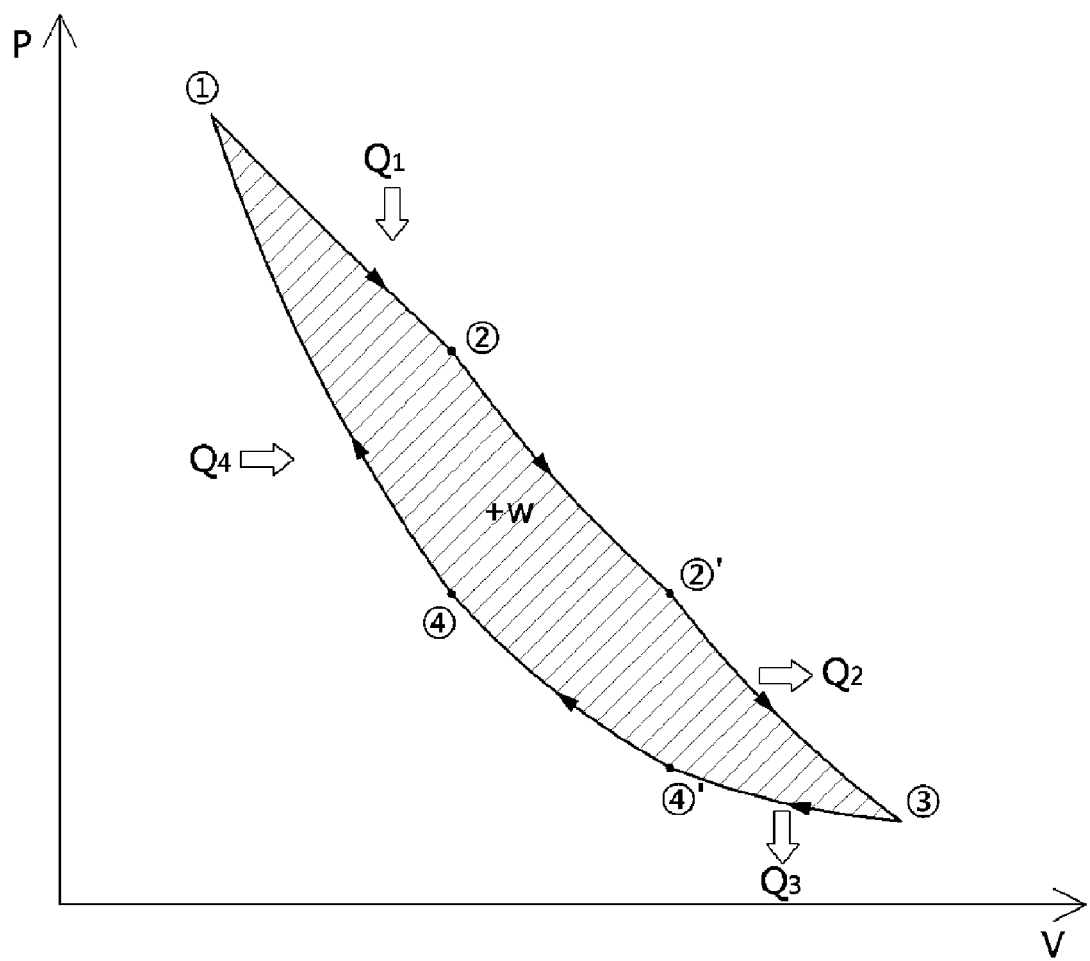
FIGS. 19 and 20 are graphs showing a thermodynamic cycle of the heat engine according to the present invention.
Figure 20:
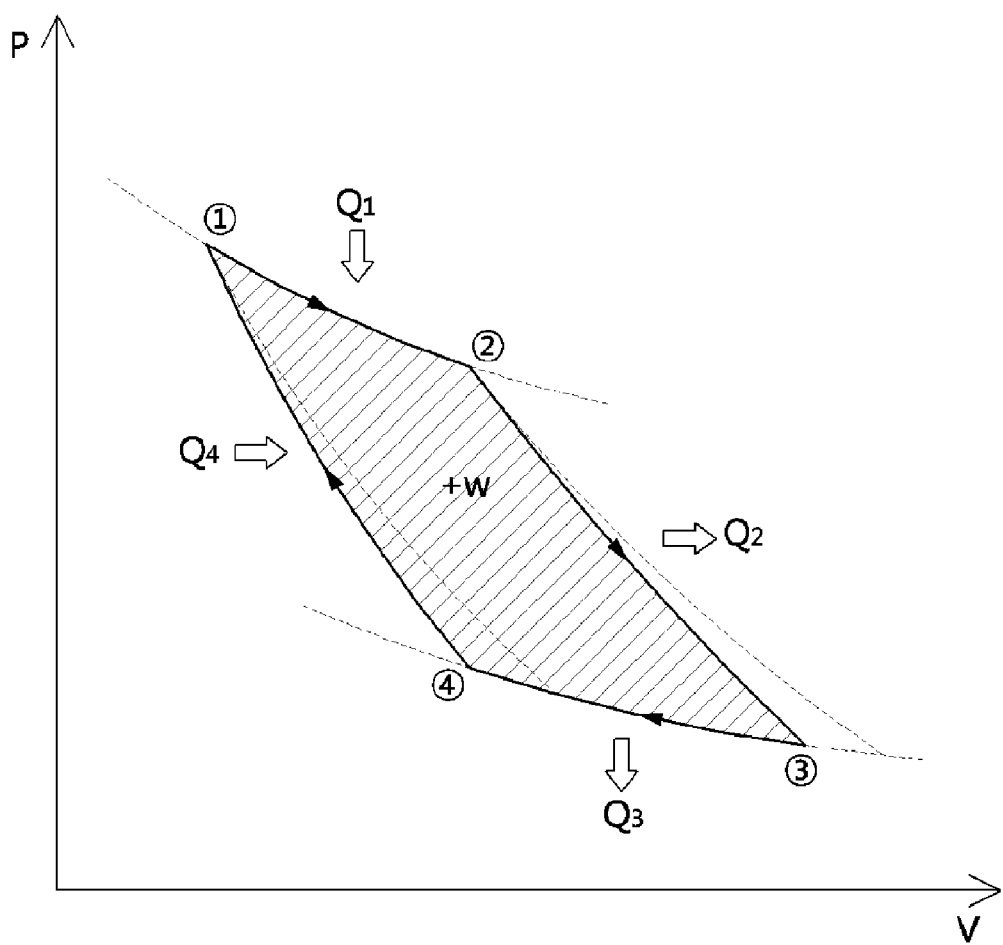

FIGS. 15 to 18 are views for sequentially explaining operations of the heat engine according to an exemplary embodiment of the present invention, and FIGS. 19 and 20 are graphs showing a thermodynamic cycle of the heat engine according to the present invention.

Below, operations of the heat engine according to an exemplary embodiment of the present invention will be described in detail with reference to FIGS. 15 and 20.

Figure 15:
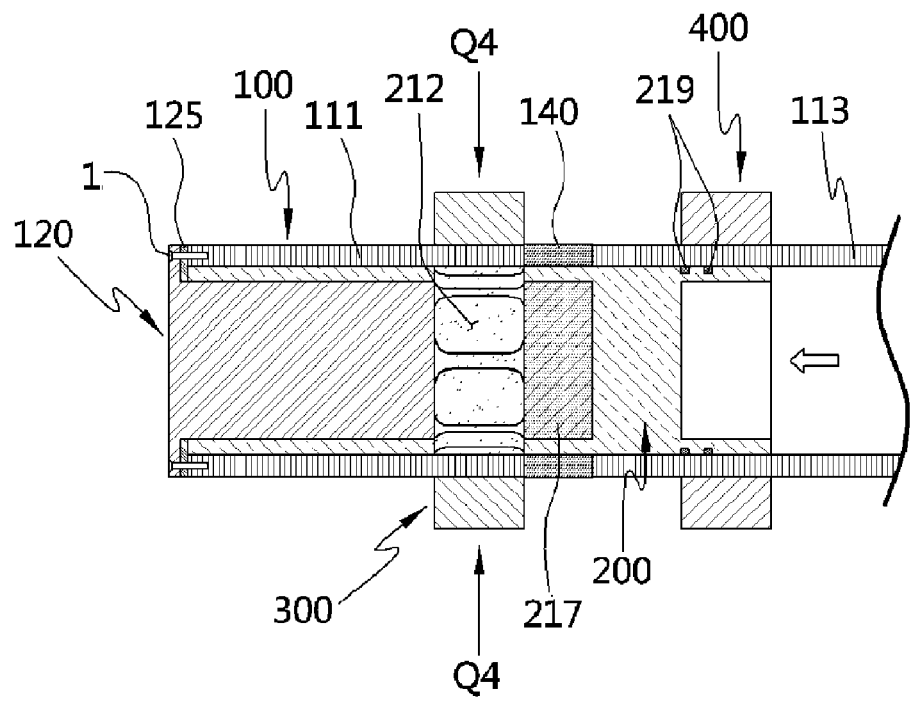
FIGS. 15 to 18 are views for sequentially explaining operations of the heat engine according to an exemplary embodiment of the present invention.

First, as shown in FIG. 15, when the piston 200 moves leftward and thus the front end part 211 of the piston 200 is inserted in the guide groove 124 formed between the inner wall of the cylinder 100 and the cylinder head unit 120, that is, when the piston 200 moves until the operating gas hermetically filled in a space between the cylinder 100 and the piston 200 has the minimum volume, the heat opening 212 of the piston 200 is positioned on the high temperature heater 300 of the cylinder 100. Such position adjustment of the piston 200 may be based on a driving force generated by the Fleming's left-hand rule as a line of magnetic force of the magnet 510 is varied when an electric current flows in the coil 520 of the generator 500.

In the case where the heat opening 212 of the piston 200 is positioned on the high temperature heater 300 of the cylinder 100, the operating gas directly contacts the high temperature heater 300 through the heat opening 212 and is thermally compressed at high temperature while absorbing thermal energy Q4 from the high temperature heater 300 (refer to high-temperature heat compressing process ④→① of FIG. 19). This process is not the same as but approximately equal to the thermodynamic cycles of the Carnot and Stirling engines. Here, the cylinder insulating unit 140 provided between the high temperature heater 300 and the low temperature cooler 400 insulates the heat transfer between the high temperature heater 300 and the low temperature cooler 400.

Figure 16:
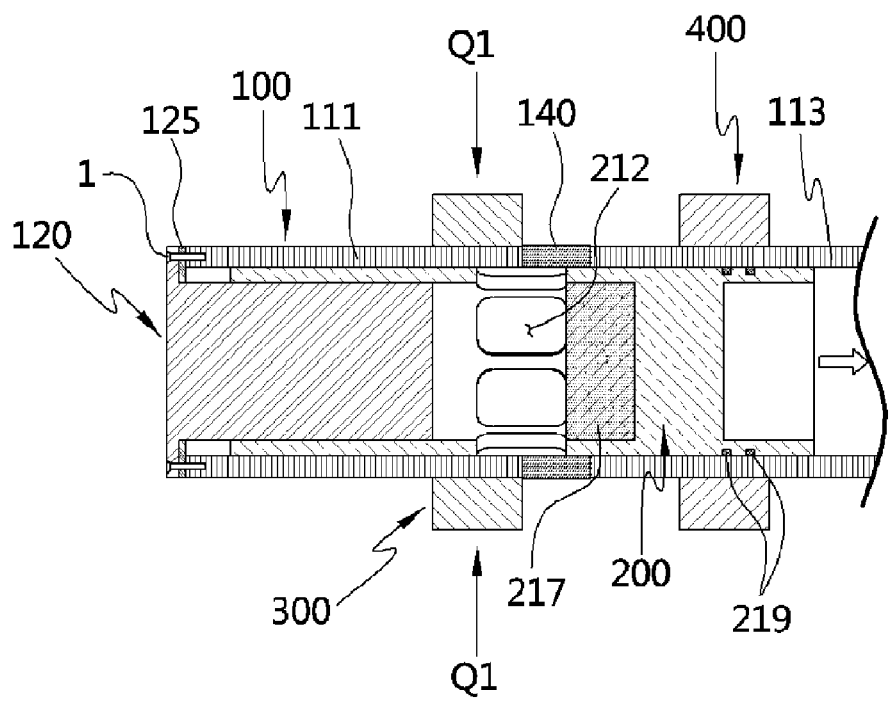

Next, as shown in FIG. 16, while thermal energy Q1 from the high temperature heater 300 is continuously absorbed in the operating gas inside the cylinder 100, molecules of the operating gas increases in molecular motion and their speed increases. The number of times the molecules of the operating gas collide the inner wall of the cylinder 100 increases in accordance with the molecular motion. Thus, if the volume is fixed, even pressure increases within the volume. This pressure pushes down the piston 200 installed inside the cylinder 100 and causes the operating gas to thermally expand at high temperature (refer to high-temperature heat expanding process ①→② of FIG. 19). This process is the same as the thermodynamic cycle of the Carnot and Stirling engines.

Next, as shown in FIG. 17, the piston 200 moves rightward and the heat opening 212 of the piston 200 is positioned on the low temperature cooler 400 when the operating gas has the maximum volume. The operating gas directly contacts the low temperature cooler 400 through the heat opening 212 and is cooled and expanded to thereby rapidly decrease in pressure. At this time, the temperature of the operating gas is still higher than that of the low temperature cooler 400, so that some of inner thermal energy Q1 is discharged to the outside (refer to low-temperature cool expanding process '43 ③ of FIG. 19). This process is not the same as but approximately equal to the thermodynamic cycle of the Carnot and Stirling engines.

Next, as shown in FIG. 18, the operating gas expanded until having the maximum volume is insulated from the high temperature heater 300 and contacts only the low temperature cooler 400, so that it can be cooled and contracted to thereby move the piston 200 upward. At this time, the inner thermal energy Q3 of the operating gas is discharged to the outside (refer to low-temperature cool contracting and expanding process ③→④' of FIG. 19). This process is the same as the thermodynamic cycle of the Carnot and Stirling engines.

If an axial direction length of the cylinder 100 including the cylinder insulating unit 140 between the high temperature heater 300 and the low temperature cooler 400 is longer than the length of the heat opening 212 of the piston 200, an instant adiabatic process exists (refer to processes ②→②', ④'→④ of FIG. 19), thereby completing the whole thermodynamic cycle of ①→②→②'→③→④'→④→① as shown in FIG. 19. If the axial direction length of the cylinder 100 including the cylinder insulating unit 140 between the high temperature heater 300 and the low temperature cooler 400 is equal to the length of the heat opening 212 of the piston 200, an ideal thermodynamic cycle having no adiabatic process (②=②', ④'=④) follows as shown in FIG. 20. If the axial direction length of the cylinder 100 including the cylinder insulating unit 140 between the high temperature heater 300 and the low temperature cooler 400 is shorter than the length of the heat opening 212 of the piston 200, the heat opening 212 contacts both the high temperature heater 300 and the low temperature cooler 400, so that the operating gas is both heated and cooled and thus has an effect similar to an adiabatic effect. At this time, a thermodynamic cycle (not shown) is similar to a cycle of ①→②→②'→③→④'→④→① of FIG. 19.

In the foregoing heat engine 10 according to an exemplary embodiment of the present invention, the space formed by the cylinder 100 and the piston 200 is hermetically filled with the operating gas such as hydrogen, helium, etc., and heated and cooled at the exterior, so that the operating gas can be thermally expanded or contracted while repeating the processes as shown in FIGS. 19 to 20, thereby rectilinearly reciprocating the piston 200. This is also applied to the heat engine 20, 30 according to other exemplary embodiments of the present invention. Also, the heat engine 20, 30 according to other exemplary embodiments of the present invention transforms the mechanical energy based on the rectilinear reciprocating motion of the piston 200 into the electric energy by the generator 500. With this, the thermal efficiency of the heat engines 10, 20, 30 according to the exemplary embodiments of the present invention is as follows.

$$e = \frac{Q_{out}}{W}$$ [Expression 1]
$$= \frac{Q_1 + Q_4}{Q_1 + Q_4 - Q_2 - Q_3}$$
$$= 1 \Big/ \left(1 - \frac{Q_2 + Q_3}{Q_1 + Q_4}\right)$$
$$\left(\simeq 1 \Big/ \left(1 - \frac{T_c}{T_h}\right)\right)$$

As shown in [Expression 1], the heat engines according to the exemplary embodiments of the present invention are an external-combustion engine nearly similar to an intermediate form between the ideal Carnot engine and Stirling engine, so that high thermal efficiency can be expected.

Figure 21:
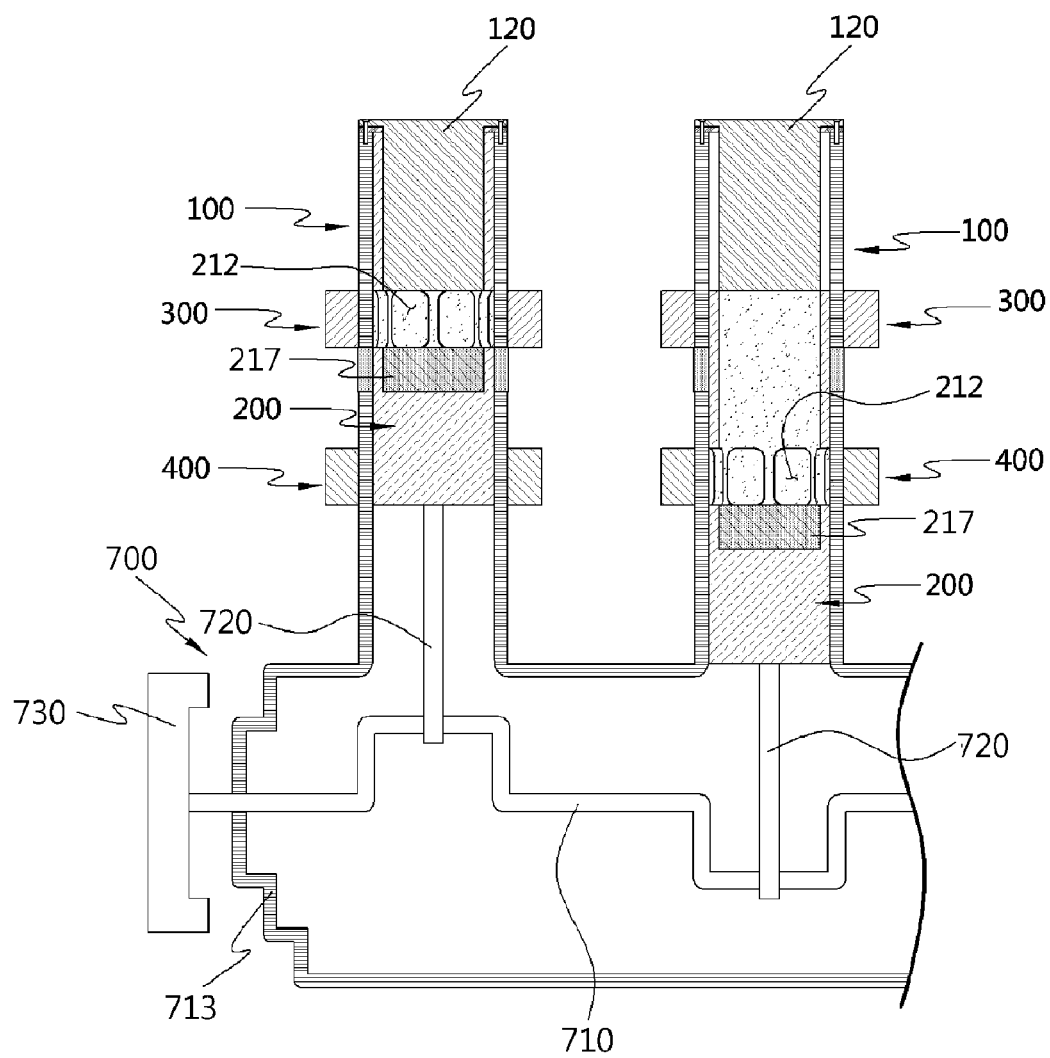
FIG. 21 is a perspective view schematically showing the heat engine according to still another exemplary embodiment of the present invention.
Figure 22:
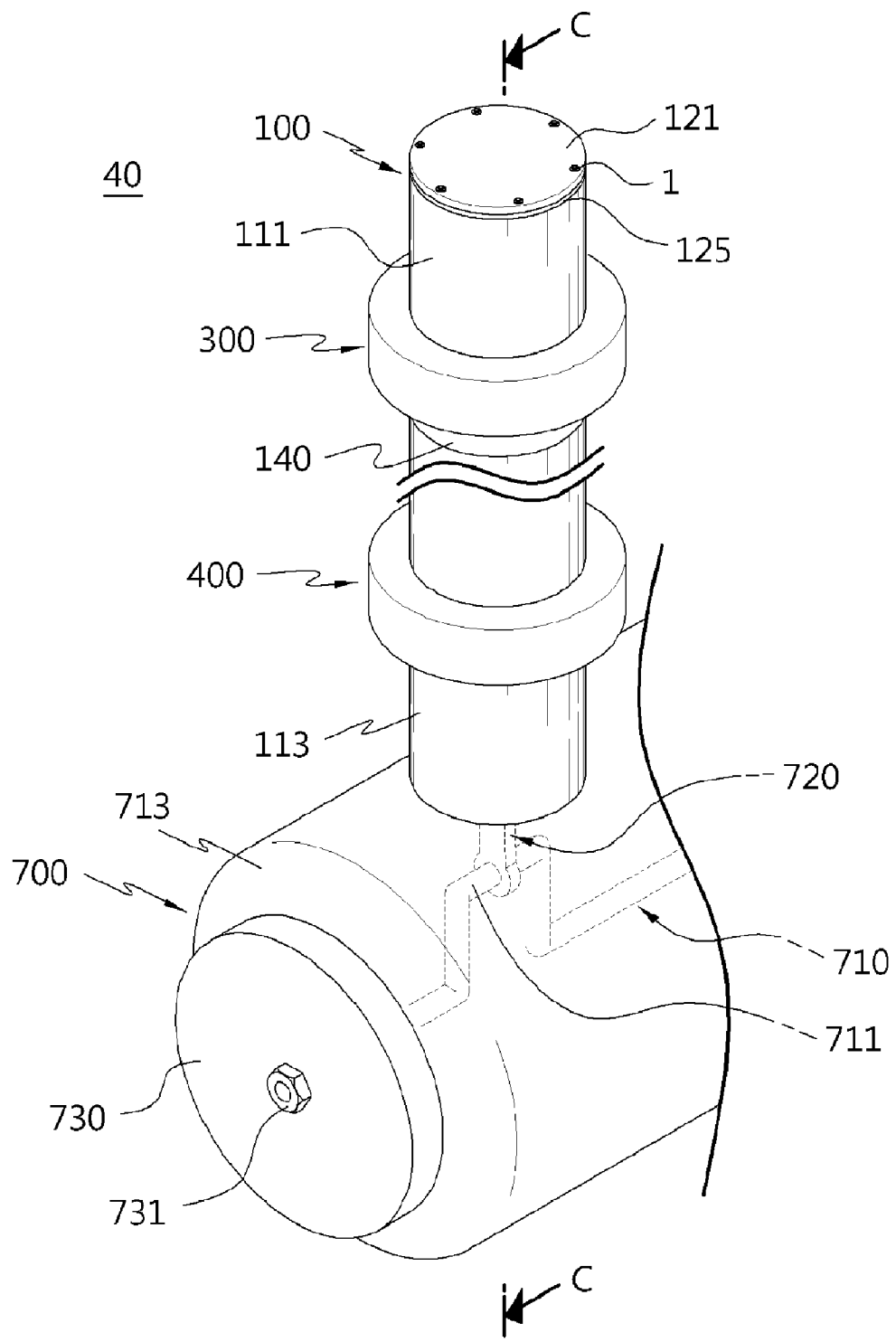
FIG. 22 is a perspective view showing a part of the heat engine according to still another exemplary embodiment of the present invention.
Figure 23:
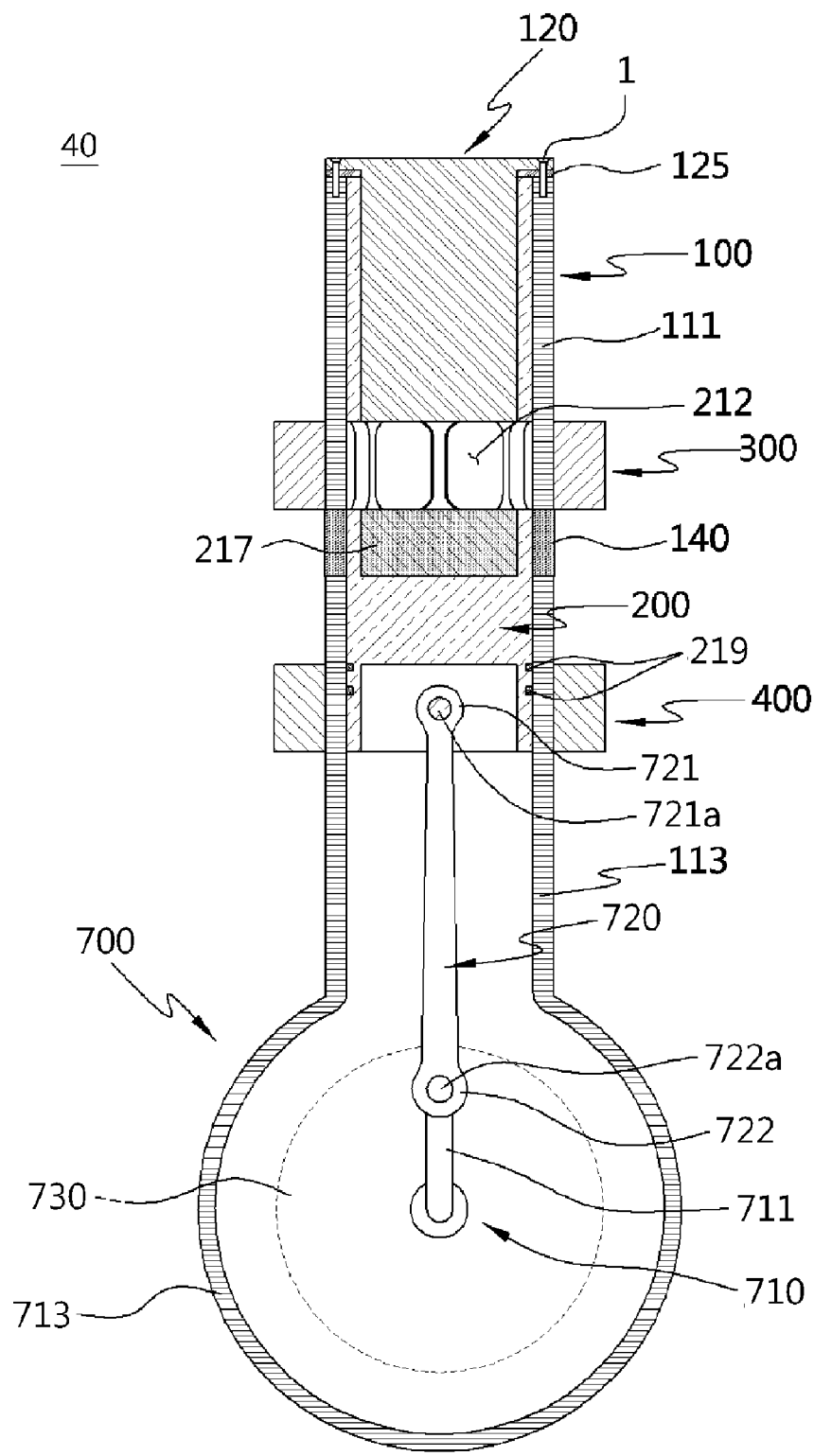
FIG. 23 is a cross-section view taken along line C-C of FIG. 22.
Figure 24:
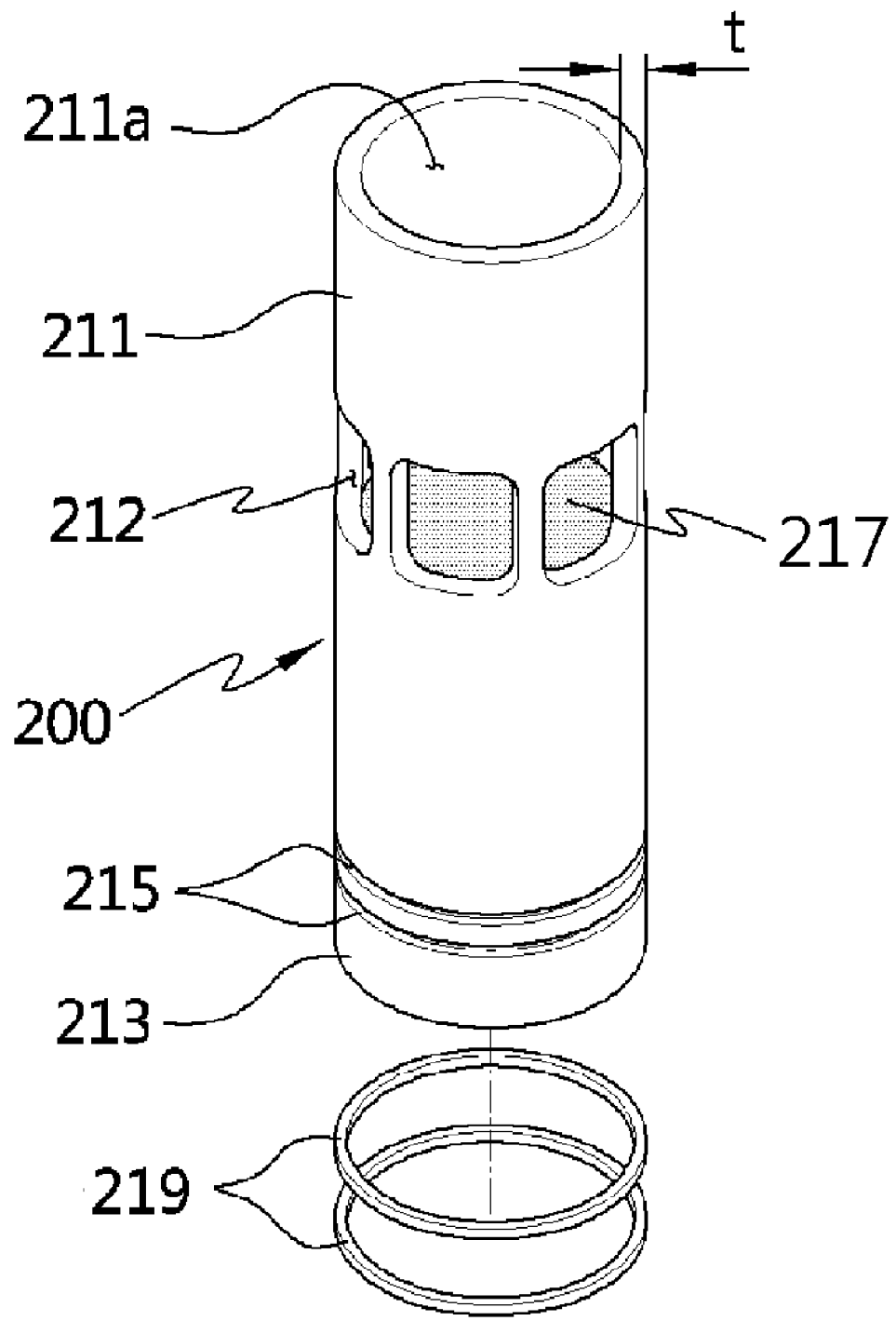
FIG. 24 is a perspective view of a piston in the heat engine according to still another exemplary embodiment of the present invention.
Figure 25:
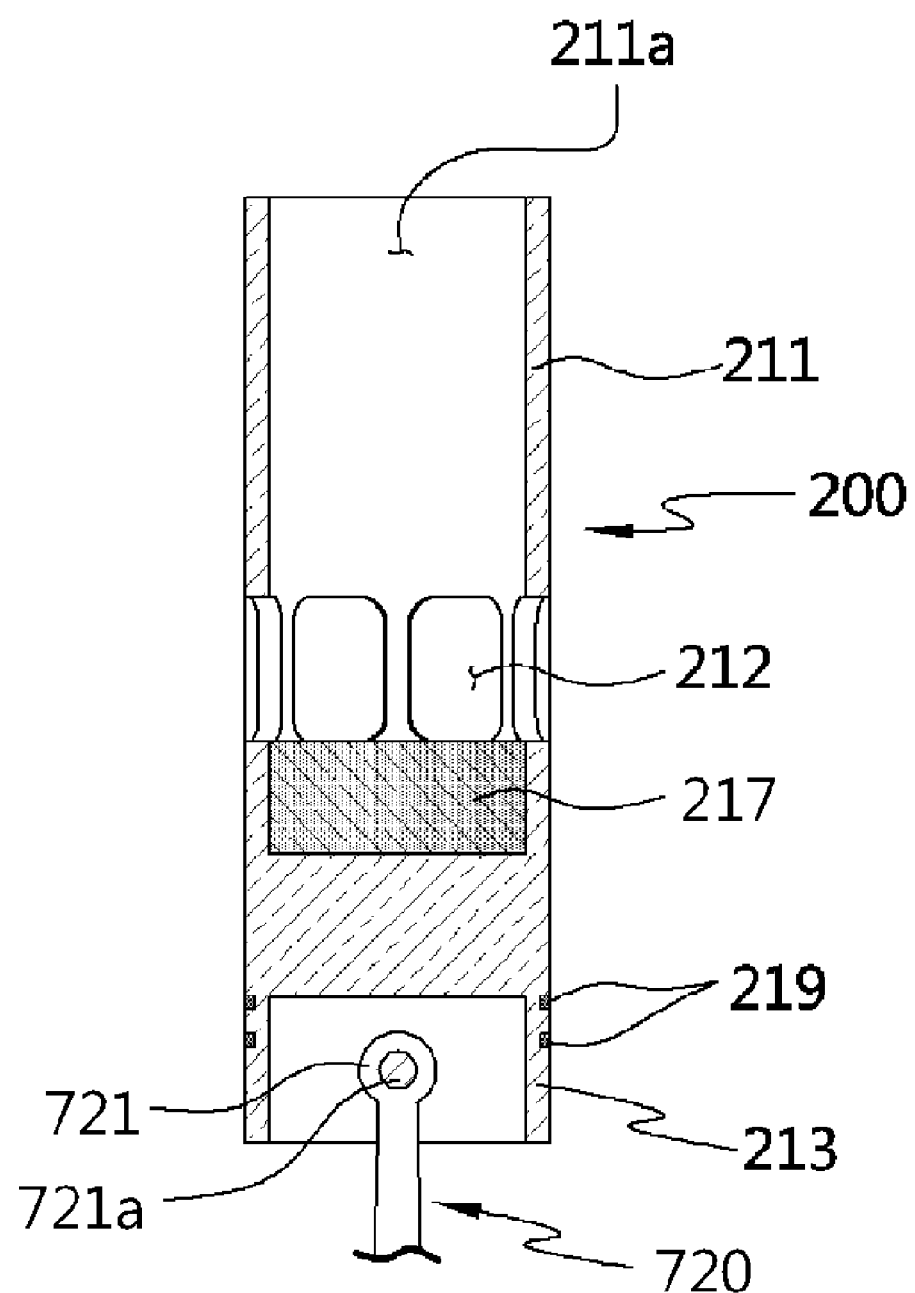
FIG. 25 is a cross-section view of the piston in the heat engine according to still another exemplary embodiment of the present invention.

FIG. 21 is a perspective view schematically showing the heat engine according to still another exemplary embodiment of the present invention, FIG. 22 is a perspective view showing a part of the heat engine according to still another exemplary embodiment of the present invention, FIG. 23 is a cross-section view taken along line C-C of FIG. 22, FIG. 24 is a perspective view of a piston in the heat engine according to still another exemplary embodiment of the present invention, and FIG. 25 is a cross-section view of the piston in the heat engine according to still another exemplary embodiment of the present invention.

As shown in FIGS. 21 to 25, a heat engine 40 according to this exemplary embodiment includes a cylinder 100, a piston 200, a high temperature heater 300, and a low temperature cooler 400. Further, the heat engine 40 according to this exemplary embodiment may include a converter 700.

Hereinafter, the present exemplary embodiment will be described with reference to FIGS. 17 to 20. In this case, the same elements as those of the foregoing exemplary embodiments will not be repetitively described. If there is no description with respect to some elements, they will be regarded as the same elements as those of the foregoing exemplary embodiments. The following descriptions will be accomplished focusing on distinctive elements.

The cylinder 100 is coupled to a crank case 713 (to be described later) at the rear end part 113 thereof. The piston 200 is coupled to a first end 721 of a connecting rod 720 to be described later by a hinge 721a.

According to this exemplary embodiment, the converter 700 is an element that transfers a rectilinear reciprocating motion of the piston 200 into a rotary motion, and generates rotary motive force, which may include the crank case 713, a crank shaft 710, a connecting rod 720, a flywheel 730, etc.

The crank case 713 is connected to the rear end part 113 of the cylinder 100, and provides a predetermined space to accommodate the crank shaft 710, a crank supporting member (not shown), and other crank parts (not shown) therein. The crank shaft 710 changes the rectilinear reciprocating motion of the piston 200 into the rotary motion, which is rotatably supported by the crank supporting member inside the crank case 713 and gives the rotary motive force to a rotatable body (not shown), e.g., a wheel of a vehicle. The crank shaft 710 circulates regarding the length of a crank arm 711 as a radius and changes the rectilinear reciprocating motion of the piston 200 transferred from the connecting rod 720 (to be described later) into the rotary motion. As shown in FIG. 21, in a rotary heat engine having a plurality of cylinders 100, the directions of the crank arms 711 are misaligned with each other at different angles.

The connecting rod 520 is an element for transferring the motive force based on the rectilinear reciprocating motion of the piston 200 to the crank shaft 710. The connecting rod 720 has the first end 721 coupled to the lower end part 213 of the piston 200 by the hinge 721a, and a second end 722 coupled to the crank arm 711 by a hinge 722a. The connecting rod 720 is thick enough to bear contractile and tensile load, and long enough to transfer the motive force smoothly. In general, the length of the connecting rod 720 may be three to four times greater than the length of the crank arm 711.

The flywheel 730 is a wheel having a large moment of inertia, which is fastened to the crank shaft 710 by a nut 731 in order to make the crank shaft 710 have a constant speed of revolution.

FIGS. 26 to 29 are views for sequentially explaining operations of the heat engine according to this exemplary embodiment of the present invention. Below, operations of heat engine according to this exemplary embodiment will be described in detail with reference to FIGS. 26 to 29.

Figure 26:
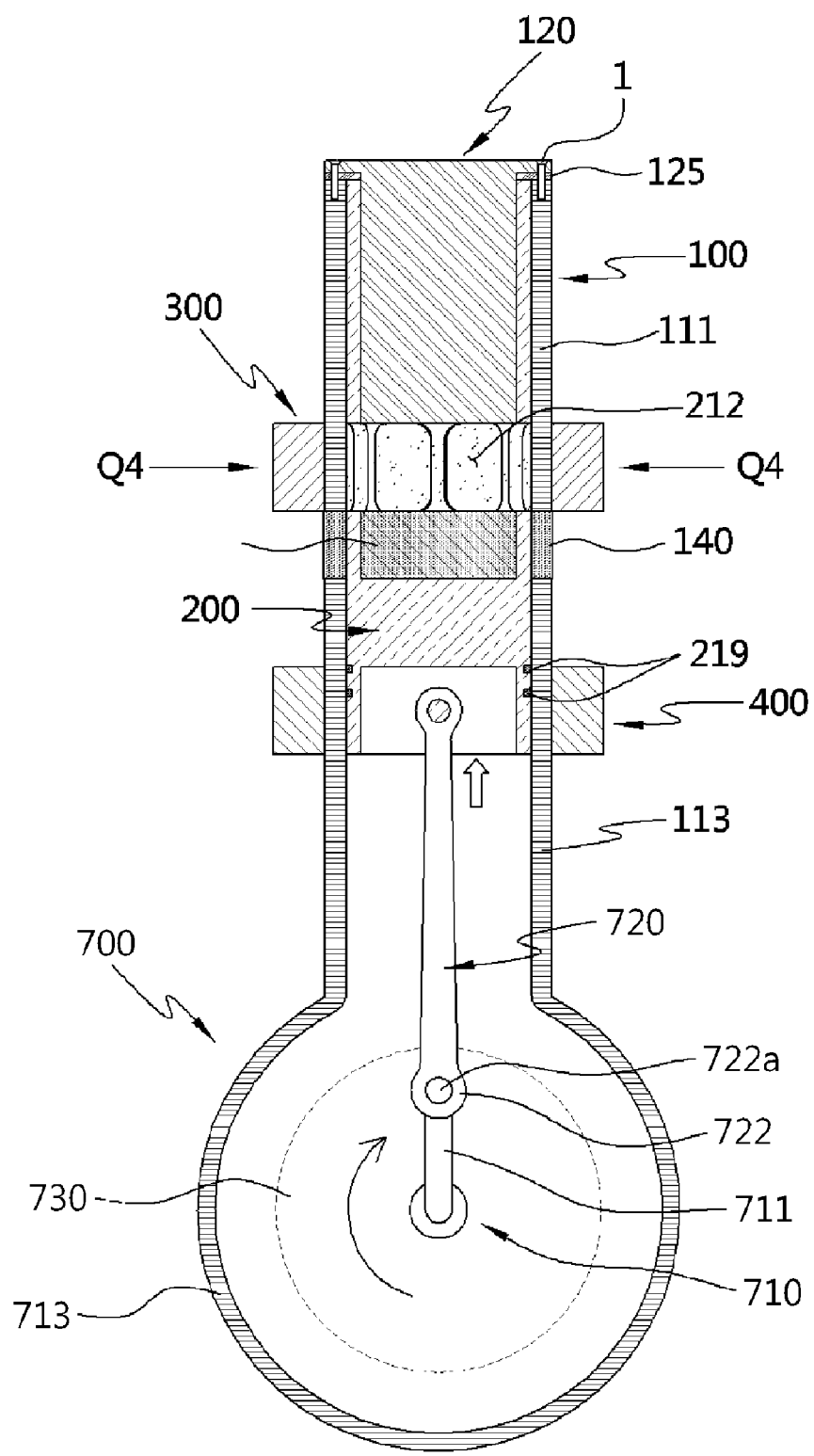
FIGS. 26 to 29 are views for sequentially explaining operations of the heat engine according to this exemplary embodiment of the present invention.

First, as shown in FIG. 26, when the piston 200 moves up and the front end part 211 of the piston 200 is inserted in the guide groove 124 formed between the inner wall of the cylinder 100 and the cylinder head unit 120, that is, if the piston 200 moves until the operating gas hermetically filled in the space between the cylinder 100 and the piston 200 has the minimum volume, the heat opening 212 of the piston 200 is positioned on the high temperature heater 300 of the cylinder 100. In this case, the connecting rod 720 moves up while interlocking with the upward movement of the piston 200, and the crank arm 711 of the crank shaft 710 connected to the connecting rod 720 moves upward and is positioned upward in a direction of 12 o'clock. That is, when the piston 200 moves up to a highest position and the operating gas has the minimum volume, the connecting rod 720 is aligned with the crank arm 511 of the crank shaft 710 in a phase where the crank arm 511 is positioned upward. Also, the operating gas directly contacts the high temperature heater 300 through the heat opening 212 and enters a high-temperature heat compressed state (refer to the high-temperature heat compressing process ④→① of FIG. 19) while absorbing the thermal energy Q4 from the high temperature heater 300. This process is not the same as but approximately equal to the thermodynamic cycles of the Carnot and Stirling engines. Here, the cylinder insulating unit 140 provided between the high temperature heater 300 and the low temperature cooler 400 insulates the heat transfer between the high temperature heater 300 and the low temperature cooler 400.

Figure 27:
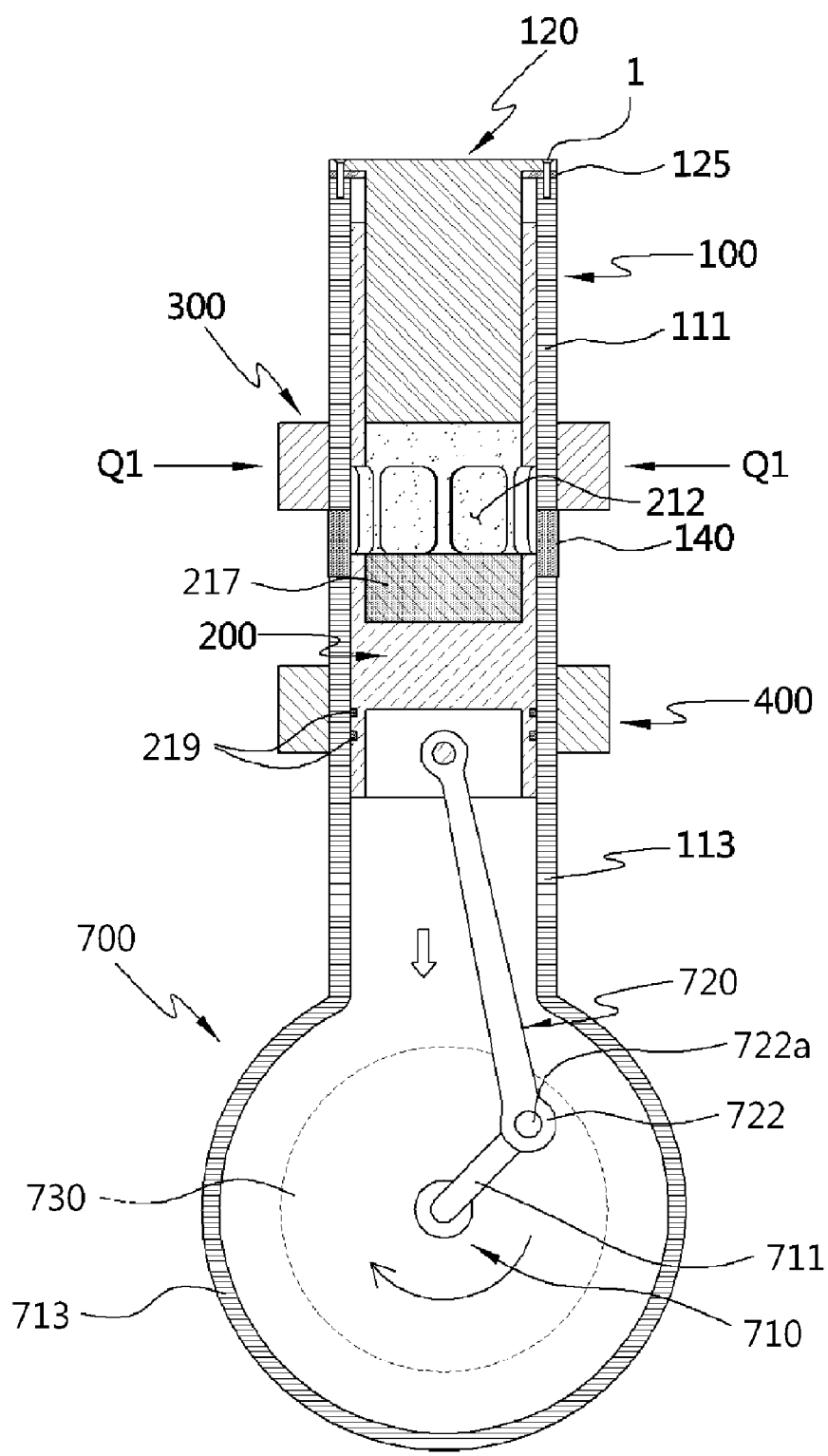

Next, as shown in FIG. 27, while thermal energy Q1 from the high temperature heater 300 is continuously absorbed in the operating gas inside the cylinder 100, molecules of the operating gas increases in molecular motion and their speed increases. The number of times the molecules of the operating gas collide the inner wall of the cylinder 100 increases in accordance with the molecular motion. Thus, if the volume is fixed, even pressure increases within the volume. This pressure pushes down the piston 200 installed inside the cylinder 100 and causes the operating gas to thermally expand at high temperature (refer to high-temperature heat expanding process ①→② of FIG. 19). At this time, the connecting rod 720 moves down while interlocking with the downward movement of the piston 200, and further rotates the crank arm 711 hinge-coupled to the second end 722 of the connecting rod 720 clockwise on the drawings, thereby further rotating the crank shaft 710. This process is the same as the thermodynamic cycle of the Carnot and Stirling engines.

Figure 28:
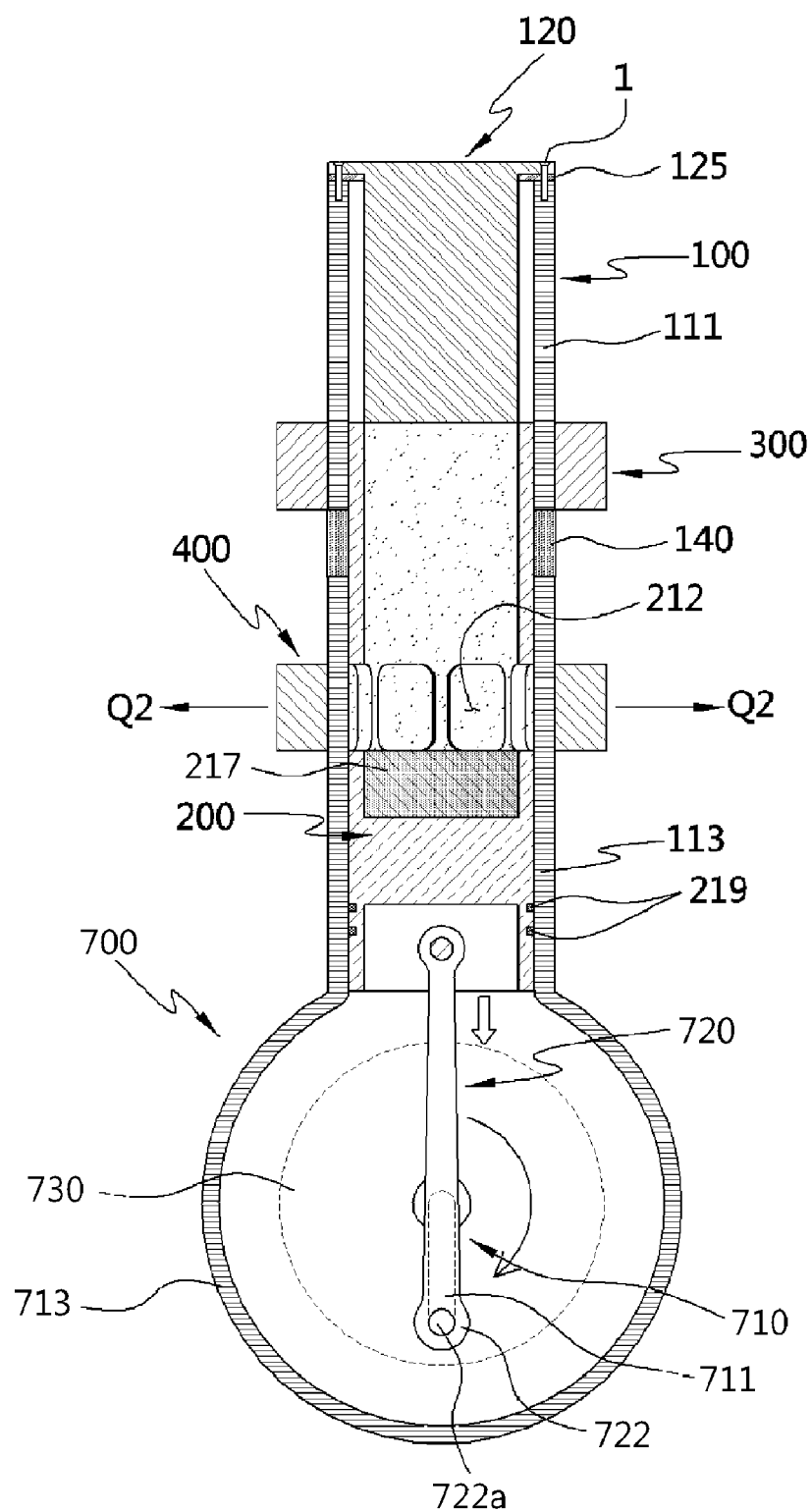

Next, as shown in FIG. 28, the piston 200 moves downward and the heat opening 212 of the piston 200 is positioned on the low temperature cooler 400 when the operating gas has the maximum volume. The operating gas directly contacts the low temperature cooler 400 through the heat opening 212 and is cooled and expanded at low temperature to thereby discharge some internal thermal energy Q2 (refer to the low-temperature cool expanding process ②'→③ of FIG. 19). At this time, the connecting rod 720 moves down to a lowest position while interlocking with the maximum downward movement of the piston 200, and clockwise rotates the crank arm 711 hinge-coupled to the second end 722 of the connecting rod 720 in a direction of 6 o'clock on the drawing, thereby further rotating the crank shaft 710. That is, when the piston 200 moves down at the lowest position and the operating gas has the maximum volume, the connecting rod 720 is aligned with the crank arm 711 of the crank shaft 710 in a phase where the crank arm 711 is positioned downward. This process is not the same as but approximately equal to the thermodynamic cycle of the Carnot and Stirling engines.

Figure 29:
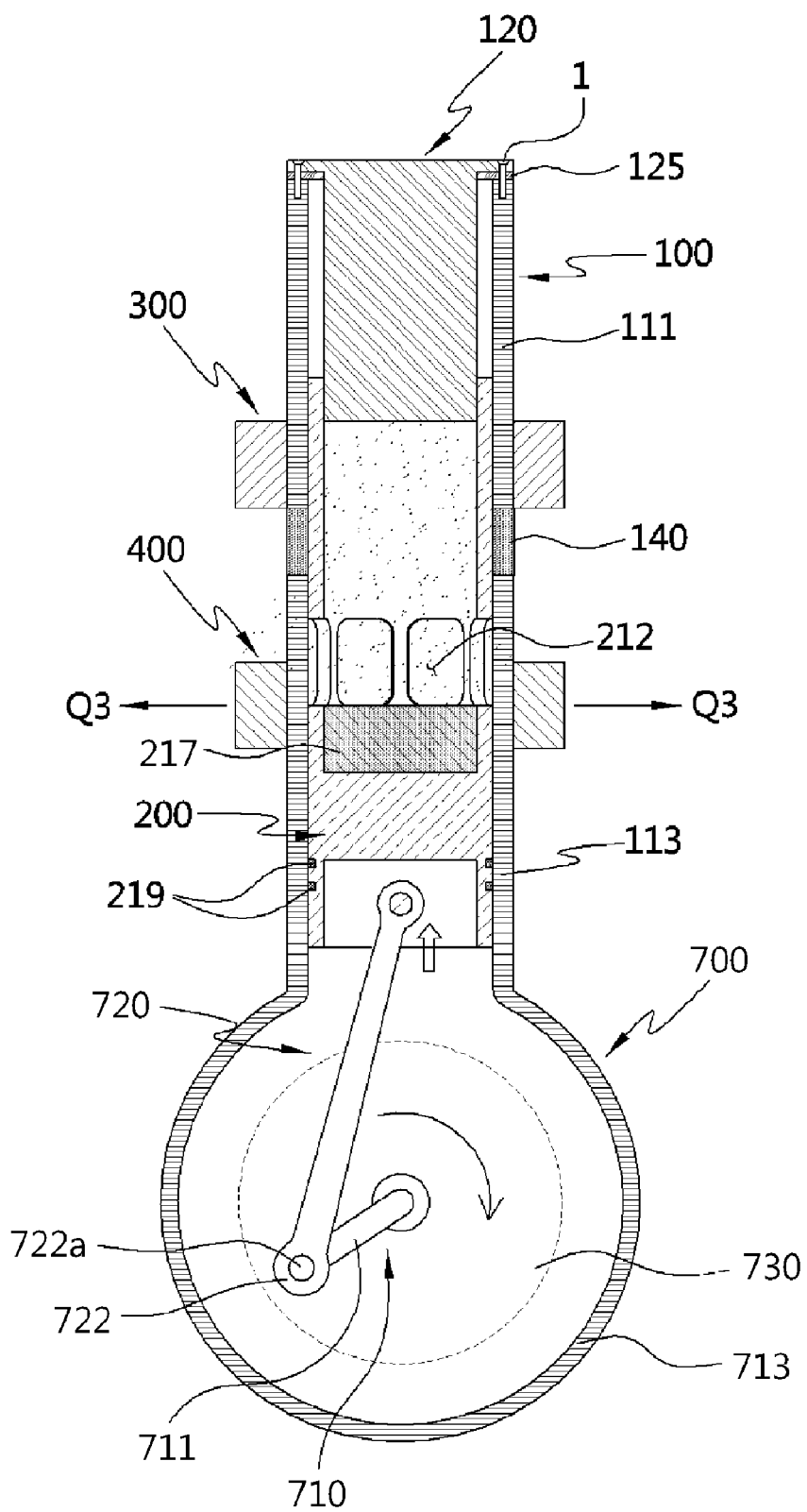

Next, as shown in FIG. 29, the operating gas expanded until having the maximum volume is insulated from the high temperature heater 300 and contacts only the low temperature cooler 400, so that it can be cooled and contracted to thereby move the piston 200 upward and discharge the inner thermal energy Q3 of the operating gas to the outside (refer to the low-temperature cool contracting and expanding process ③→④' of FIG. 19). At this time, the connecting rod 720 moves up while interlocking the upward movement of the piston 200, and further rotates the crank arm 711 hinge-coupled to the second end 722 of the connecting rod 720 clockwise on the drawings, thereby further rotating the crank shaft 710. This process is the same as the thermodynamic cycle of the Carnot and Stirling engines.

If the length of the cylinder insulating unit 140 placed between the high temperature heater 300 and the low temperature cooler 400 is longer than the length of the heat opening 212 of the piston 200, an instant adiabatic process exists (refer to processes ②→②', ④'→④ of FIG. 19), thereby completing the whole thermodynamic cycle of ①→②→②'→③→④'→④→① as shown in FIG. 19. If the length of the cylinder insulating unit 140 between the high temperature heater 300 and the low temperature cooler 400 is equal to the length of the heat opening 212 of the piston 200, an ideal thermodynamic cycle having no adiabatic process (②=②', ④'=④) follows as shown in FIG. 20. If the length of the cylinder insulating unit 140 between the high temperature heater 300 and the low temperature cooler 400 is shorter than the length of the heat opening 212 of the piston 200, the heat opening 212 contacts both the high temperature heater 300 and the low temperature cooler 400, so that the operating gas is both heated and cooled and thus has an effect similar to an adiabatic effect. At this time, the thermodynamic cycle is similar to a cycle of ①→②→②'→③→④'→④→① of FIG. 19.

As described above, in the heat engine 40 according to this exemplary embodiment, the operating gas such as hydrogen, helium, etc. is hermetically filled in the spaced formed by the cylinder 100 and the piston 200, and is heated and cooled at the exterior. Thus, the operating gas is thermally expanded or contracted while repeating the processes as shown in FIGS. 26 to 29, and thus rectilinearly reciprocates the piston 200. Also, the rectilinear reciprocating motion of the piston 200 is changed into the rotary motion by the converter 700 including the crank shaft 710 and the connecting rod 720. With this, the thermal efficiency of the heat engine 40 according to this exemplary embodiment of the present invention is the same as shown in the [Expression 1], and the heat engine 40 can have a form nearly similar to an intermediate form between the ideal Carnot engine and Stirling engine.

Figure 30:
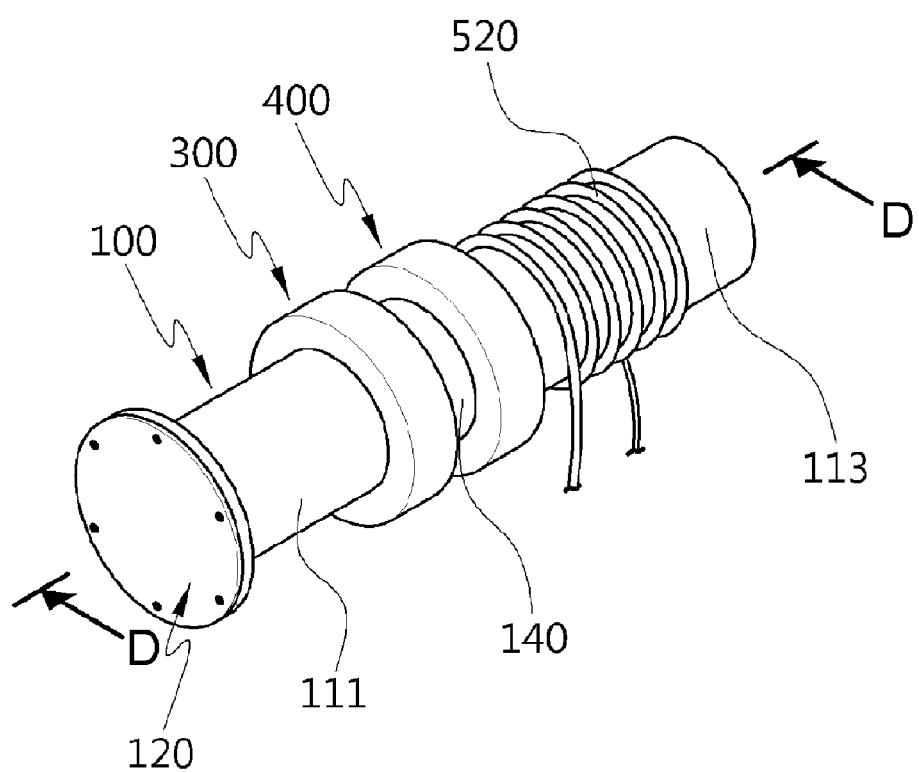
FIG. 30 is a perspective view schematically showing a heat engine according to still another exemplary embodiment of the present invention.
Figure 31:
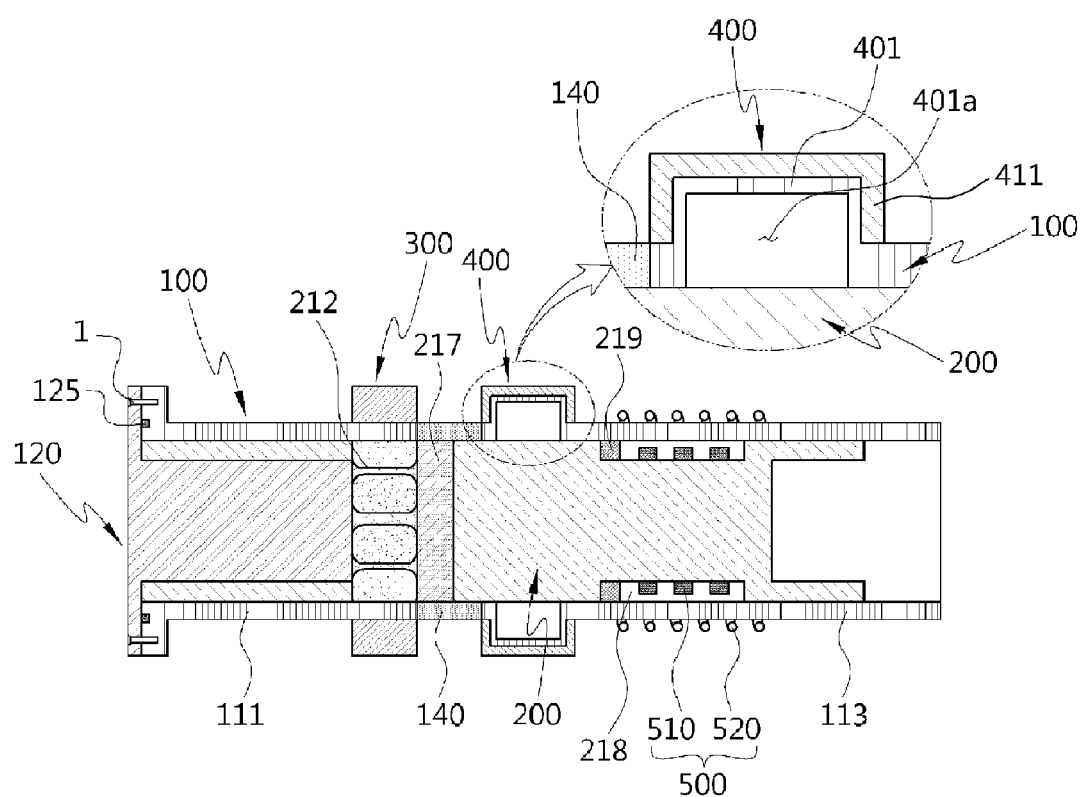
FIGS. 31 and 32 are views showing first and second exemplary embodiments of a cooling chamber included in the heat engine according to still another exemplary embodiment, which are cross-section views taken along line D-D of FIG. 1.
Figure 32:
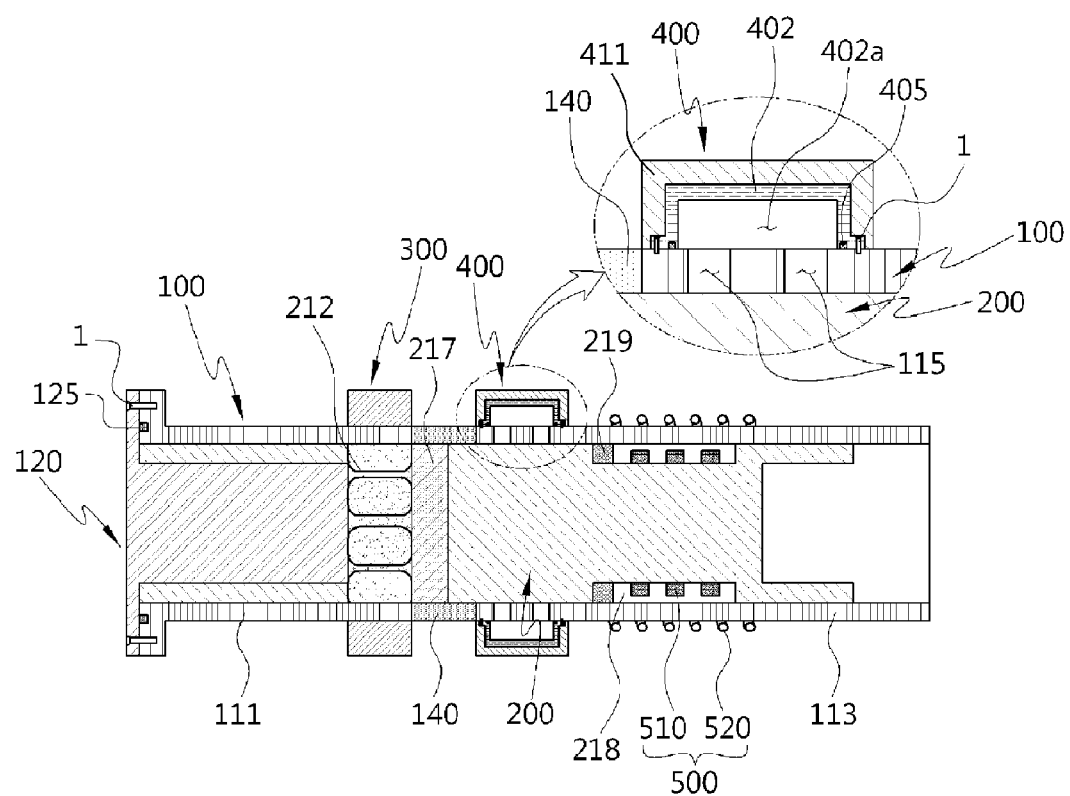
Figure 33:
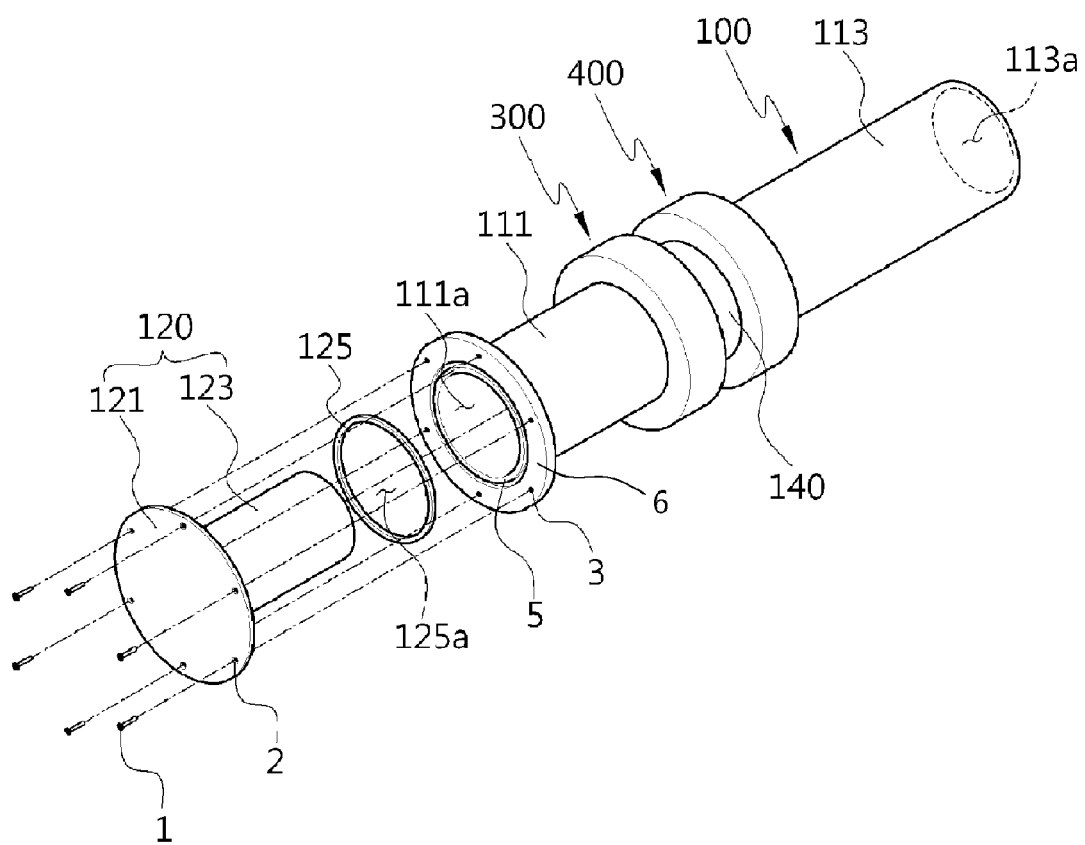
FIG. 33 is a perspective view of a cylinder in the heat engine according to still another exemplary embodiment of the present invention.
Figure 34:
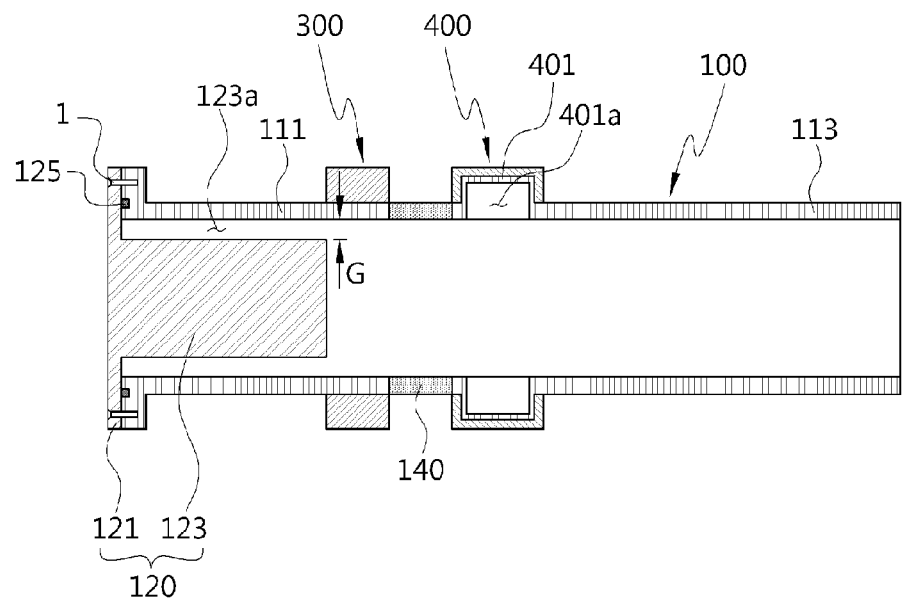
FIG. 34 is a cross-section view of the cylinder in the heat engine according to still another exemplary embodiment of the present invention.
Figure 35:
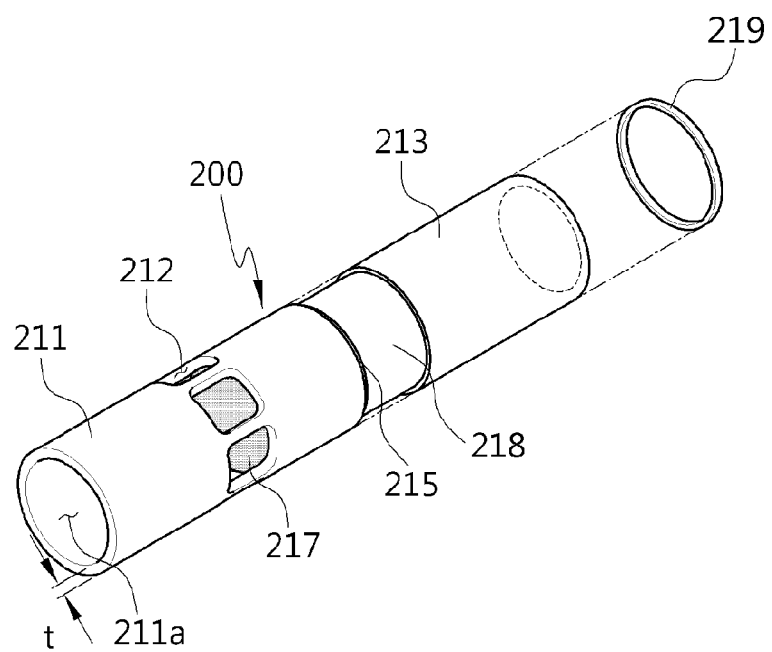
FIG. 35 is a perspective view of a piston in the heat engine according to still another exemplary embodiment of the present invention.
Figure 36:
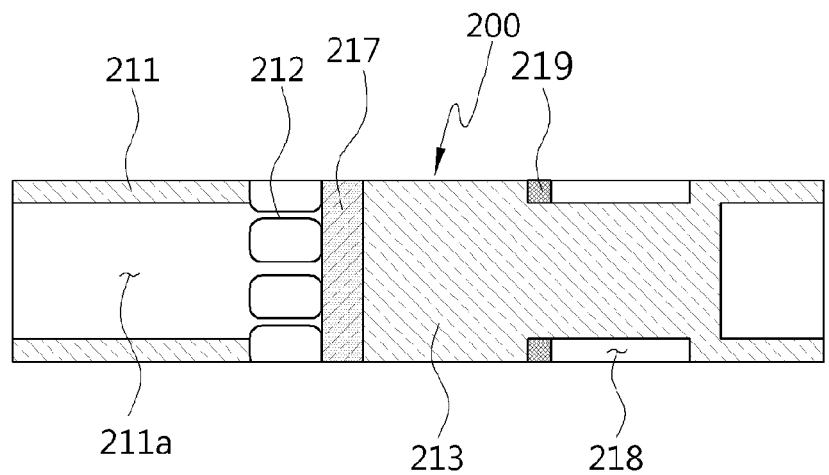
FIG. 36 is a cross-section view of the piston in the heat engine according to still another exemplary embodiment of the present invention.

FIG. 30 is a perspective view schematically showing a heat engine according to still another exemplary embodiment of the present invention, FIGS. 31 and 32 are views showing first and second exemplary embodiments of a cooling chamber included in the heat engine according to still another exemplary embodiment, which are cross-section views taken along line D-D of FIG. 1, FIG. 33 is a perspective view of a cylinder in the heat engine according to still another exemplary embodiment of the present invention, FIG. 34 is a cross-section view of the cylinder in the heat engine according to still another exemplary embodiment of the present invention, FIG. 35 is a perspective view of a piston in the heat engine according to still another exemplary embodiment of the present invention, FIG. 36 is a cross-section view of the piston in the heat engine according to still another exemplary embodiment of the present invention.

As shown in FIGS. 30 to 36, a heat engine according to this exemplary embodiment includes a cylinder 100, a piston 200, a high temperature heater 300, and a low temperature cooler 400 including a cooling chamber 401, 402.

Hereinafter, the present exemplary embodiment will be described with reference to FIGS. 30 to 36. In this case, the same elements as those of the foregoing exemplary embodiments will not be repetitively described. If there is no description with respect to some elements, they will be regarded as the same elements as those of the foregoing exemplary embodiments. The following descriptions will be accomplished focusing on distinctive elements.

According to this exemplary embodiment, a front end part 111 of the cylinder 100 may be opened outward. In this case, the heat engine 50 may further include a cylinder head unit 120 to hermetically close up the opened front end part 111 of the cylinder 100. Alternatively, there may be proposed a cylinder having a hermetically closed front end part.

The cylinder head unit 120 is coupled to the front end part 111 of the cylinder 100 and closes up an opening 111a of the front end part 111 of the cylinder 100. In this case, the front end part 111 of the cylinder 100 coupling with the head cover 121 of the cylinder head unit 120 may be formed with a flange 6 at one side thereof.

The flange 6 may be formed with a plurality of bolt holes 3 to which bolts 1 are fastened when coupled with the cylinder head unit 120. Also, the flange 6 may be formed with a ring-shaped sealing groove 5 in which a sealing member 125 can be inserted and received.

The high temperature heater 300 is an element for heating the front end part 111 of the cylinder 100 and expanding the operating gas. The high temperature heater 300 is made of metal having good heat transfer efficiency, and provided in the form of a ring on the outer circumference of the cylinder 100, but not limited thereto. Alternatively, the high temperature heater 300 may be selectively embodied in various forms.

In this case, the length of the high temperature heater 300 may be equal to or a little longer than the length of the heat opening 212. For example, the length of the high temperature heater 300 may be equal to each length of the heat opening 212, the low temperature cooler 400 and the cylinder insulating unit 140.

The high temperature heater 300 may have various forms. For example, the high temperature heater 300 may be achieved by the foregoing forms 310, 320, 330 as shown in FIGS. 7 to 9.

Figure 37:
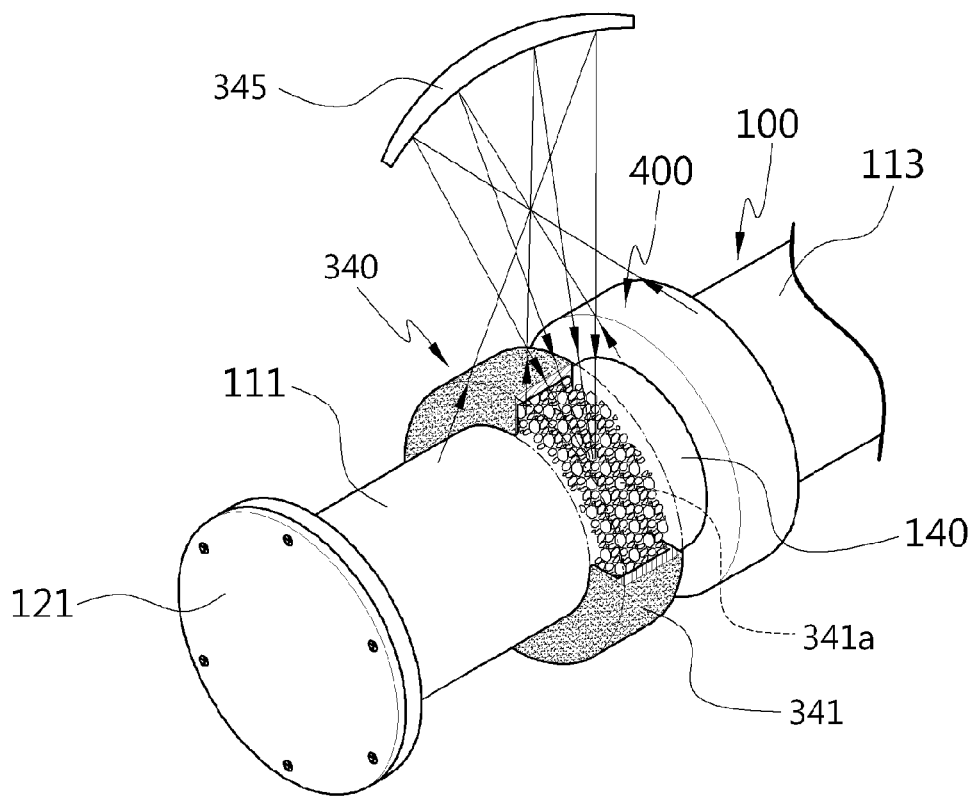
FIG. 37 is a partial perspective view showing a fourth exemplary embodiment of a high temperature heater in the heat engine according to still another exemplary embodiment of the present invention.

Alternatively, as shown in FIG. 37, the high temperature heater 340 may use molten salt as a heat storage material and thus heat the front end part 111 of the cylinder 100. To this end, the high temperature heater 340 may be provided in the form of a ring on the outer circumference of the front end part 111 of the cylinder 100, and include a heat storage chamber 241 to accommodate therein the molten salt 341a used as the heat storage material. Here, the molten salt 341a, e.g., $NaAlCl_4$, is a kind of salt that generates heat while being melted from a solid to a liquid, which can be used in various fields. For example, the molten salt 241 may be used as a thermal energy storage medium, used as a heat transfer material in a heating reservoir, used for blanketing and refining molten metal, used in electric coating for a high temperature molten material, used as melting electrolytes in a primary battery, used as a rechargeable sodium battery, etc. The heat storage chamber 341 may be formed as a black body to enhance capacity for absorbing the thermal energy transferred from a sunlight concentrating module 345.

The low temperature cooler 400 is an element for cooling the rear end part 13 of the cylinder 100 and contracting the operating gas thermally expanded by the high temperature heater 300. In this exemplary embodiment, the low temperature cooler 400 may include a cooling chamber 401, 402 placed at the rear end part 113 of the cylinder 100.

The cooling chamber 401, 402 includes a cooling space 401a, 402a for cooling the operating gas inside the cylinder 100, and the cooling space 401a, 402a is formed to communicate with the inside of the cylinder 100. Here, the cooling space 401a, 402a may have the same length as the heat opening 212.

Referring to FIG. 31, the cooling chamber 401 may be formed integrally with the cylinder 100 by extending a part of the outer circumference of the rear end part 113 of the cylinder 100 in a radius direction. Alternatively, referring to FIG. 32, the cooling chamber 402 may be installed in the form of a ring having a cooling space on the outer circumference of the rear end part 113 of the cylinder 100. In this case, the cooling chamber 402 may be coupled to the cylinder 100 by a fastening means such as a bolt 1, a rivet, welding, etc. Also, in this case, the low temperature cooler 400 may further include at least one sealing member 405 installed in a contact part between the cylinder 100 and the cooling chamber 402. Further, at least one chamber communicating hole 115 may be formed in the rear end part 113 of the cylinder 100 and communicate the cooling space 402a and the inside of the cylinder 100 with each other.

Figure 38:
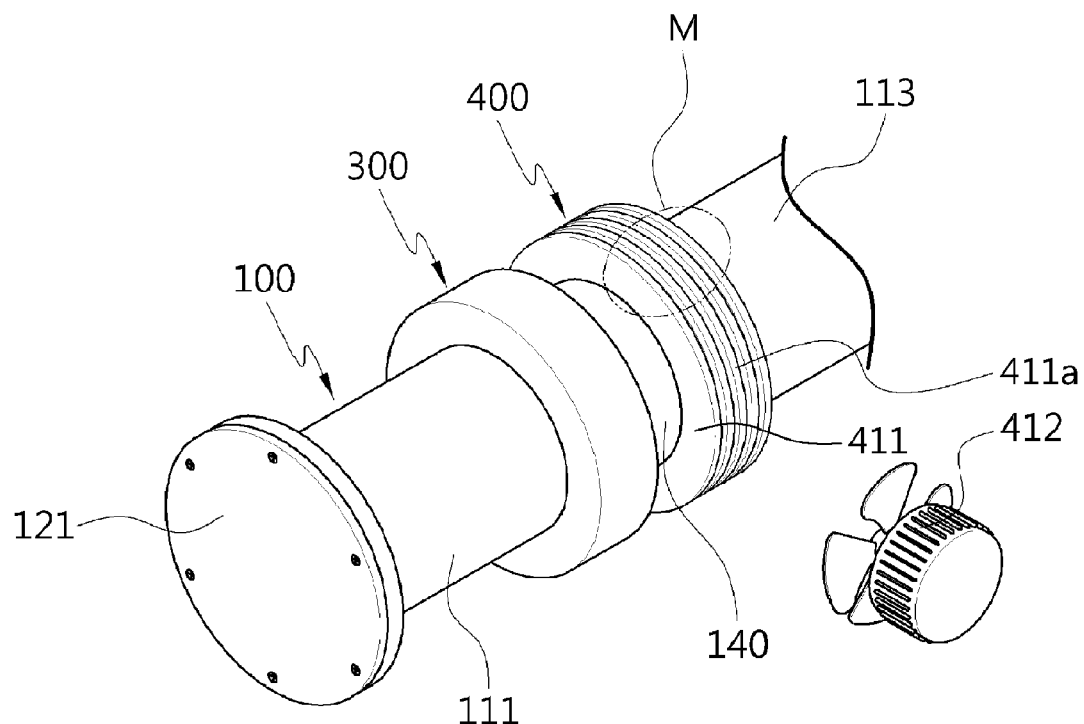
FIG. 38 is a partial perspective view showing a first exemplary embodiment of a low temperature cooler including a cooling chamber in the heat engine according to still another exemplary embodiment of the present invention.
Figure 39:
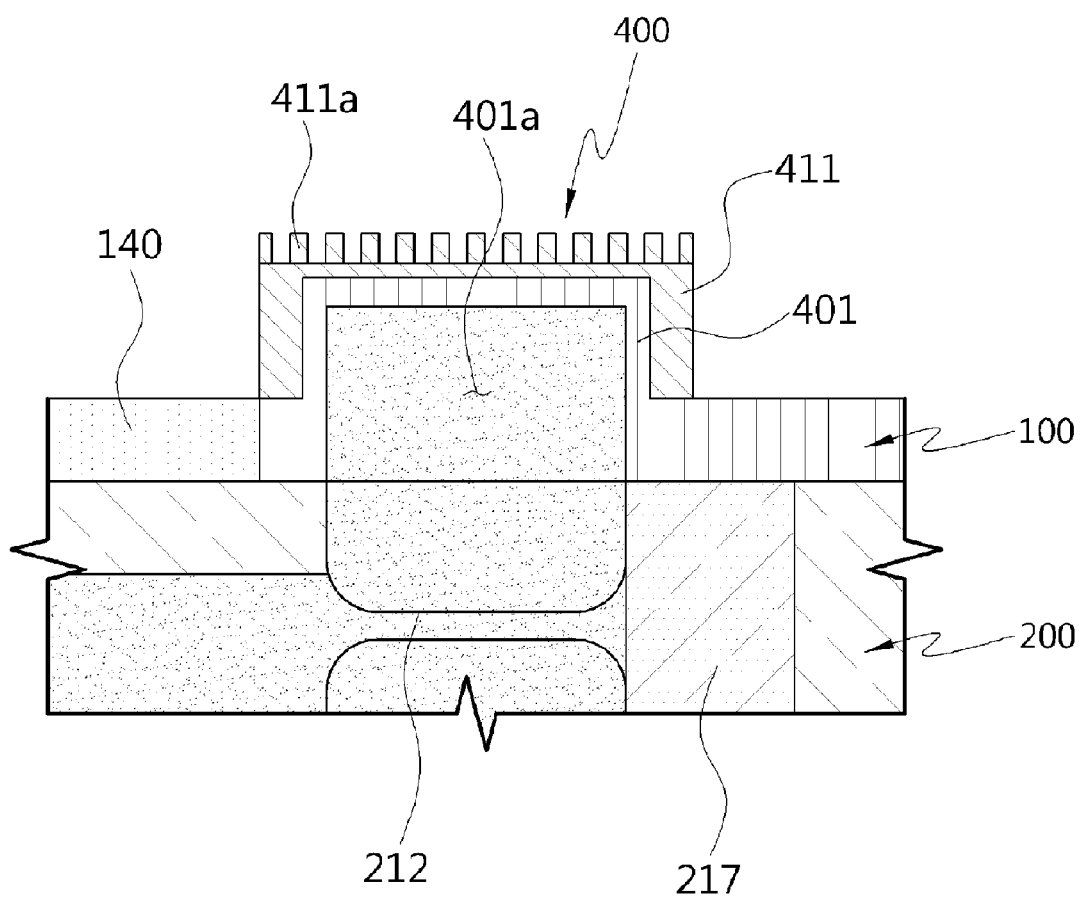
FIG. 39 is a cross-section view of an 'M' part in FIG. 38.
Figure 40:
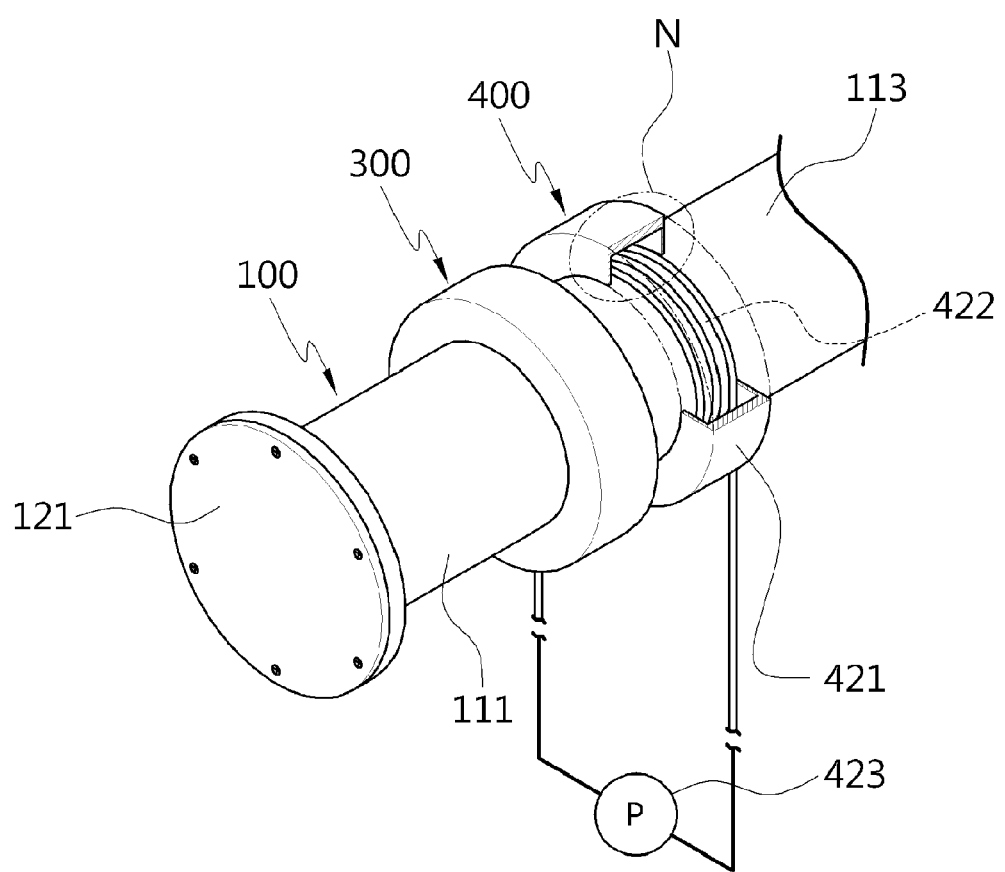
FIG. 40 is a partial perspective view showing a second exemplary embodiment of a low temperature cooler including a cooling chamber in the heat engine according to still another exemplary embodiment of the present invention.
Figure 41:
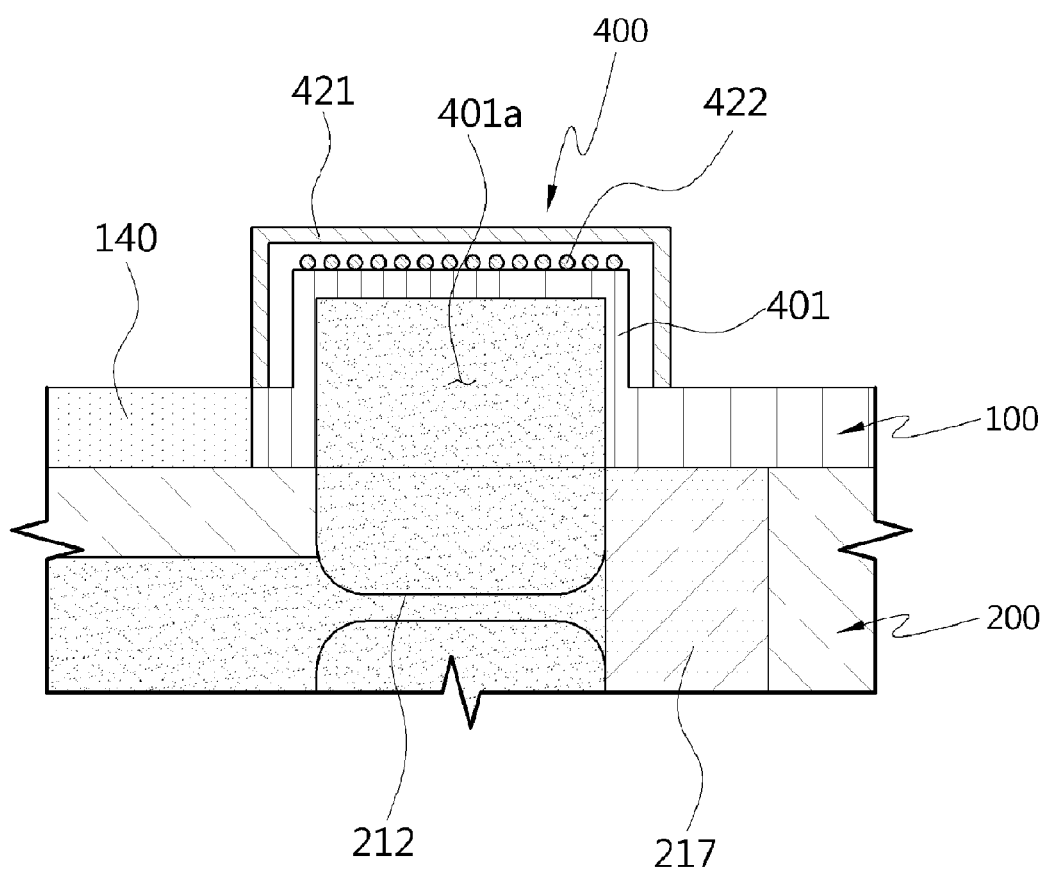
FIG. 41 is a cross-section view of an 'N' part in FIG. 40.

Referring to FIGS. 38 and 39, various exemplary embodiments of the low temperature cooler in the heat engine according to the present exemplary embodiment will be described in detail as follows.

As shown in FIGS. 38 and 39, the low temperature cooler 400 may be achieved by an air-cooling type, which includes a housing 411 formed to surround the outside of the cooling chamber 401, a plurality of cooling fins 411a formed on the outer circumference of the housing 411, and a cooling fan 412 for blowing air to and cooling the housing 411. Here, the cooling fin 411a may be unevenly formed on the housing 411 to increase an area to contact the air so that cooling can be more quickly carried out under the atmosphere.

Also, as shown in FIG. 11, the low temperature cooler 400 may be achieved by a water-cooling type, which includes a tub housing 421 placed in the form of a ring on the outer circumference of the rear end part 113 of the cylinder 100 and surround the outside of the inner cooling chamber 401, a cooling tube 422 placed inside a tube housing 421 and wound on the outer wall of the cooling chamber 401, and a cooling pump 423 supplying cooling water to the cooling tube 422.

The heat engine 50 in this exemplary embodiment may further include a generator 500. The generator 500 is an element that transforms the mechanical energy based on the rectilinear reciprocating motion of the piston 200 into the electric energy, which may include a magnet 510, a coil 520, etc.

In the present exemplary embodiment, the high temperature heater 300, the low temperature cooler 400, the cylinder insulating unit 140 and the heat opening 212 are formed to have one length, so that the operating gas can be efficiently thermally expanded or contracted when directly heated or cooled at the exterior while following the thermodynamic cycle as shown in FIG. 20, thereby rectilinearly reciprocating the piston 200. Here, the length of the high temperature heater 300 and the low temperature cooler 400 may be equal to or a little larger than those of the cylinder insulating unit 140 and the heat opening 212.

Figure 42:
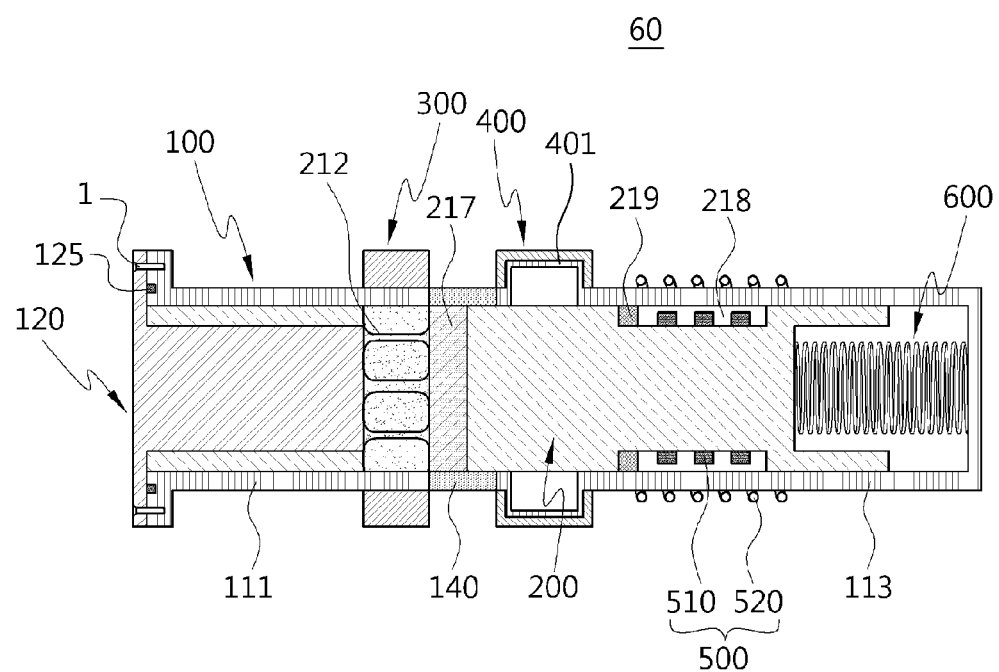
FIG. 42 is a cross-section view schematically showing a heat engine according to still another exemplary embodiment of the present invention.

FIG. 42 is a cross-section view schematically showing a heat engine according to still another exemplary embodiment of the present invention. As shown in FIG. 42, a heat engine 60 according to still another exemplary embodiment of the present invention is the same as the heat engine 30 according to the foregoing exemplary embodiments except the low temperature cooler 400 includes the cooling chamber 401.

In the heat engine 60 according to still another exemplary embodiment of the present invention, the descriptions of the low temperature cooler 400 and the cooling chamber 401 will be replaced by those for the heat engine 50 according to the foregoing exemplary embodiment.

FIGS. 43 to 46 are views for sequentially explaining operations of the heat engine according to still another exemplary embodiment of the present invention. Below, the operations of the heat engine according to this exemplary embodiment will be described with reference to FIGS. 43 to 46.

Figure 43:
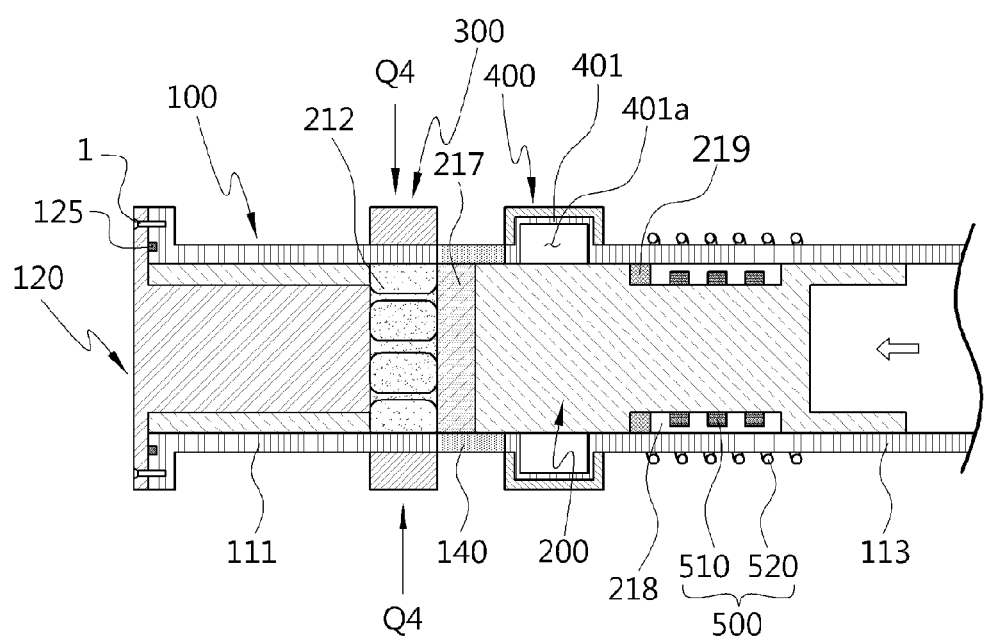

First, as shown in FIG. 43, when the piston 200 moves leftward and the front end part 211 of the piston 200 is inserted in the guide groove 123a formed between the inner wall of the cylinder 100 and the cylinder head unit 120, that is, if the piston 200 moves until the operating gas hermetically filled in the space between the cylinder 100 and the piston 200 has the minimum volume, the heat opening 212 of the piston 200 is positioned on the high temperature heater 300 of the cylinder 100. Such position adjustment of the piston 200 may be based on a driving force generated by the Fleming's left-hand rule as a line of magnetic force of the magnet 510 is varied when an electric current flows in the coil 520 of the generator 500.

In the case where the heat opening 212 of the piston 200 is positioned on the high temperature heater 300 of the cylinder 100, the operating gas directly contacts the high temperature heater 300 through the heat opening 212 and is thermally compressed at high temperature while absorbing thermal energy Q4 from the high temperature heater 300 (refer to high-temperature heat compressing process ④→① of FIG. 19). This process is not the same as but approximately equal to the thermodynamic cycles of the Carnot and Stirling engines. Here, the cylinder insulating unit 140 provided between the high temperature heater 300 and the low temperature cooler 400 insulates the heat transfer between the high temperature heater 300 and the low temperature cooler 400.

Next, as shown in FIG. 44, while thermal energy Q1 from the high temperature heater 300 is continuously absorbed in the operating gas inside the cylinder 100, molecules of the operating gas increases in molecular motion and their speed increases. The number of times the molecules of the operating gas collide the inner wall of the cylinder 100 increases in accordance with the molecular motion. Thus, if the volume is fixed, even pressure increases within the volume. This pressure pushes leftward the piston 200 installed inside the cylinder 100 and causes the operating gas to thermally expand at high temperature (refer to high-temperature heat expanding process ①→② of FIG. 19). This process is the same as the thermodynamic cycle of the Carnot and Stirling engines.

Next, as shown in FIG. 45, the piston 200 moves rightward and the heat opening 212 of the piston 200 is positioned on the low temperature cooler 400 when the operating gas has the maximum volume. The operating gas inside the cylinder directly contacts the cooling chamber 410 of the low temperature cooler 400 through the heat opening 212. At this time, the operating gas heated by the high temperature heater 300 at high temperature inside the cylinder 100 is cooled and expanded to thereby rapidly decrease in pressure since it meets the operating gas cooled by the cooling chamber 401 placed inside the low temperature cooler 400 at low temperature and a turbulent flow is caused by difference in temperature and pressure. Therefore, the rectilinear reciprocating motion of the piston can be more actively achieved. Further, At this time, the temperature of the operating gas is still higher than that of the low temperature cooler 400, so that some of inner thermal energy Q1 is discharged to the outside (refer to low-temperature cool expanding process ②'→③ of FIG. 19). This process is not the same as but approximately equal to the thermodynamic cycle of the Carnot and Stirling engines.

Figure 46:
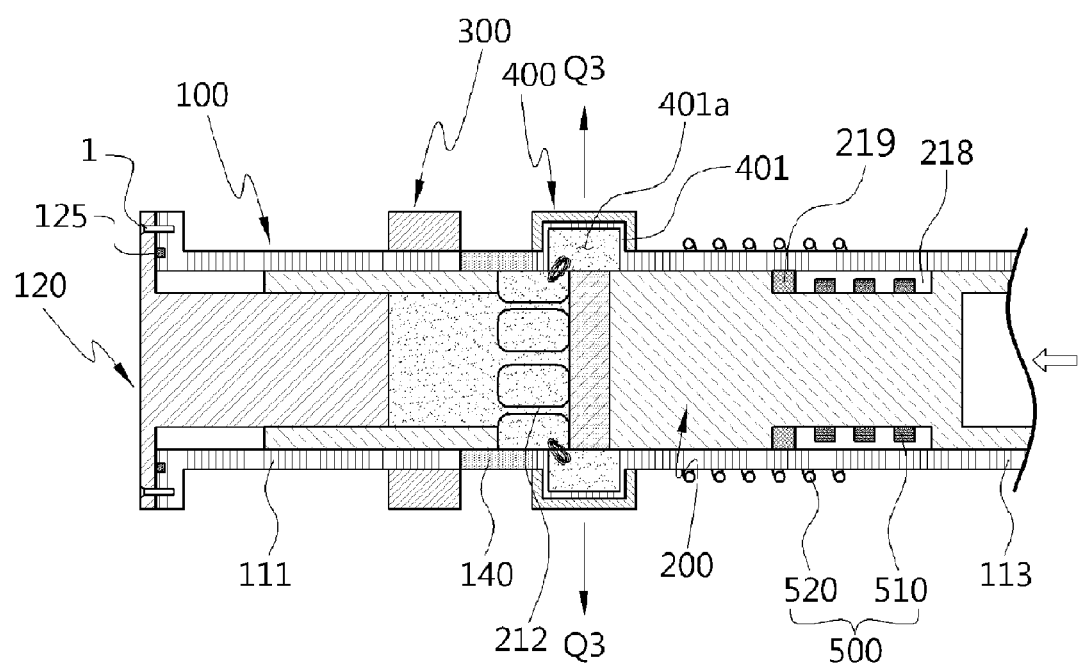

Next, as shown in FIG. 46, the operating gas expanded until having the maximum volume is insulated from the high temperature heater 300 and contacts only the cooling chamber 401 of the low temperature cooler 400, so that it can be cooled and contracted to thereby move the piston 200 leftward. At this time, the inner thermal energy Q3 of the operating gas is discharged to the outside (refer to low-temperature cool contracting and expanding process ③→④' of FIG. 19). This process is the same as the thermodynamic cycle of the Carnot and Stirling engines.

If the length of the cylinder insulating unit 140 between the high temperature heater 300 and the low temperature cooler 400 is longer than the length of the heat opening 212 of the piston 200, an instant adiabatic process exists (refer to processes ②→②', ④'→④ of FIG. 19), thereby completing the whole thermodynamic cycle of ①→②→②'→③→④'→④→① as shown in FIG. 19. If the length of the cylinder insulating unit 140 is equal to the length of the heat opening 212 of the piston 200, an ideal thermodynamic cycle having no adiabatic process (②=②', ④'=④) follows as shown in FIG. 20. If the length of the cylinder insulating unit 140 is shorter than the length of the heat opening 212 of the piston 200, the heat opening 212 contacts both the high temperature heater 300 and the low temperature cooler 400, so that the operating gas is both heated and cooled and thus has an effect similar to an adiabatic effect. At this time, a thermodynamic cycle (not shown) is similar to a cycle of ①→②→②'→③→④'→④→① of FIG. 19.

In the foregoing heat engine 10 according to an exemplary embodiment of the present invention, the space formed by the cylinder 100 and the piston 200 is hermetically filled with the operating gas such as hydrogen, helium, etc., and heated and cooled at the exterior, so that the operating gas can be thermally expanded or contracted while repeating the processes as shown in FIGS. 43 to 46, thereby rectilinearly reciprocating the piston 200. Also, the cooling chamber 401, 402 cooling and contracting the operating gas filled in the cylinder 100 is provided inside the low temperature cooler 400. In result, the operating gas heated and thermally expanded by the high temperature heater 300 at high temperature inside the cylinder 100 is cooled to thereby rapidly decrease in pressure and be thermally contracted since it meets the operating gas cooled by the cooling chamber 401, 402 placed inside the low temperature cooler 400 at low temperature and a turbulent flow is actively caused by difference in temperature and pressure. Therefore, the rectilinear reciprocating motion of the piston can be more actively achieved, thereby enhancing the thermal efficiency of the heat engine. Also, the mechanical energy based on the rectilinear reciprocating motion of the piston 200 is changed into the electric energy by the generator 500.

With this, the thermal efficiency of the heat engine 50 according to this exemplary embodiment of the present invention is the same as shown in the [Expression 1]. As shown in the [Expression 1], the heat engine 50 according to this exemplary embodiment is an external-combustion engine nearly similar to an intermediate form between the ideal Carnot engine and Stirling engine, so that high thermal efficiency can be expected.

Figure 47:
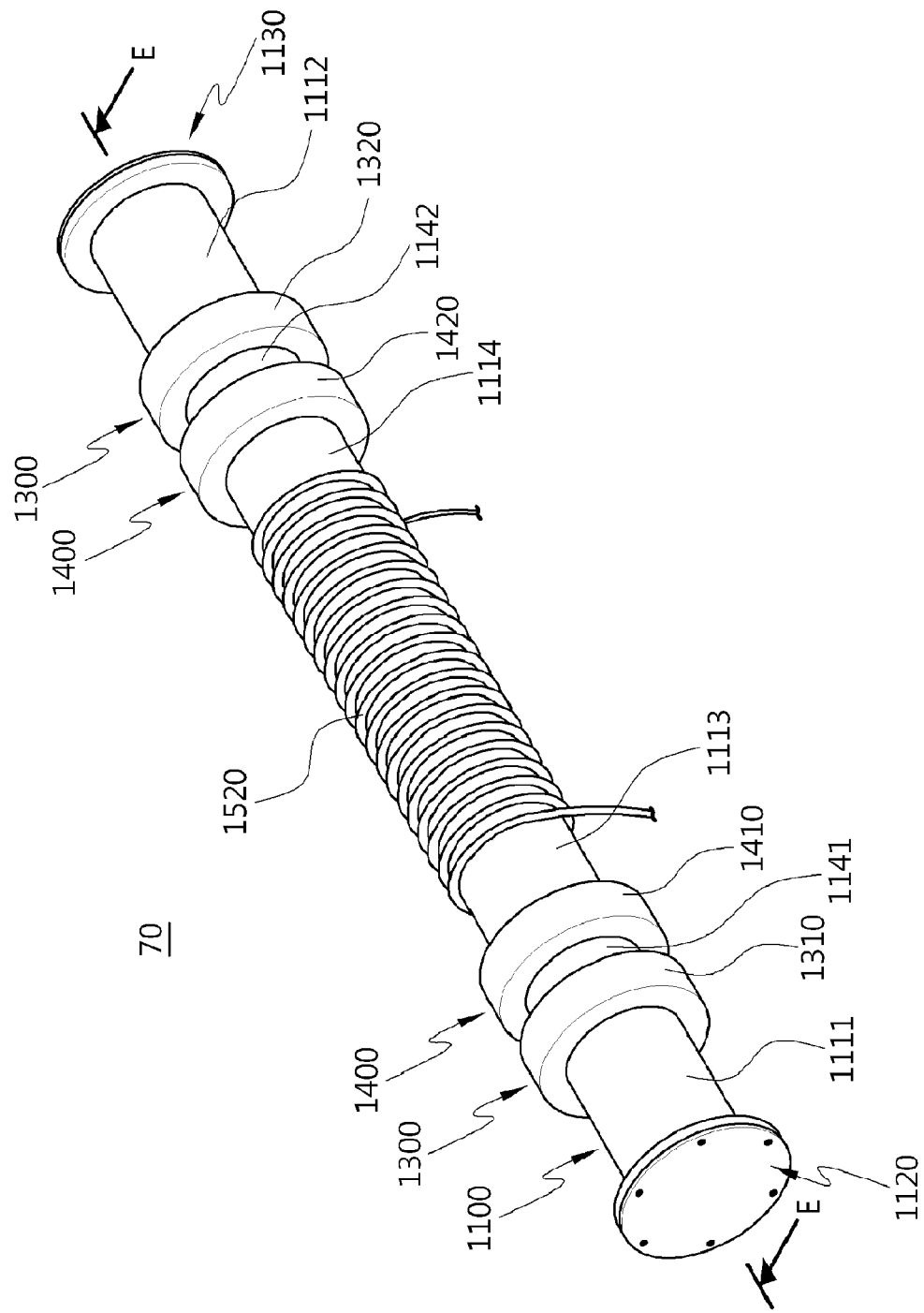
FIG. 47 is a perspective view schematically showing a heat engine according to still another exemplary embodiment of the present invention.
Figure 48:
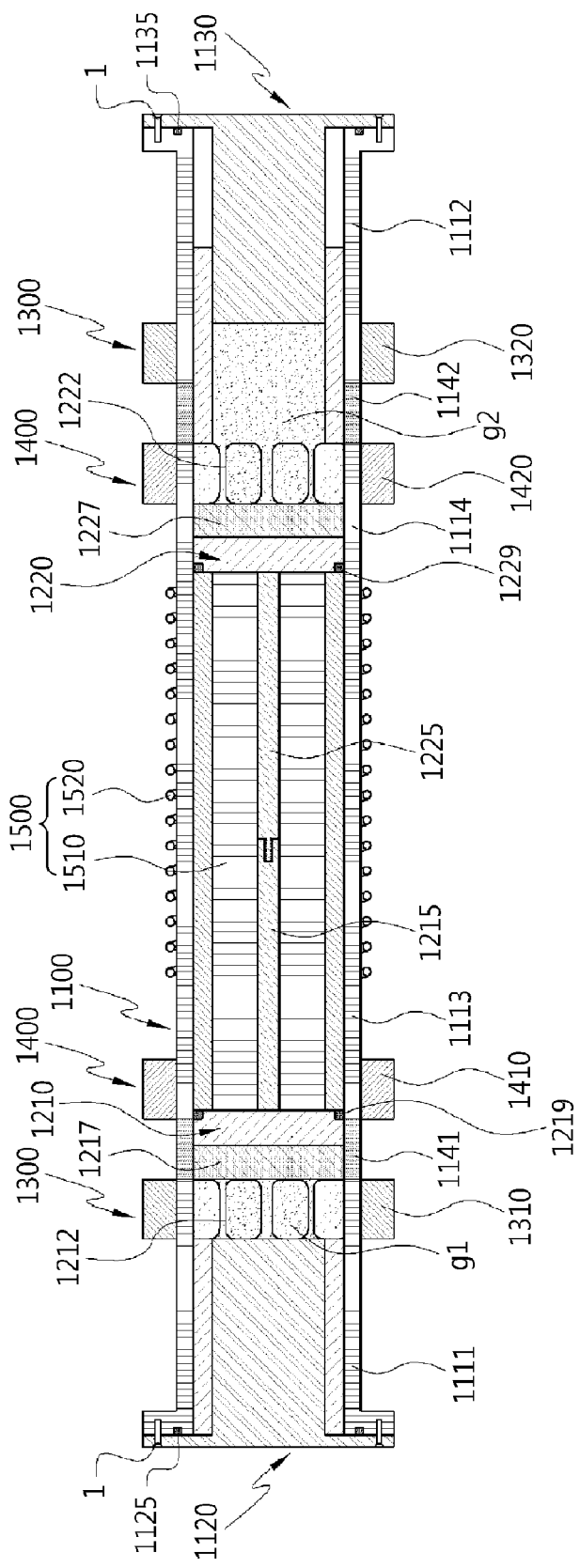
FIG. 48 is a cross-section view taken along line E-E of FIG. 47.
Figure 49:
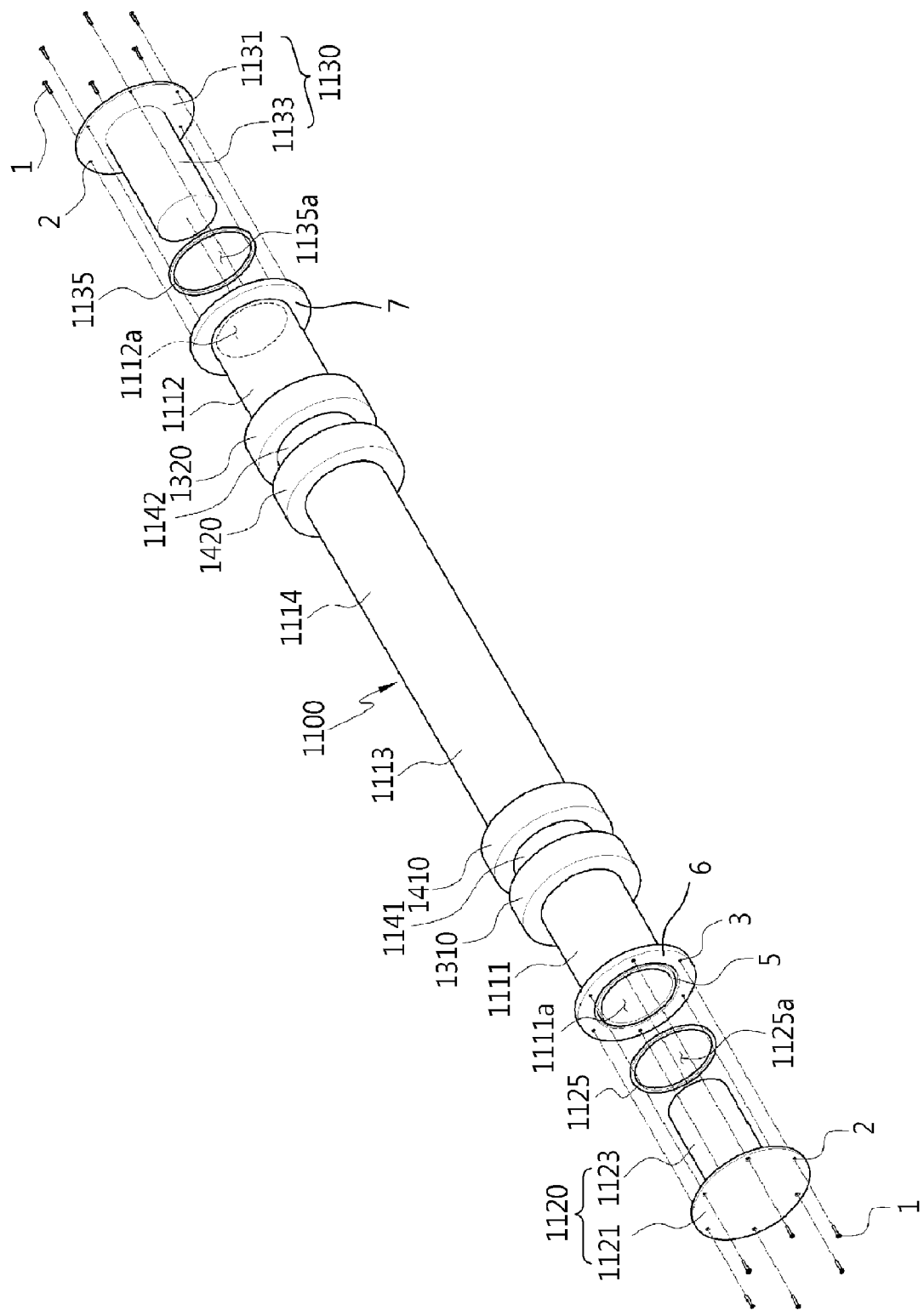
FIG. 49 is a perspective view of a cylinder in the heat engine according to still another exemplary embodiment of the present invention.
Figure 50:
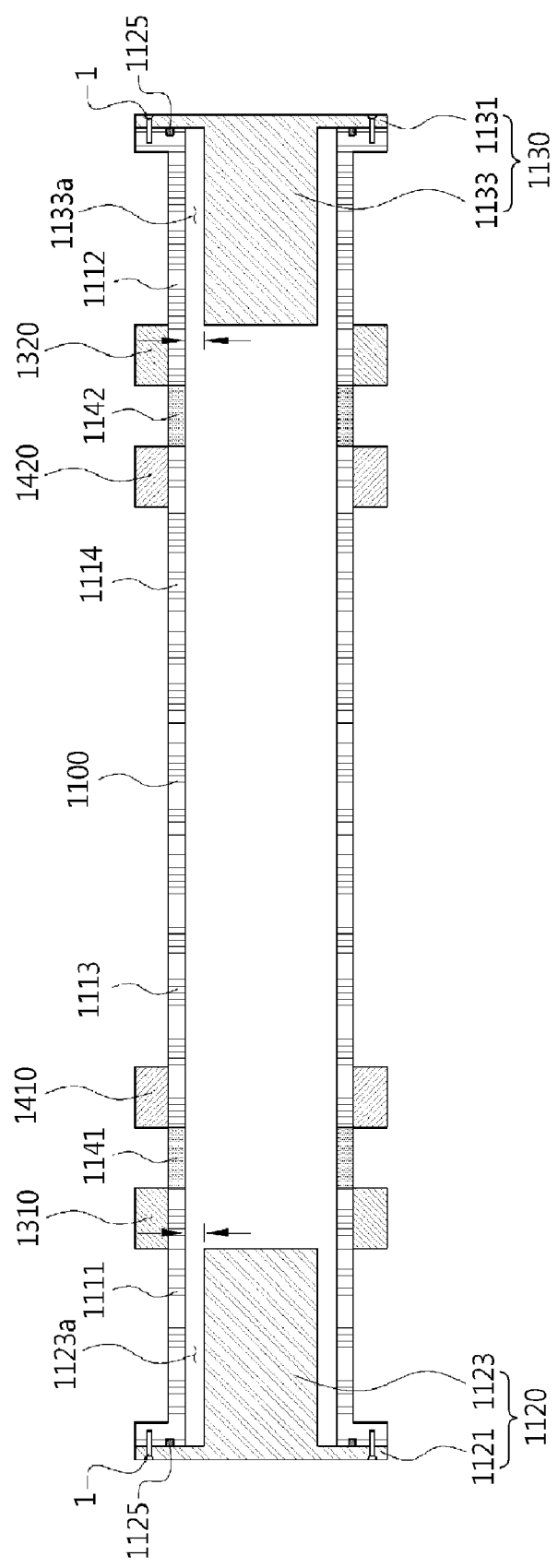
FIG. 50 is a cross-section view of the cylinder in the heat engine according to still another exemplary embodiment of the present invention.
Figure 51:
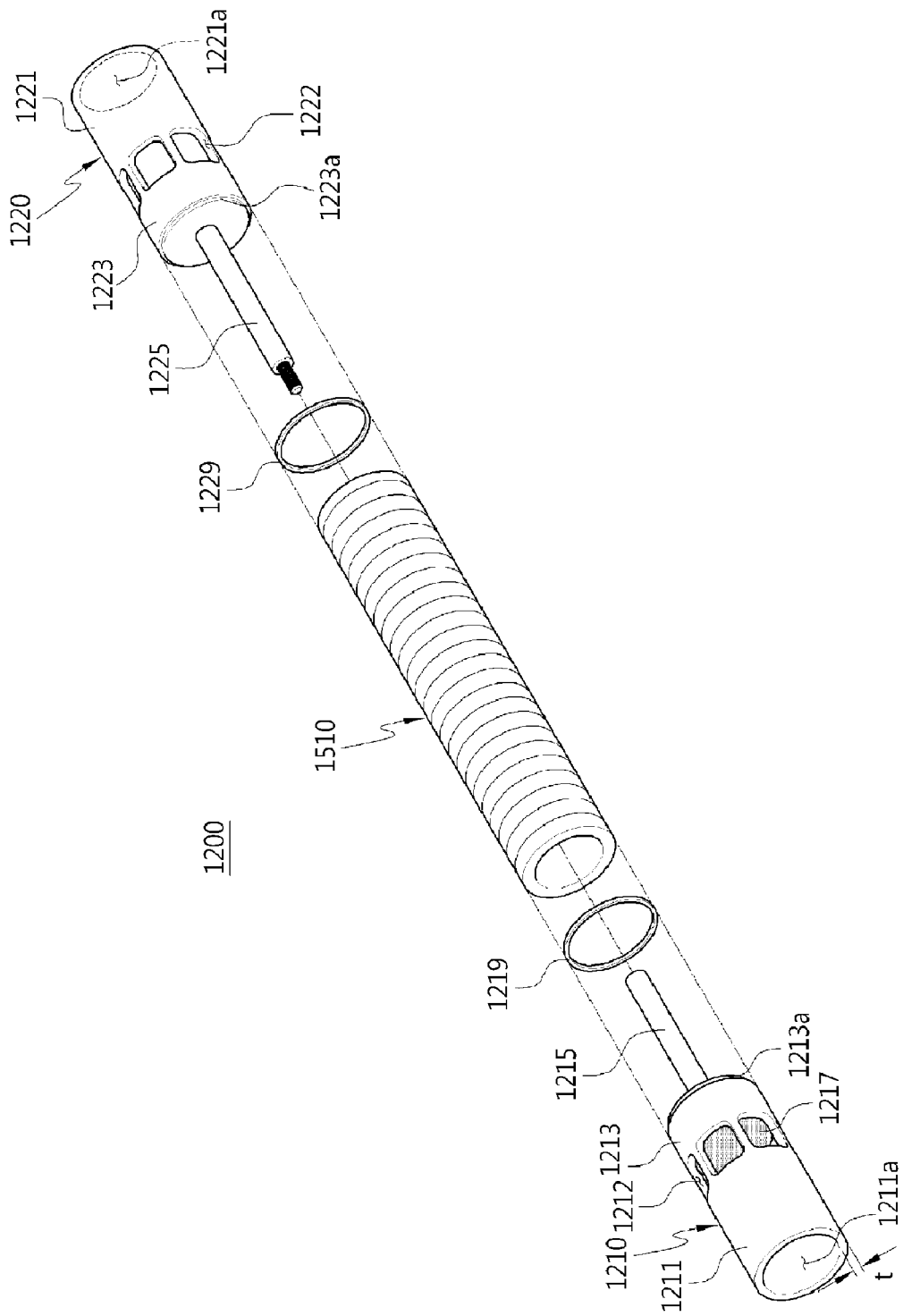
FIG. 51 is a perspective view of a piston in the heat engine according to still another exemplary embodiment of the present invention.
Figure 52:
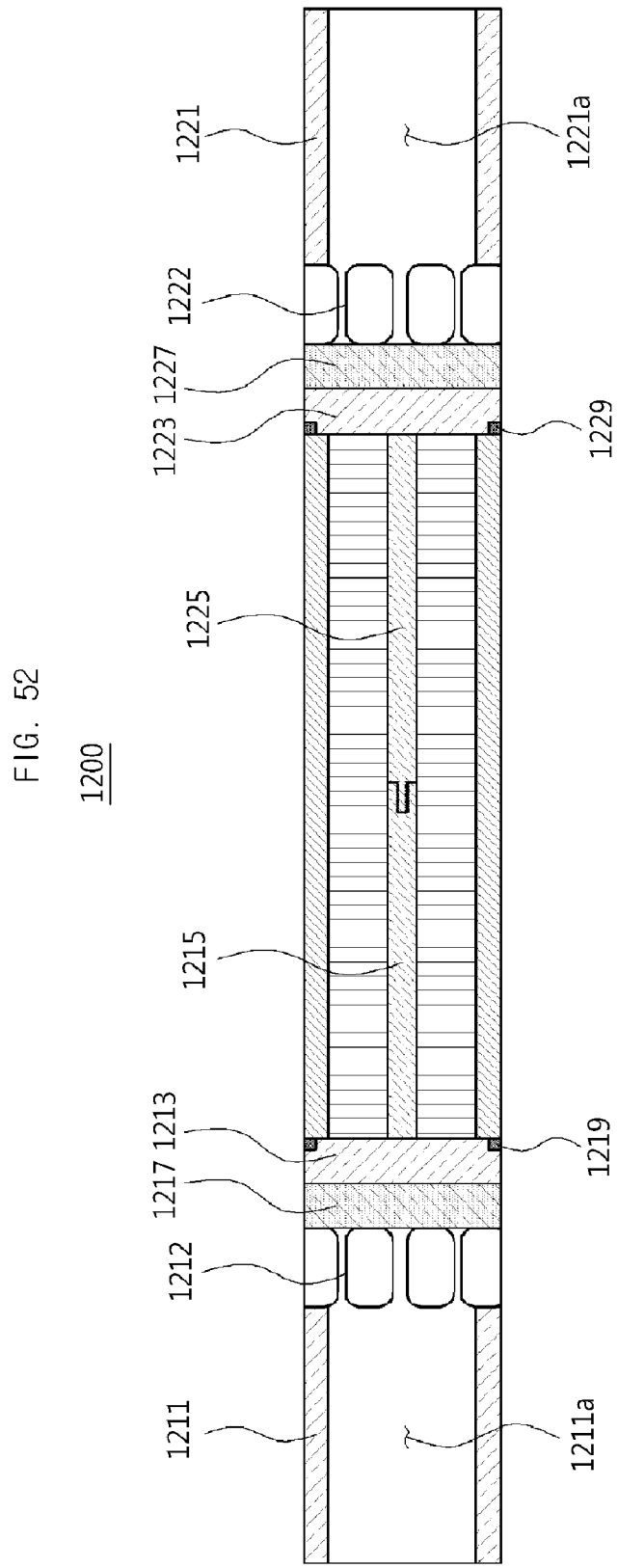
FIG. 52 is a cross-section view of the piston in the heat engine according to still another exemplary embodiment of the present invention.

FIG. 47 is a perspective view schematically showing a heat engine according to still another exemplary embodiment of the present invention, FIG. 48 is a cross-section view taken along line E-E of FIG. 47, FIG. 49 is a perspective view of a cylinder in the heat engine according to still another exemplary embodiment of the present invention, FIG. 50 is a cross-section view of the cylinder in the heat engine according to still another exemplary embodiment of the present invention, FIG. 51 is a perspective view of a piston in the heat engine according to still another exemplary embodiment of the present invention, FIG. 52 is a cross-section view of the piston in the heat engine according to still another exemplary embodiment of the present invention.

As shown in FIGS. 42 to 52, a heat engine 70 according to this exemplary embodiment may include a cylinder 1100, a piston 1200, a high temperature heater 1300, a low temperature cooler 1400, etc.

The cylinder 100 has a cylindrical shape, and is internally filled with predetermined operating gas at opposite end parts thereof. For example, the operating gas includes first operating gas g1 hermetically filled in a spaced between a first end part of the cylinder 1100 and a first piston 1210 to be described later, and second operating gas g2 hermetically filled in a spaced between a second end part of the cylinder 1100 and a second piston 1220 to be described later. Here, the first and second operating gas g1 and g2 may include hydrogen, helium, etc. Also, the first and second operating gas g1 and g2 may be mixed with black powder having a form of particles, e.g., carbon black, to improve capacity of absorbing thermal energy transferred from the first and second high temperature heaters 1310 and 1320 to be described later, thereby enhancing a heat transfer effect of the first and second operating gas g1 and g2.

The cylinder 1100 may be formed with opposite front end parts 1111 and 1112 opened outward to insert the piston 1200 therein. In this case, openings 1111a and 1112a of the opposite front end parts 1111 and 1112 of the cylinder 1100 may be hermetically closed by a pair of cylinder head units 1120, respectively.

One sides of the opposite front end parts 1111 and 1112 of the cylinder 1100 may be formed with flanges 6 and 7, respectively. In this case, the flanges 6 and 7 may be formed with a plurality of bolt holes 3 to which bolts 1 can be fastened. Also, the flanges 6 and 7 may be formed with ring-shaped sealing grooves 5 in which sealing members 1125 and 1135 to be described later are respectively inserted and received.

The cylinder head units 1120 and 1130 may include head covers 1121 and 1131 and head protrusions 1123 and 1133.

The head covers 1121 and 1131 are shaped like circular plates having a predetermined thickness and have a diameter equal to or larger than that of the flanges 6 and 7 formed in the front end part 1111 and 1112 of the cylinder 1100. Also, the head covers 1121 and 1131 are formed with a plurality of bolt holes 2 along the edge thereof so as to correspond to the bolt holes 3 of the flanges 6 and 7, and coupled to the front end part 1111 and 1112 of the cylinder 1100 by the bolt 1 or the like. In this case, a ring-shaped sealing members 1125 and 1135, e.g., O-ring shaped silicon packing may be provided between the head covers 1121 and 1131 and the front end parts 1111 and 1112 of the cylinder 1100, thereby enhancing a sealing effect on preventing the operating gas g1 and g2 from leaking from the inside of the cylinder 1100 to the outside. The sealing members 1125 and 1135 are formed with a circular hollow 1125a and 1135a at the respective centers thereof, in which the head protrusions 1123 and 1133 of the cylinder head unit 1120 and 1130 can be inserted.

The head protrusion 1123, 1133 protrudes from one surface of the head cover 1121, 1131 in the form of a cylinder as being opposite to the piston 1200, and is thus inserted in the opening 1111a, 1112a of the front end part 1111, 1112 of the cylinder 1100. The head protrusion 1123, 1133 is spaced apart from an inner surface of the front end part 1111, 1112 of the cylinder 1100 leaving a predetermined gap G, and forms a guide groove 1123a, 1133a in which a front end part 1211, 1221 of the piston 1200 is inserted. In this case, the gap G between the head protrusion 1123, 1133 and the cylinder 1100 may correspond to the thickness of the front end part 1211, 1221 of the piston 1200.

In this case, the length of the head protrusion 1123, 1133, i.e., the length of the guide groove 1123a, 1133a may be almost equal to a distance from the front end portion of the piston 1200 to the front end portion of a heat opening 1212, 1222 so that the heat opening 1212, 1222 of the piston 1200 can be placed at the high temperature heater 1310, 1320 when the operating gas g1, g2 has the minimum volume, i.e., the operating gas g1, g2 is maximally compressed.

The cylinder 1100 may include a pair of cylinder insulating units 1141 and 1142 for insulating heat between the first high temperature heater 1310 and the first low temperature cooler 1410 and between the second high temperature heater 1320 and the second low temperature cooler 1420 to be described later. In this case, the cylinder insulating units 1141 and 1142 may be respectively placed between the first high temperature heater 1310 and the first low temperature cooler 1410 and between the second high temperature heater 1320 and the second low temperature cooler 1420.

The cylinder 1100 is mostly made of stainless steel, and the cylinder insulating unit 1141, 1142 of the cylinder 1100 may be made of ceramic, silica, or the like material. Here, the cylinder insulating unit 1141, 1142 may be formed to have the same length as the heat opening 1212, 1222 of the piston 1200 to be described later.

The piston 1200 may include a first piston 1210 accommodated at one inner side of the cylinder 1100 so as to contact the first operating gas g1 accommodated in one end part of the cylinder 1100 and rectilinearly reciprocate as the first operating gas g1 is thermally expanded and contracted, and a second piston 1220 accommodated at the other inner side of the cylinder 1100 so as to contact the second operating gas g2 accommodated in the other end part of the cylinder 1100 and rectilinearly reciprocate as the second operating gas g2 is thermally expanded and contracted.

The piston 1200 may be assembled by screw-coupling a first piston rod 1215 protruding from the rear end part 1213 of the first piston 1210 and a second piston rod 1225 protruding from the rear end part 1223 of the second piston 1220 in order to install piston rings 1219 and 1229 and a magnet 1510 to be described later between the first piston 1210 and the second piston 1220.

The first and second pistons 1210 and 1220 are shaped like a cylinder having a diameter corresponding to an inner diameter of the cylinder 1100. Further, the front end parts 1211 and 1221 of the first and second pistons 1210 and 1220 may be made of an insulating material such as metal having low thermal conductivity, ceramic, etc.

The front end parts 1211 and 1221 of the first and second pistons 1210 and 1220 are formed with openings 1211a and 1221a in which the head protrusions 1123 and 1133 of the cylinder head units 1120 and 1130 are inserted, respectively, and are shaped to be hermetically closed up from the rear portions of the first and second heat openings 1212 and 1222 to be described later. Also, first and second piston insulating units 1217 and 1227 may be provided as insulating materials and placed in the rear portion of the first and second heat openings 1212 and 1222.

The piston 1200 is formed with the heat openings 1212 and 1222 at opposite ends thereof to make the operating gas g1 and g2 be directly contact the high temperature heater 1300 or the low temperature cooler 1400. More specifically, the first piston 1210 may be provided with the first heat opening 1212 so that the first operating gas g1 can directly contact the first high temperature heater 1310 or the first low temperature cooler 1410 in accordance with a thermodynamic cycle. For example, a plurality of first heat openings 1212 may be formed along the outer circumference in front of the rear end part 1213 of the first piston 1210, and may have various shapes such as a circle, a rectangle, etc. Also, the second piston 1220 may be provided with the second heat opening 1222 so that the second operating gas g2 can directly contact the second high temperature heater 1320 or the second low temperature cooler 1420 in accordance with a thermodynamic cycle. For example, a plurality of second heat openings 1222 may be formed along the outer circumference in front of the rear end part 1223 of the second piston 1220, and may have various shapes such as a circle, a rectangle, etc.

The opposite front end parts 1211 and 1221 of the piston 1200 may have a thickness t corresponding to the gap G of the guide groove 1123*a*, 1133*a* formed between an inner wall of the cylinder 1100 and the head protrusions 1123 and 1133 of the cylinder head units 1120 and 1130. Also, the front end part 1211, 1221 of the piston 1200 may have a length enough to prevent the operating gas g1, g2 from contacting the high temperature heater 1300 when the operating gas g1, g2 expands maximally, i.e., when the piston 1200 has the maximum moving width. For example, according to an exemplary embodiment, if three regions of the high temperature heater 1310, 1320, the cylinder insulating unit 1141, 1142, and the low temperature cooler 1410, 1420 have the same length with one another, the front end part 1111, 1112 of the piston 1200 has a length enough to cover the length of the three regions, and has nearly the same length as the length of the head protrusion 1123, 1133 of the cylinder head unit 1120, 1130, i.e., the length of the guide groove 1123*a*, 1133*a*.

The piston 1200 may be provided with at least one piston ring to seal up a portion where it contacts the inner wall of the cylinder 1100. For example, an outer wall of the rear end part 1213 of the first piston 1210 is formed with a first piston ring receiving groove 1219*a* in which a first piston ring 1219 is received and fixed, and an outer wall of the rear end part 1223 of the second piston 1220 is formed with a second piston ring receiving groove 1229*a* in which a second piston ring 1229 is received and fixed. Here, the first and second piston rings 1219 and 1229 are placed inside the first low temperature cooler 1410 and the second low temperature cooler 1420 of the cylinder 1100 when the first and second pistons 1210 and 1220 rectilinearly reciprocate, so that O-ring shaped Teflon or the like material usable at low temperature can be employed. According to the present exemplary embodiment, the piston rings 1219 and 1229 are used, but not limited thereto. Alternatively, instead of the piston rings 1219 and 1229, a fastening ring may be arranged in the form of a vertical bearing on the inner wall of the cylinder 1100.

The high temperature heater 1300 forms a pair to heat the opposite front end parts 1111, 1112 of the cylinder 1100 and expand the operating gas g1 and g2 accommodated in opposite insides of the cylinder 1100. More specifically, the high temperature heater 1300 includes a first high temperature heater 1310 for heating and thermally expanding the first operating gas g1 accommodated in one end part of the cylinder 1100, and a second high temperature heater 1320 for heating and thermally expanding the second operating gas g2 accommodated in the other end part of the cylinder 1100.

The first high temperature heater 1310 may be placed to be spaced apart at a predetermined distance from one end of the cylinder 1100 in a central direction, e.g., as distant as the length of the head protrusion 1123 of the cylinder head unit 1120. Also, the second high temperature heater 1320 may be placed to be spaced apart at a predetermined distance from the other end of the cylinder 110 in a central direction, e.g., as distant as the length of the head protrusion 1133 of the cylinder head unit 1130 to be symmetrical with the first high temperature heater 1310.

The first and second high temperature heaters 1310 and 1320 may be made of metal having good heat transfer efficiency, and provided in the form of a ring on the outer circumference of the cylinder 1100, but not limited thereto. Alternatively, the first and second high temperature heaters 1310 and 1320 may be selectively embodied in various forms.

Each length of the first and second high temperature heaters 1310 and 1320 may be equal to or a little longer than each length of the first and second heat openings 1212 and 1222. For example, the first and second high temperature heaters 1310 and 1320 may have the same length as the first and second heat openings 1212 and 1222, the first and second low temperature coolers 1410 and 1420, the cylinder insulating units 1141 and 1142.

Figure 53:
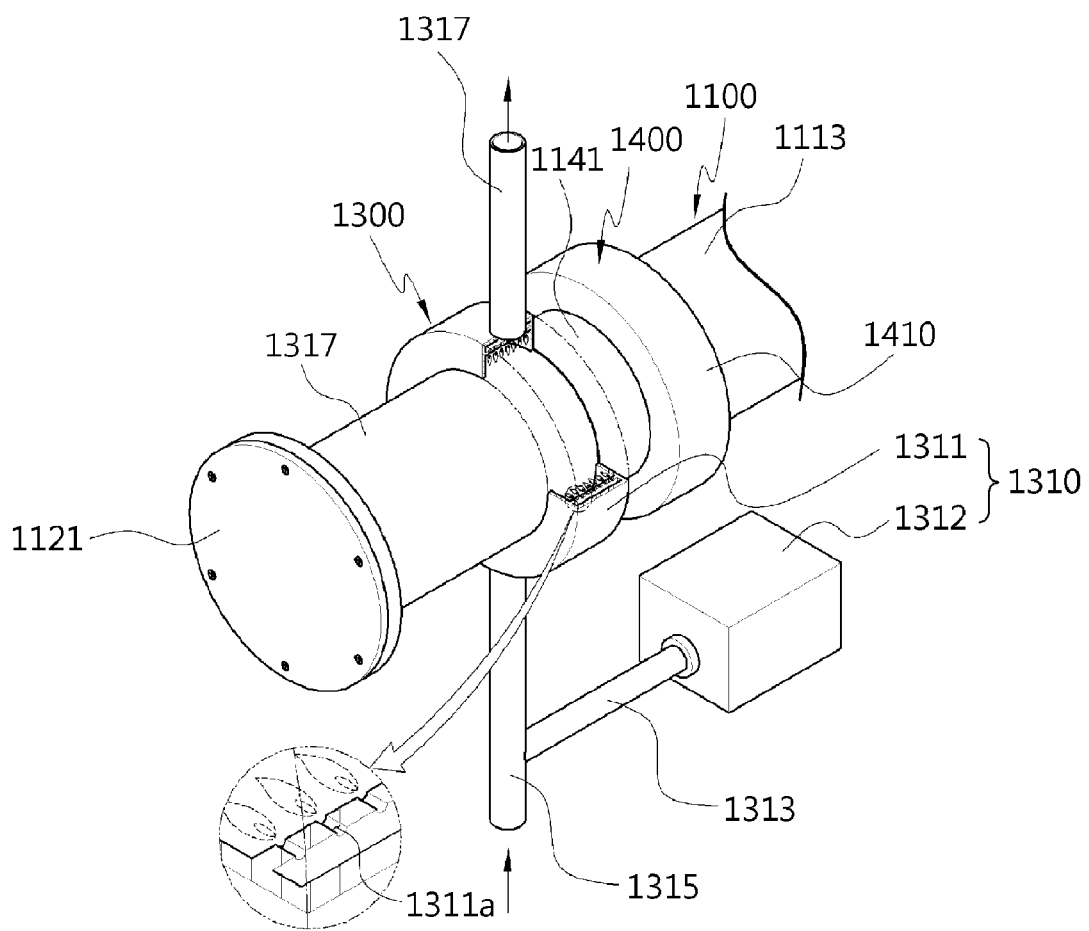
FIG. 53 is a partial perspective view showing a first exemplary embodiment of a high temperature heater in the heat engine according to still another exemplary embodiment of the present invention.
Figure 54:
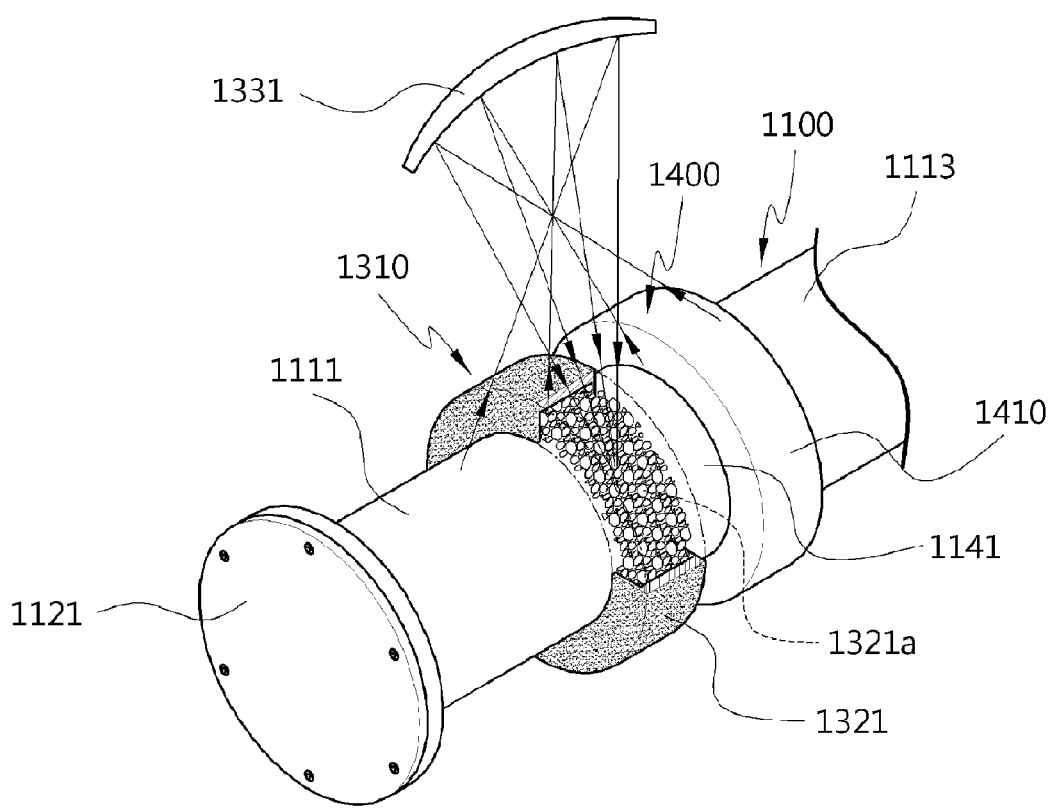
FIG. 54 is a partial perspective view showing a second exemplary embodiment of a high temperature heater in the heat engine according to still another exemplary embodiment of the present invention.
Figure 55:
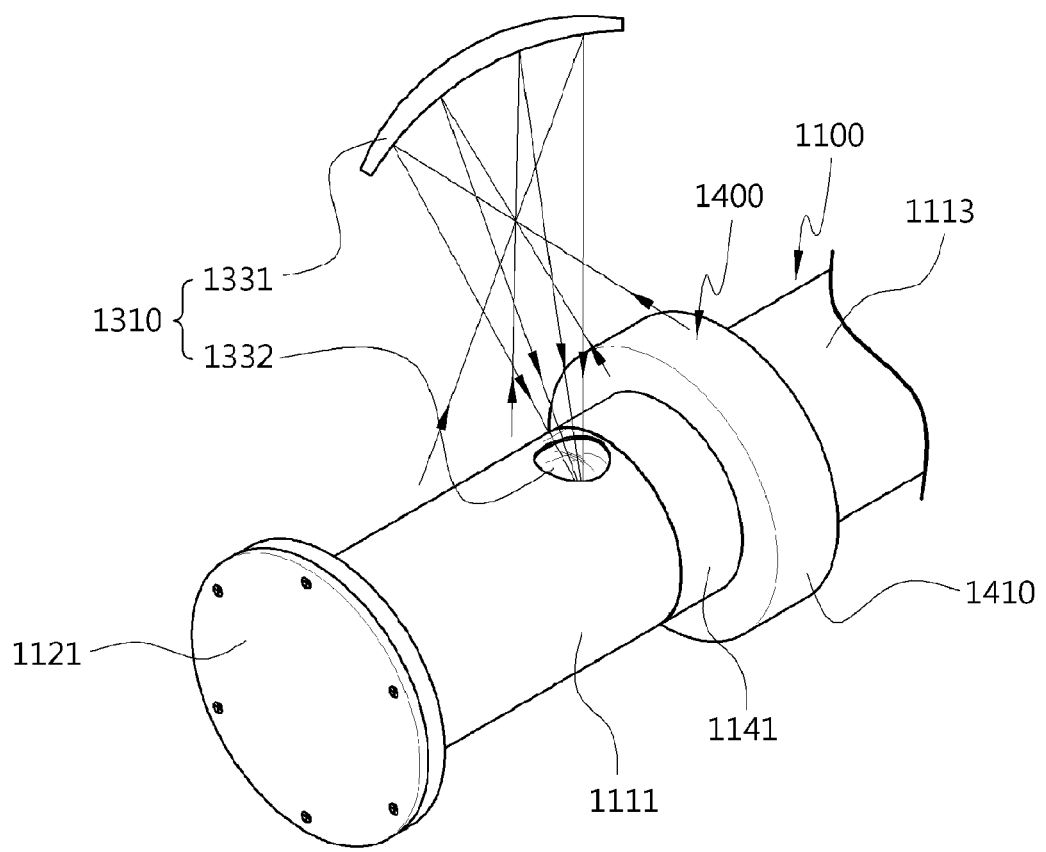
FIG. 55 is a partial perspective view showing a third exemplary embodiment of a high temperature heater in the heat engine according to still another exemplary embodiment of the present invention.

Referring to FIGS. 53 to 55, various exemplary embodiments of the high temperature heater in the heat engine according to the present exemplary embodiment will be described.

FIGS. 53 to 55 are perspective views of the first high temperature heater 1310 at one side of the cylinder 1100, and the second high temperature heater 1320 at the other side may have the same configuration.

The first high temperature heater 1310 may heat the first operating gas g1 inside one end of the cylinder 1100 by thermal energy based on combustion, molten salt or light of the sun.

For example, as shown in FIG. 53, the first high temperature heater 1310 may use thermal energy based on combustion to heat the front end part 1111 of the cylinder 1100. To this end, the first high temperature heater 1310 may include a combustion chamber 1311 arranged in the form of a ring on the outer circumference of the front end part 1111 of the cylinder 1100, and a fuel supplying unit 1312 supplying fuel to the combustion chamber 1311 through a fuel pipe 1313. In this case, a plurality of burners 1311*a* may be placed inside the combustion chamber 1311. Further, an air pipe 1315 for injecting air into the combustion chamber 1311 and an exhaust pipe 1317 for exhausting the combustion gas may be provided inside the combustion chamber 1311.

Also, as shown in FIG. 54, the first high temperature heater 1310 may use molten salt as a heat storage material and thus heat the front end part 1111 of the cylinder 1100. To this end, the first high temperature heater 1310 may be provided in the form of a ring on the outer circumference of the front end part 1111 of the cylinder 1100, and include a heat storage chamber 1321 to accommodate therein the molten salt 1321*a* used as the heat storage material. Here, the molten salt 1321*a*, e.g., $NaAlCl_4$, is a kind of salt that generates heat while being melted from a solid to a liquid, which can be used in various fields. For example, the molten salt 1321*a* may be used as a thermal energy storage medium, used as a heat transfer material in a heating reservoir, used for blanketing and refining molten metal, used in electric coating for a high temperature molten material, used as melting electrolytes in a primary battery, used as a rechargeable sodium battery, etc. The heat storage chamber 1321*a* may be formed as a black body to enhance capacity for absorbing the thermal energy transferred from a sunlight concentrating module 1331.

Further, as shown in FIG. 55, the first high temperature heater 1310 may use thermal energy based on the highly concentrated light of the sun to heat the front end part 1111 of the cylinder 1100. To this end, the first high temperature heater 1310 may include a sunlight concentrating module 1331 for concentrating the light of the sun, and a light transmission window 1332 formed in the front end part 1111 of the cylinder 1100 so that the operating gas can be directly exposed to the sunlight concentrated by the sunlight concentrating module 1331. The sunlight concentrating module 1331 may be achieved by refractive type light concentration where a lens such as a magnifying glass is used to refract the light of the sun and concentrate it at one point, and reflective type light concentration where a curved mirror is used to reflect the light of the sun and concentrate it at one point. As compared with the refractive type light concentration, the reflective type light concentration as shown in FIG. 55 is more advantageous to highly concentrate the light of the sun. Here, the reflective type light concentration may be variously configured in accordance with the number of reflecting times or a reflecting form.

According to an exemplary embodiment of the present invention, the first and second high temperature heaters 1310 and 1320, which use the combustion, the electric heat or the light of the sun as heat sources, are shown, but not limited thereto. Alternatively, the first and second high temperature heaters 1310 and 1320 may be variously embodied. For example, the high temperature heater 300 may include any kind of heat source capable of keeping temperature higher than those of the first and second low temperature cooler 1410 and 1420 or surroundings.

The low temperature cooler 1400 forms a pair to cool the opposite rear end parts 1113, 1114 of the cylinder 1100 and contract the operating gas g1 and g2 thermally expanded by the high temperature heater 1300. More specifically, the low temperature cooler 1400 includes a first low temperature cooler 1410 spaced apart at a predetermined distance from the first high temperature heater 1310 and cooling and contracting the first operating gas g1 thermally expanded by the first high temperature heater 1310, and a second low temperature cooler 1420 spaced apart at a predetermined distance from the second high temperature heater 1320 and cooling and contracting the second operating gas g2 thermally expanded by the second high temperature heater 1320.

The first low temperature cooler 1410 may be placed to be spaced apart at a predetermined distance from the first high temperature heater 1310 in a central direction of the cylinder 1100, e.g., as distant as the length of the cylinder insulating unit 1141. Also, the second low temperature cooler 1420 may be placed to be spaced apart at a predetermined distance from the second high temperature heater 1320 in a central direction of the cylinder 1100, e.g., as distant as the length of the cylinder insulating unit 1142.

The first and second low temperature coolers 1410 and 1420 may be provided in the form of a ring on the outer circumference of the cylinder 1100 between the first and second high temperature heaters 1310 and 1320, but not limited thereto. Alternatively, the first and second low temperature coolers 1410 and 1420 may be selectively embodied in various forms.

Each length of the first and second low temperature coolers 1410 and 1420 may be equal to or a little longer than each length of the first and second heat openings 1212 and 1222. For example, the first and second low temperature coolers 1410 and 1420 may have the same length as the first and second heat openings 1212 and 1222, the first and second high temperature heater 1310 and 1320, the cylinder insulating units 1141 and 1142.

Figure 56:
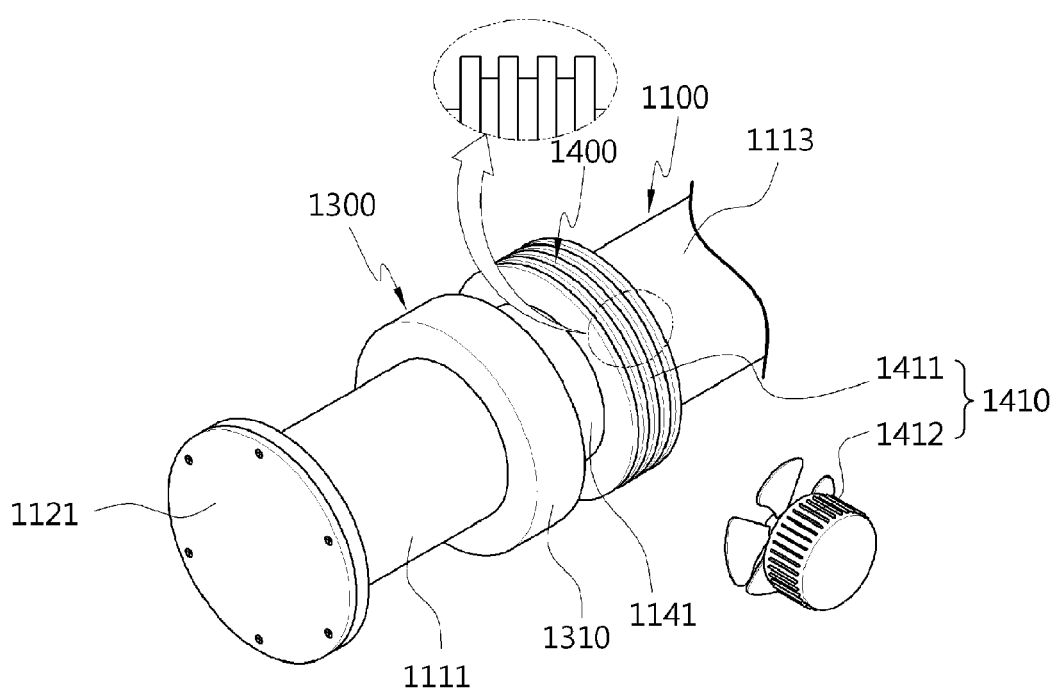
FIG. 56 is a partial perspective view showing a first exemplary embodiment of a low temperature cooler in the heat engine according to still another exemplary embodiment of the present invention.
Figure 57:
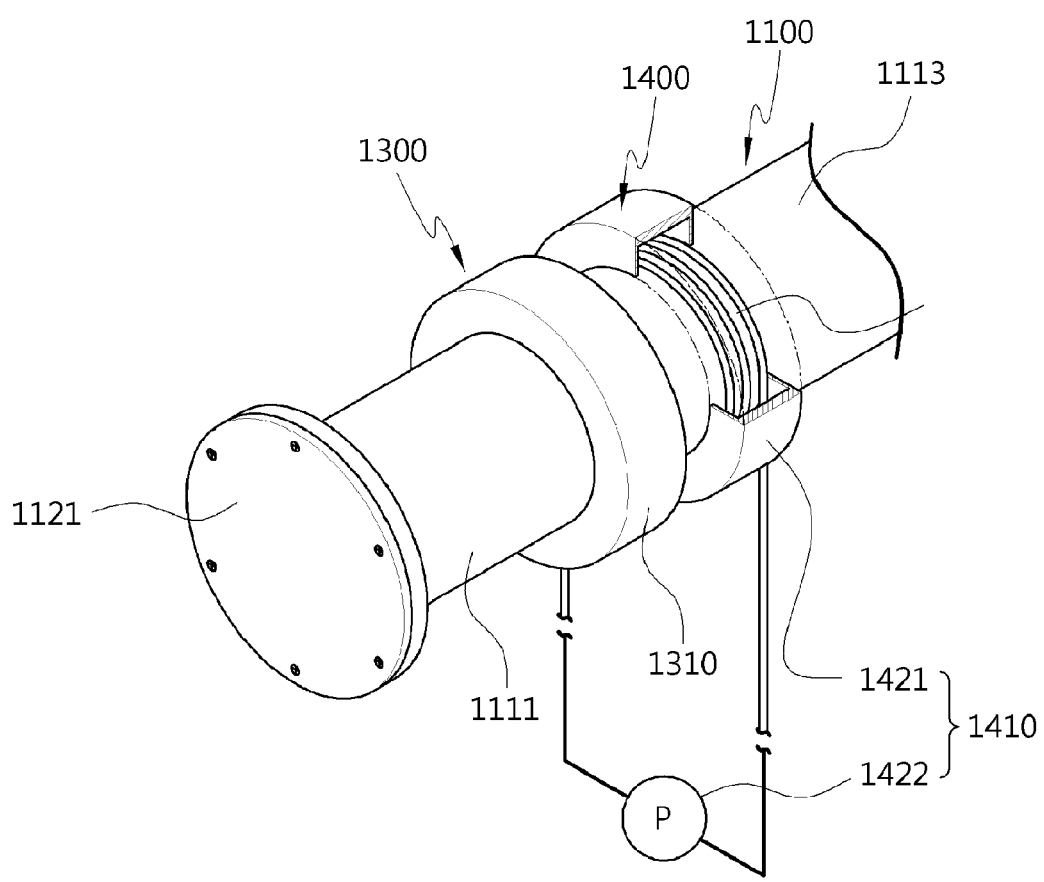
FIG. 57 is a partial perspective view showing a second exemplary embodiment of a low temperature cooler in the heat engine according to still another exemplary embodiment of the present invention.

Referring to FIGS. 56 and 57, various exemplary embodiments of the low temperature cooler in the heat engine according to the present exemplary embodiment will be described.

FIGS. 56 and 57 are perspective views of the first low temperature cooler 1410 at one side of the cylinder 1100, and the second low temperature cooler 1420 at the other side may have the same configuration.

For example, as shown in FIG. 56, the first low temperature cooler 1410 may be achieved by an air-cooling type, which includes a cooling fin 1411 formed on the outer circumference of the rear end part 1113 of the cylinder 1100, and a cooling fan 1412 for blowing air to and cooling the cooling fin 1411. Here, the cooling fin 1411 may be formed unevenly to increase an area to contact the air so that cooling can be more quickly carried out under the atmosphere.

Also, as shown in FIG. 57, the first low temperature cooler 1410 may be achieved by a water-cooling type, which includes a cooling chamber 1421 placed in the form of a ring wound on the outer circumference of the rear end part 1113 of the cylinder 1100 and accommodating a cooling tube 1421*a* therein, and a cooling pump 1422 supplying cooling water to the cooling tube 1421*a*.

A heat engine 70 according to an exemplary embodiment may further include a generator 1500. The generator 1500 is an element that transforms the mechanical energy based on the rectilinear reciprocating motion of the piston 1200 into the electric energy, which may include a magnet 1510, a coil 1520, etc.

The magnet 1510 is a permanent magnet type vibrator provided in the piston 1200. For example, a plurality of magnets 1510 may be provided in the form of a cylinder along the lengthwise direction on the outer circumference of the piston rods 1215 and 1225 between the first piston 1210 and the second piston 1220.

The coil 1520 is a stator provided in the cylinder 1100 corresponding to the magnet 1510 of the piston 1200. For example, the coil 1520 is wound on the outer circumference of the cylinder 1100 along the lengthwise direction between the first low temperature cooler 1410 and the second low temperature cooler 1420, and generates an induced electromotive force together with the magnet 510 as the piston 1200 rectilinearly reciprocates.

The generator 1500 generates electricity from the coil 1520 as the magnet 1510 vibrates by the rectilinear reciprocating motion of the piston 1200. That is, the generator 1500 is formed integrally with the cylinder 1100 and the piston 1200 of the heat engine and transforms the mechanical energy into the electric energy. Like that a magnetic field is generated around a place where an electric current flows, if the magnetic field of the magnet 1510 is generated around the coil 1520, there occurs electromagnetic induction causing an electron to move. Electricity generated from the coil 1520 by vibration of the magnet 1510 is the induced electromotive force. If the induced electromotive force generated from the coil 520 is connected to a primary side of a transformer (not shown) configured with an LC resonance circuit, alternating current (AC) can be generated at a secondary side of the transformer.

In this exemplary embodiment, the first and second high temperature heaters 1310 and 1320, the first and second low temperature coolers 1410, 1420, the cylinder insulating units 1141, 1142, and the first and second heat openings 1212, 1222 are formed to have one length, so that the operating gas g1 and g2 can be efficiently thermally expanded or contracted when directly heated or cooled at the exterior while following the thermodynamic cycle as shown in FIG. 19, thereby rectilinearly reciprocating the piston 1200. Here, the lengths of the first and second high temperature heaters 1310 and 1320 and the first and second low temperature cooler 1410 and 1420 may be equal to or a little larger than those of the cylinder insulating unit 1141 and 1142 and the first and second heat openings 1212 and 1222.

Also, the cylinder 1100 and the piston 1200 are internally coated with ceramic except the high temperature heater 1300 and the low temperature cooler 1400, thereby improving an adiabatic effect.

Although it is not shown, a heat engine according to still another exemplary embodiment includes a pair of heat engines 10 according to the foregoing exemplary embodiments and symmetrically arranged. In the pair of heat engine 10, a free piston is configured in the form of a rack and a pinion, so that a negative impact on the heat engine caused by the mechanical vibration and torque due to the rectilinear reciprocating motion of the free piston can be minimized. Also, the thermodynamic cycle of the heat engine can be driven by a driving device connected to the pinion.

FIGS. 58 to 61 are views for sequentially explaining operations of the heat engine according to still another exemplary embodiment of the present invention. Below, the operations of the heat engine according to this exemplary embodiment will be described with reference to FIGS. 58 to 61.

Figure 58:
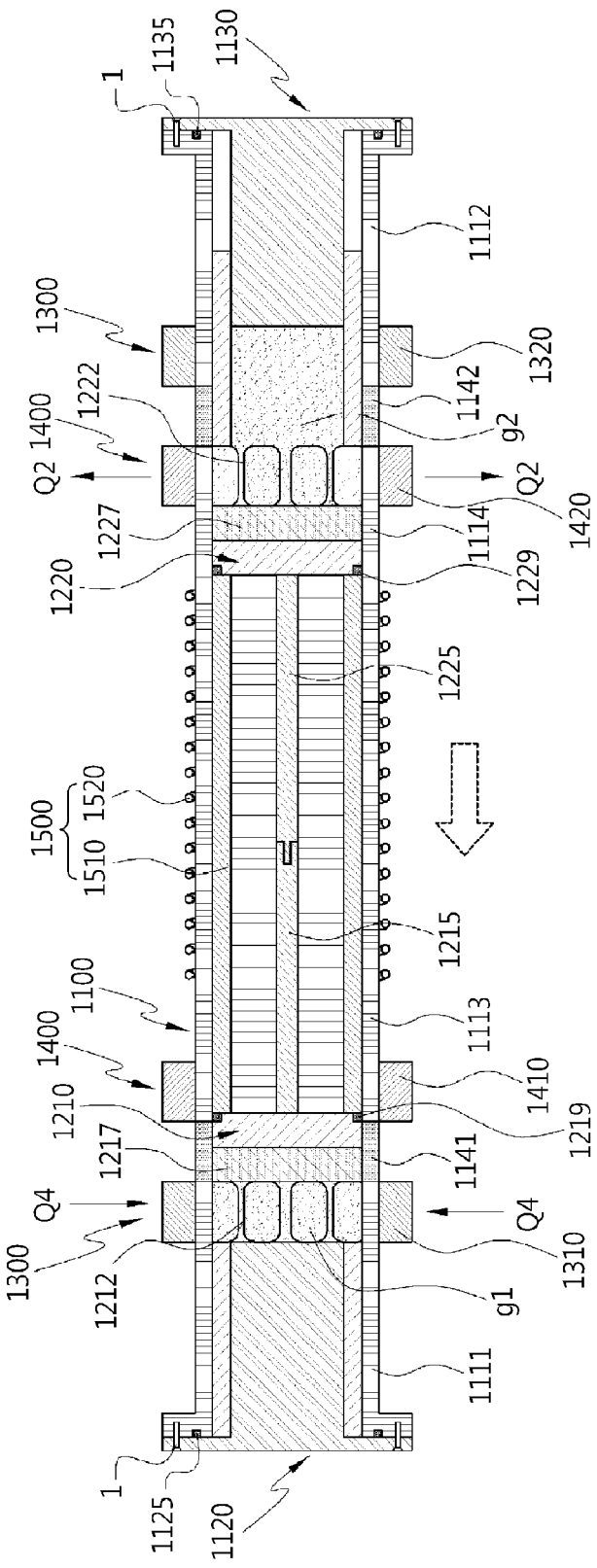
FIGS. 58 to 61 are views for sequentially explaining operations of the heat engine according to still another exemplary embodiment of the present invention.

First, as shown in FIG. 58, if an electric current is applied to the coil 1520 of the generator 1500 in an initial state, a line of magnetic force of the magnet 1510 is varied to generate a driving force based on the Fleming's left-hand rule, so that the position of the piston can be adjusted. When the piston 1200 moves leftward and the front end part 1211 of the first piston 1210 is inserted in the guide groove 1123a formed between the inner wall of the cylinder 1100 and the cylinder head unit 1120, that is, if the piston 1200 moves until the operating gas hermetically filled in the space between the cylinder 1100 and the first piston 1210 has the minimum volume, the first heat opening 1212 of the first piston 1210 is positioned on the first high temperature heater 1310 of the cylinder 1100. At this time, the first operating gas g1 directly contacts the first high temperature heater 1310 through the first heat opening 1212 and is thermally compressed at high temperature while absorbing thermal energy Q4 from the first high temperature heater 1310 (refer to high-temperature heat compressing process ④→① of FIG. 19). Also, the second piston 1220 symmetrical to the first piston 1210 moves leftward until the second operating gas g2 has the maximum volume, and the second heat opening 1222 of the second piston 1220 is positioned on the second low temperature cooler 1420. At this time, the second operating gas g2 directly contacts the second low temperature cooler 1420 through the second heat opening 1222 and is thus cooled and expanded to thereby rapidly decrease in pressure. At this time, the temperature of the second operating gas g2 is still higher than that of the second low temperature cooler 1420, so that some of inner thermal energy Q2 is discharged to the outside (refer to low-temperature cool expanding process ②'→③ of FIG. 19). This process is not the same as but approximately equal to the thermodynamic cycles of the Carnot and Stirling engines. Here, the cylinder insulating unit 1141, 1142 provided between the high temperature heater 1300 and the low temperature cooler 1400 insulates the heat transfer between the high temperature heater 1300 and the low temperature cooler 1400.

Figure 59:
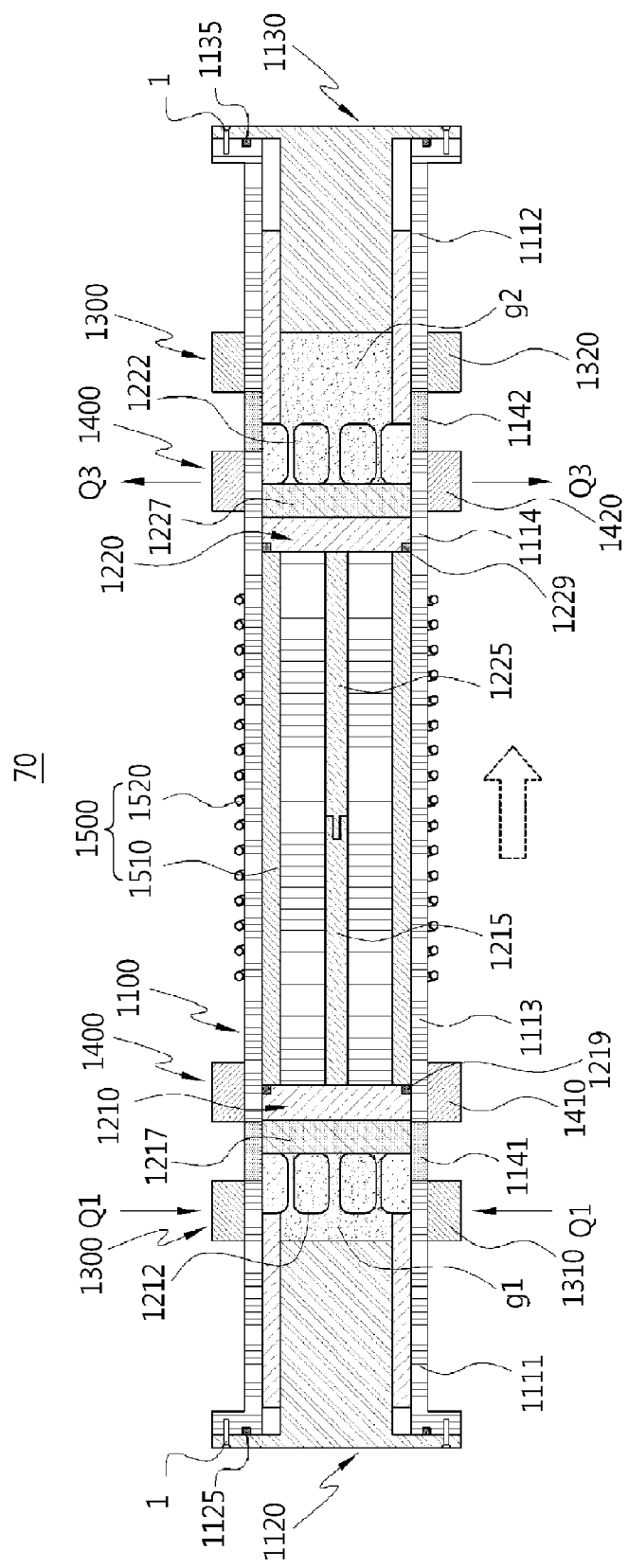

Next, as shown in FIG. 59, while thermal energy Q1 from the first high temperature heater 1310 is continuously absorbed in the first operating gas g1 inside the cylinder 1100, molecules of the first operating gas g1 increases in molecular motion and their speed increases. The number of times the molecules of the first operating gas g1 collide the inner wall of the cylinder 1100 increases in accordance with the molecular motion. Thus, if the volume is fixed, even pressure increases within the volume. This pressure pushes rightward the first piston 1210 installed inside the cylinder 1100 and causes the first operating gas g1 to thermally expand at high temperature (refer to high-temperature heat expanding process ①→② of FIG. 19). Also, the second operating gas g2 expanded until having the maximum volume is insulated from the second high temperature heater 1320 and contacts only the second low temperature cooler 1420, so that it can be cooled and contracted to thereby move the second piston 1220 rightward. At this time, the inner thermal energy Q3 of the second operating gas g2 is discharged to the outside (refer to low-temperature cool contracting and expanding process ③→④' of FIG. 19). This process is the same as the thermodynamic cycle of the Carnot and Stirling engines.

Figure 60:
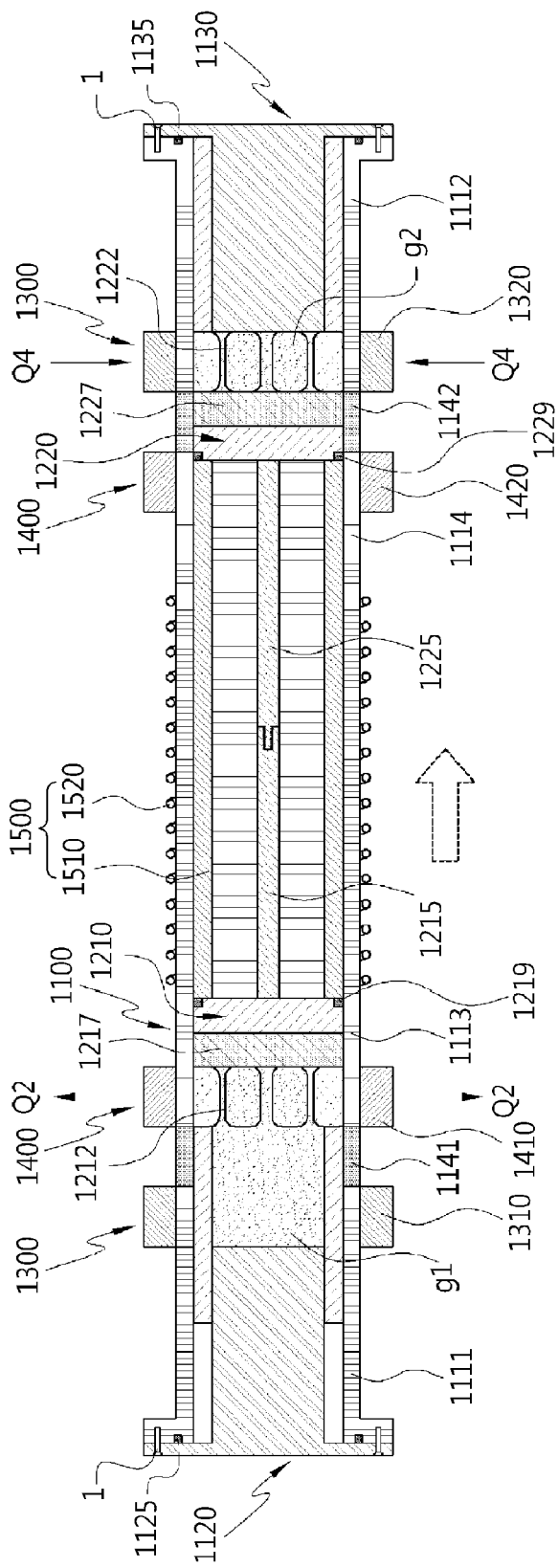

Next, as shown in FIG. 60, the first piston 1210 moves rightward and the first heat opening 1212 of the first piston 1210 is positioned on the first low temperature cooler 1410 when the first operating gas g1 has the maximum volume. The first operating gas g1 directly contacts the first low temperature cooler 1410 through the first heat opening 1212 and is cooled and expanded to thereby rapidly decrease in pressure. At this time, the temperature of the first operating gas g1 is still higher than that of the first low temperature cooler 1410, so that some of inner thermal energy Q2 is discharged to the outside (refer to low-temperature cool expanding process ②'→③ of FIG. 19). When the second piston 1220 moves rightward and the front end part 1221 of the second piston 1220 is inserted in the guide groove 1133a formed between the other end inner wall of the cylinder 1100 and the cylinder head unit 1130, that is, if the piston 1200 moves until the second operating gas g2 hermetically filled in the space between the cylinder 1100 and the second piston 1220 has the minimum volume, the second heat opening 1222 of the first piston 1220 is positioned on the second high temperature heater 1320 of the cylinder 1100. At this time, the second operating gas g2 directly contacts the second high temperature heater 1320 through the second heat opening 1222 and is thermally compressed at high temperature while absorbing thermal energy Q4 from the second high temperature heater 1320 (refer to high-temperature heat compressing process ④→① of FIG. 19). This process is not the same as but approximately equal to the thermodynamic cycle of the Carnot and Stirling engines.

Figure 61:
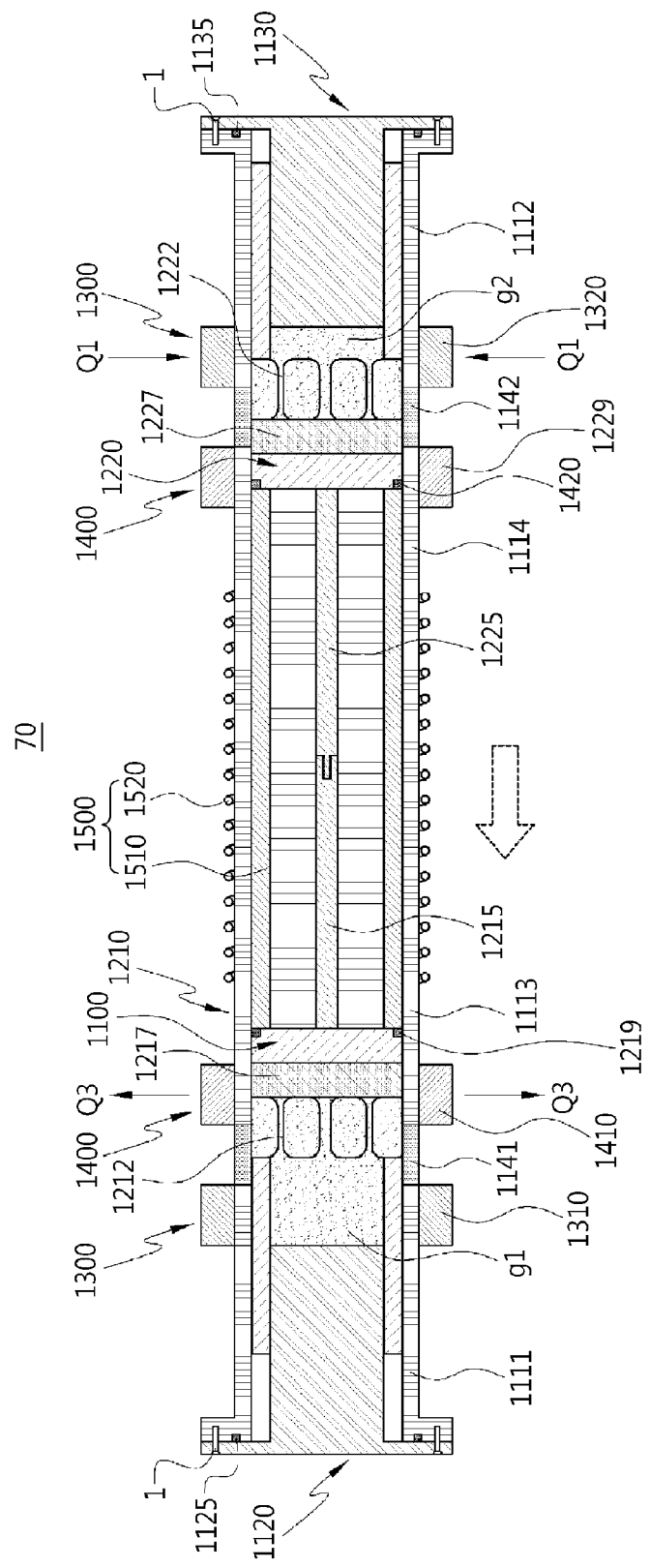

Next, as shown in FIG. 61, the first operating gas g1 expanded until having the maximum volume is insulated from the first high temperature heater 1310 and contacts only the first low temperature cooler 1410, so that it can be cooled and contracted to thereby move the first piston 1210 leftward. At this time, the inner thermal energy Q3 of the first operating gas g1 is discharged to the outside (refer to low-temperature cool contracting and expanding process ③→④' of FIG. 19). Also, while thermal energy Q1 from the second high temperature heater 1320 is continuously absorbed in the second operating gas g2 inside the cylinder 1100, molecules of the second operating gas g2 increases in molecular motion and their speed increases. The number of times the molecules of the second operating gas g2 collide the inner wall of the cylinder 1100 increases in accordance with the molecular motion. Thus, if the volume is fixed, even pressure increases within the volume. This pressure pushes leftward the second piston 1220 installed inside the cylinder 1100 and causes the second operating gas g2 to thermally expand at high temperature (refer to high-temperature heat expanding process ①→② of FIG. 19). This process is the same as the thermodynamic cycle of the Carnot and Stirling engines.

If each length of the first and second cylinder insulating units 1141 and 1142 between the first and second high temperature heaters 1310 and 1320 and the first and second low temperature coolers 1410 and 1420 is longer than each length of the first and second heat openings 1212 and 1222 of the piston 1200, an instant adiabatic process exists (refer to processes ②→②', ④'→④ of FIG. 19), thereby completing the whole thermodynamic cycle of ①→②→②'→③→④'→④→① as shown in FIG. 19. If each length of the first and second cylinder insulating units 1141 and 1142 is equal to each length of the first and second heat openings 1212 and 1222 of the piston 1200, an ideal thermodynamic cycle having no adiabatic process (②=②', ④'=④) follows as shown in FIG. 20. If each length of the first and second cylinder insulating units 1141 and 1142 is shorter than each length of the first and second heat openings 1212 and 1222 of the piston 1200, the first and second heat openings 1212 and 1222 contacts both the first and second high temperature heaters 1310 and 1320 and the first and second low temperature coolers 1410 and 1420, so that the operating gas is both heated and cooled and thus has an effect similar to an adiabatic effect. At this time, a thermodynamic cycle (not shown) is similar to a cycle of ①→②→②'→③→④'→④→① of FIG. 19.

In the foregoing heat engine 70 according to an exemplary embodiment of the present invention, the space formed by the cylinder 1100 and the piston 1200 is hermetically filled with the operating gas such as hydrogen, helium, etc., and heated and cooled at the exterior, so that the operating gas can be thermally expanded or contracted while repeating the processes as shown in FIGS. 58 to 61, thereby rectilinearly reciprocating the piston 1200.

Also, the heat engine 70 changes the mechanical energy based on the rectilinear reciprocating motion of the piston 1200 into the electric energy based on the induced electromotive force of the generator 1500 including the magnet 1510, the coil 1520, etc., thereby generating electricity. With this, the thermal efficiency of the heat engine 70 according to this exemplary embodiment of the present invention is the same as shown in the [Expression 1]. As shown in the [Expression 1], the heat engine 70 according to this exemplary embodiment is an external-combustion engine nearly similar to an intermediate form between the ideal Carnot engine and Stirling engine, so that high thermal efficiency can be expected.

Figure 62:
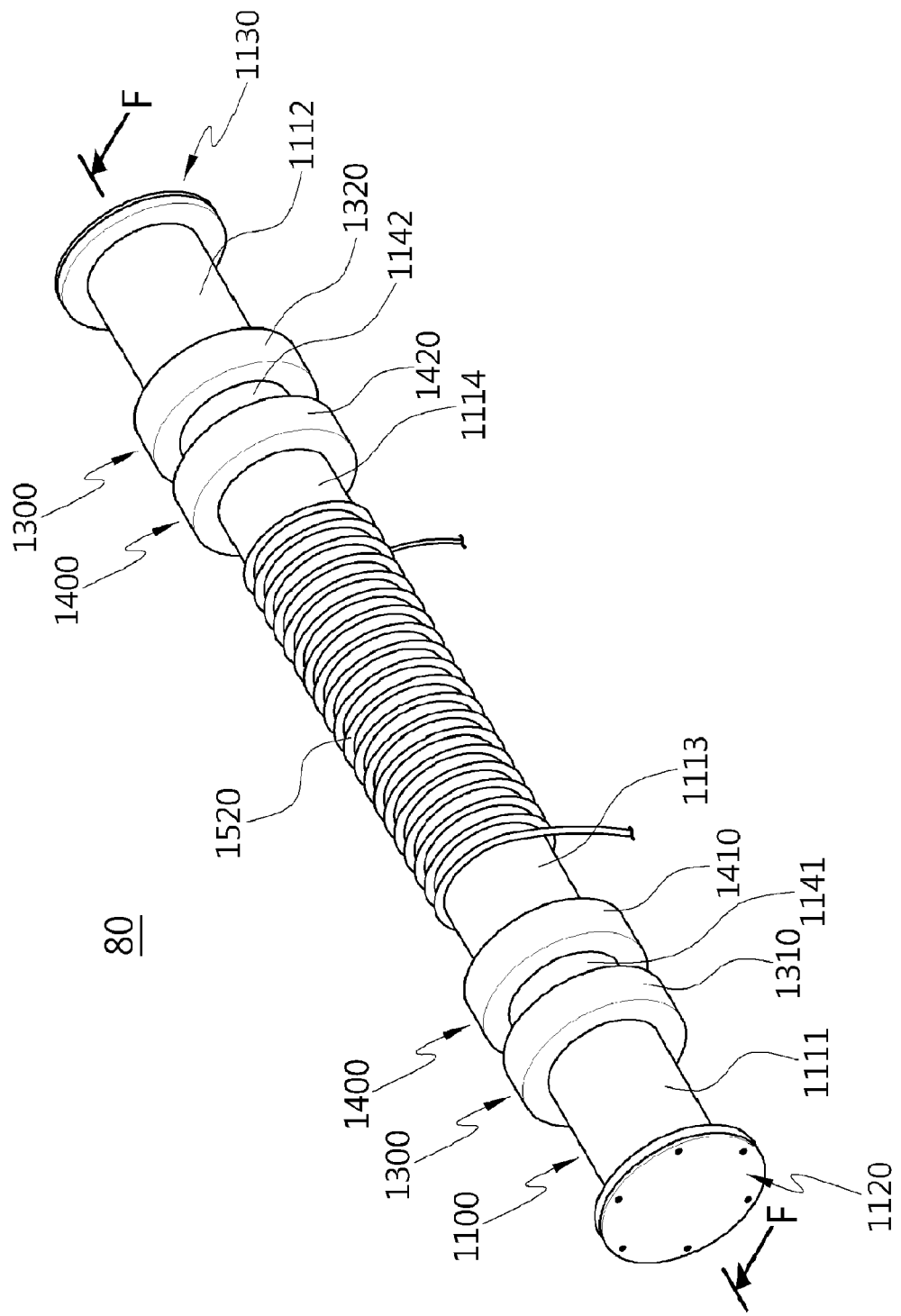
FIG. 62 is a perspective view schematically showing a heat engine according to still another exemplary embodiment of the present invention.
Figure 63:
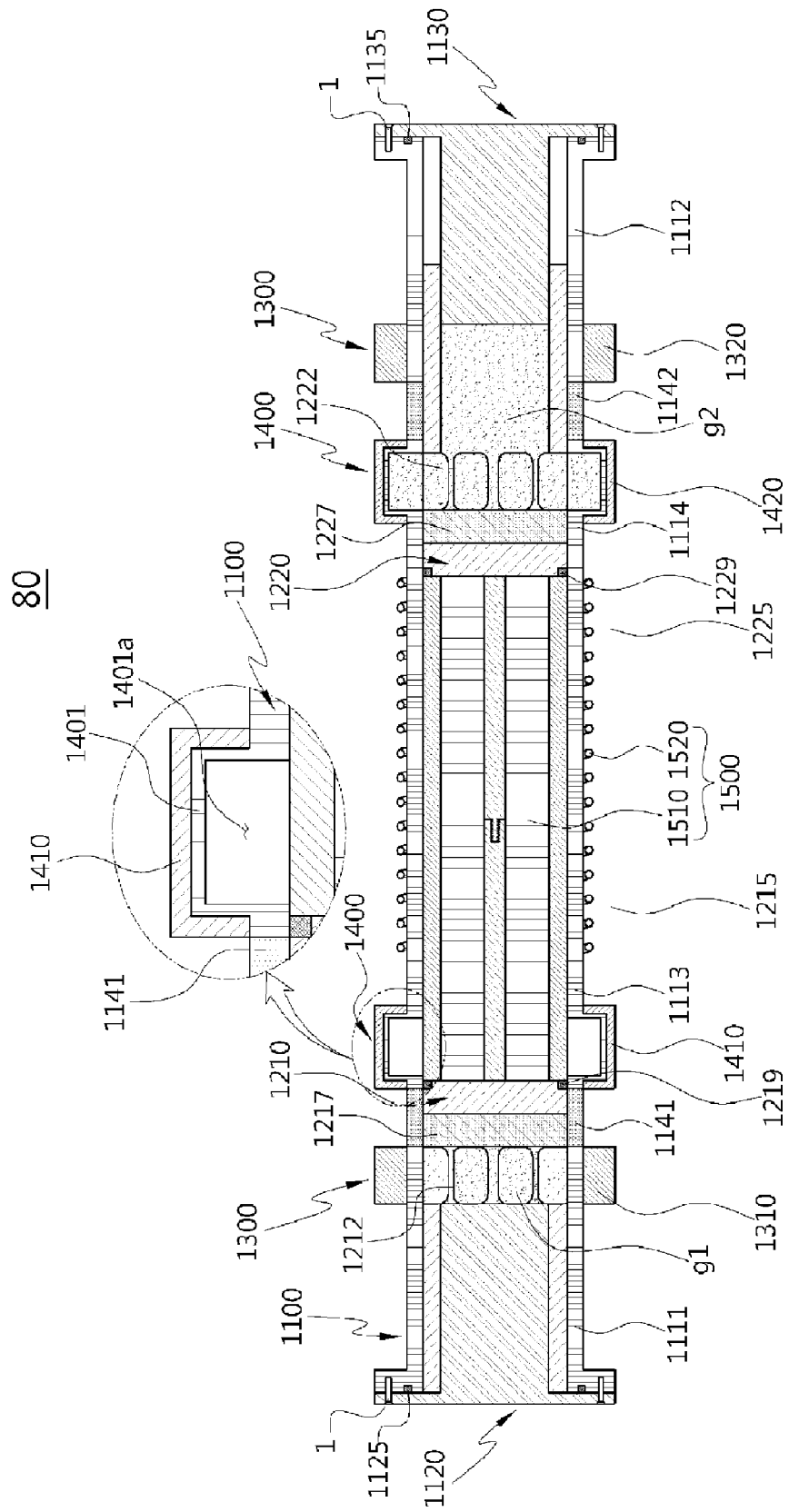
FIGS. 63 and 64 are views showing first and second exemplary embodiments of a cooling chamber included in the heat engine according to still another exemplary embodiment, which are cross-section views taken along line F-F of FIG. 1.
Figure 64:
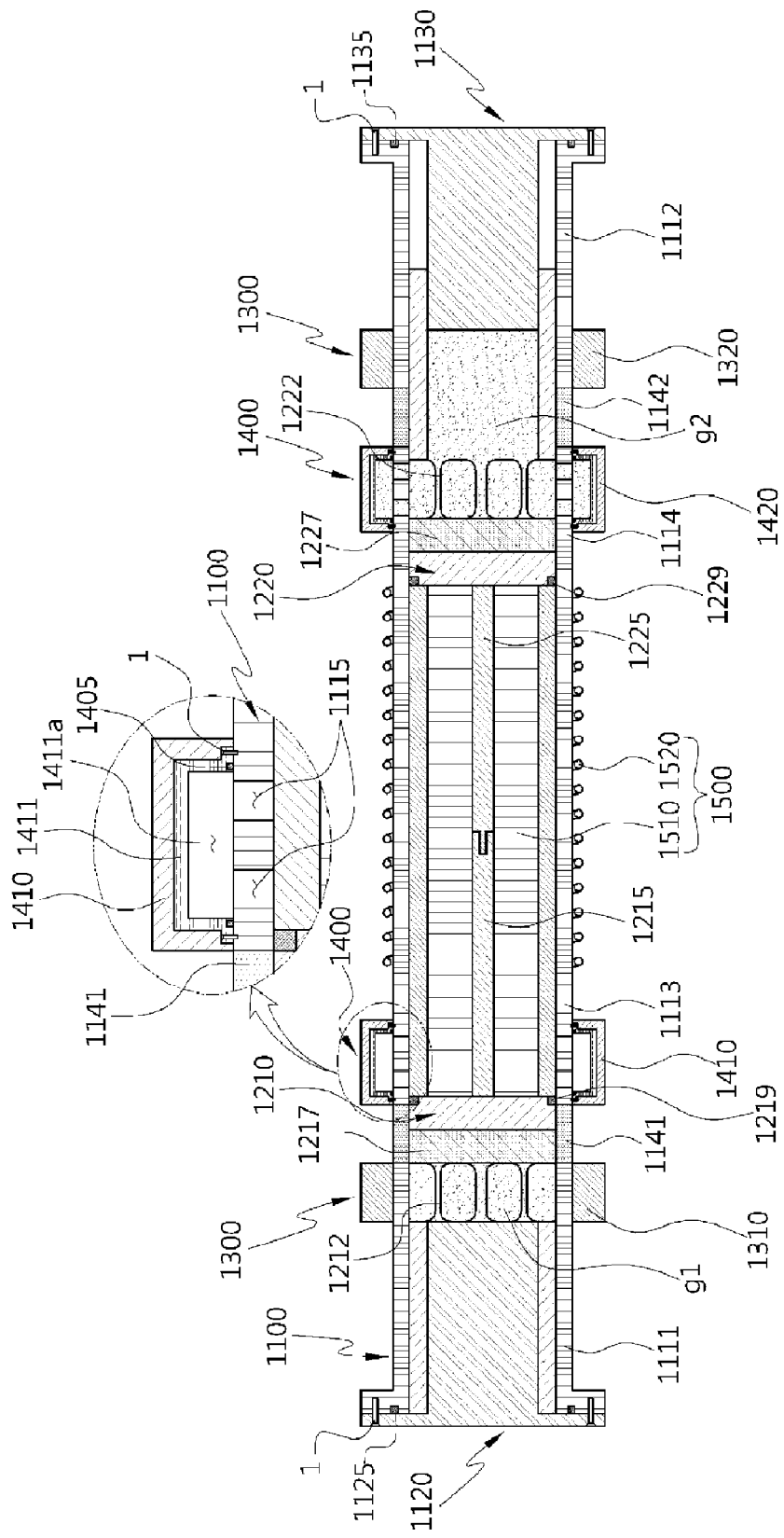
Figure 65:
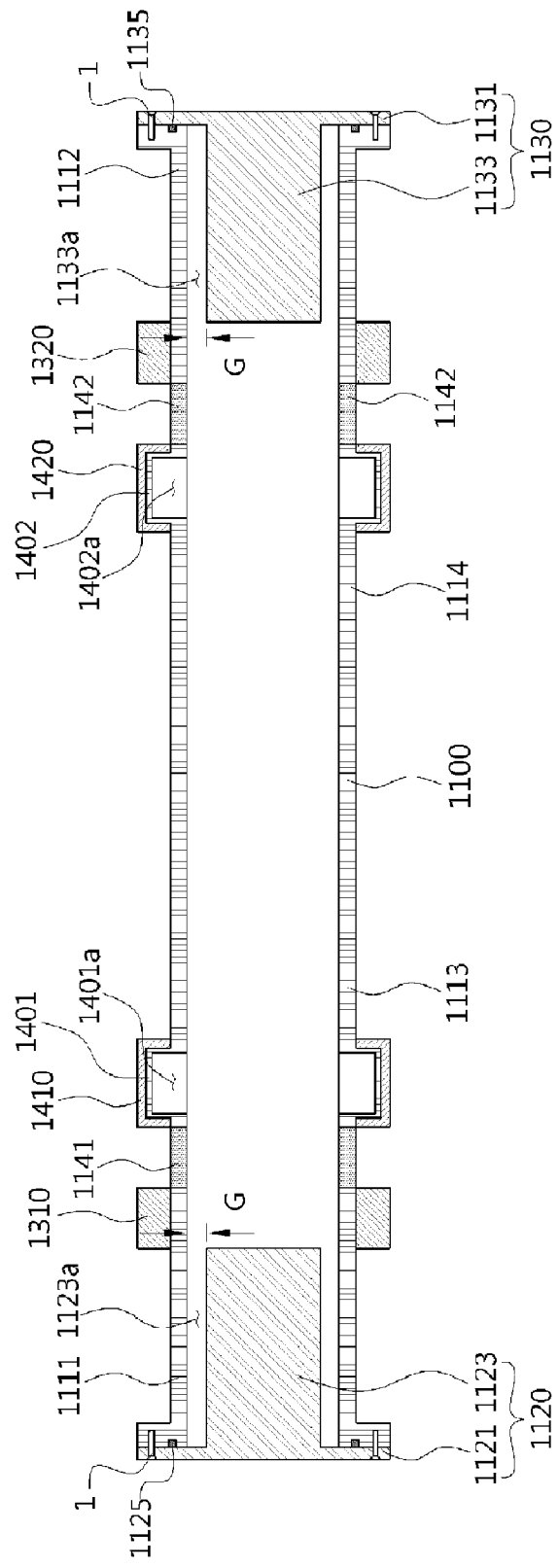
FIG. 65 is a cross-section view of a cylinder in the heat engine according to still another exemplary embodiment of the present invention.

FIG. 62 is a perspective view schematically showing a heat engine according to still another exemplary embodiment of the present invention, FIGS. 63 and 64 are views showing first and second exemplary embodiments of a cooling chamber included in the heat engine according to still another exemplary embodiment, which are cross-section views taken along line F-F of FIG. 1, and FIG. 65 is a cross-section view of a cylinder in the heat engine according to still another exemplary embodiment of the present invention.

As shown in FIGS. 62 to 65, a heat engine 80 according to this exemplary embodiment includes a cylinder 1100, a piston 1200, a high temperature heater 1300, a low temperature cooler 1400 including a cooling chamber 1401, 1411, and a generator 1500.

Hereinafter, the present exemplary embodiment will be described with reference to FIGS. 62 to 65. In this case, the same elements as those of the foregoing exemplary embodiments will not be repetitively described. If there is no description with respect to some elements, they will be regarded as the same elements as those of the foregoing exemplary embodiments. The following descriptions will be accomplished focusing on distinctive elements.

According to this exemplary embodiment, the low temperature cooler 1400 forms a pair to cool the opposite rear end parts 1113, 1114 of the cylinder 1100 and contract the operating gas g1 and g2 thermally expanded by the high temperature heater 1300. The low temperature cooler 1400 may include a cooling chamber.

More specifically, the low temperature cooler 1400 may include a first low temperature cooler 1410 and a second low temperature cooler 1420. The cooling chamber includes a first cooling chamber 1401 having a first cooling space 1401a for cooling the first operating gas g1 inside the first low temperature cooler 1410, and a second cooling chamber 1402 having a second cooling space 1402a for cooling the second operating gas g2 inside the second low temperature cooler 1420. The first and second cooling spaces 1401a and 1402a are formed to communicate with the inside of the cylinder 1100. Here, the first and second cooling space 1401a, 1402a may have the same length as the first and second heat openings 1212, 1222.

For example, the first cooling chamber 1401 may be formed integrally with the cylinder 1100 by extending a part of the outer circumference of the rear end part 1113 of the cylinder 1100 in a radius direction (refer to FIG. 63). In this case, the second cooling chamber 1402 may be formed like the first cooling chamber 1401.

Alternatively, the first cooling chamber 1411 may be installed in the form of a ring having a cooling space on the outer circumference of the rear end part 1113 of the cylinder 1100. In this case, the first cooling chamber 1411 may be coupled to the cylinder 1100 by a fastening means such as a bolt 1, a rivet, welding, etc. Also, in this case, at least one sealing member 1405 may be provided in a contact part between the cylinder 1100 and the first cooling chamber 1411. Further, at least one chamber communicating hole 1115 may be formed in the rear end part 1113 of the cylinder 1100 in order to communicate with the cooling space 1411a (refer to FIG. 20). Such a configuration of the first cooling chamber 1411 may be applied to the second cooling chamber 1402.

Various exemplary embodiments of the first and second low temperature coolers 1410 and 1420 are the same as those of the low temperature cooler 400 described with reference to FIGS. 11 to 14, and thus repetitive descriptions thereof will be avoided.

Below, the operations of the heat engine according to this exemplary embodiment will be described with reference to FIGS. 66 to 69.

Figure 66:
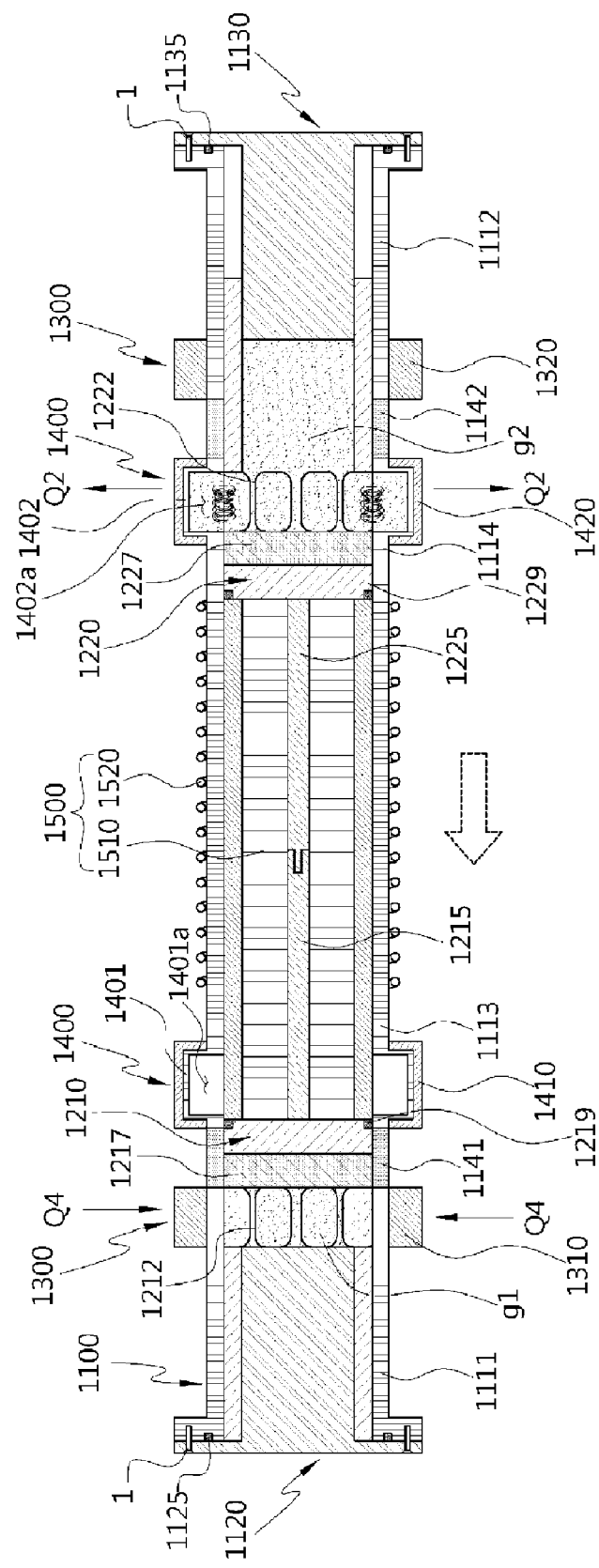
FIGS. 66 to 69 are views for sequentially explaining operations of the heat engine according to still another exemplary embodiment of the present invention.

First, as shown in FIG. 66, if an electric current is applied to the coil 1520 of the generator 1500 in an initial state, a line of magnetic force of the magnet 1510 is varied to generate a driving force based on the Fleming's left-hand rule, so that the position of the piston can be adjusted. When the piston 1200 moves leftward and the front end part 1211 of the first piston 1210 is inserted in the guide groove 1123a formed between the inner wall of the cylinder 1100 and the cylinder head unit 1120, that is, if the piston 1200 moves until the operating gas hermetically filled in the space between the cylinder 1100 and the first piston 1210 has the minimum volume, the first heat opening 1212 of the first piston 1210 is positioned on the first high temperature heater 1310 of the cylinder 1100. In this case, the first operating gas g1 directly contacts the first high temperature heater 1310 through the first heat opening 1212 and is thermally compressed at high temperature while absorbing thermal energy Q4 from the first high temperature heater 1310 (refer to high-temperature heat compressing process ④→① of FIG. 19). Also, the second piston 1220 symmetrical to the first piston 1210 moves leftward until the second operating gas g2 has the maximum volume, and the second heat opening 1222 of the second piston 1220 is positioned on the second low temperature cooler 1420, so that the second operating gas g2 inside the cylinder 1100 can directly contact the second cooling chamber 1402 of the second low temperature cooler 1420 through the second heat opening 1222. In this case, the second operating gas g2 having high temperature inside the cylinder 1100 meets the operating gas cooled to have low temperature by the second cooling chamber 1402 placed inside the second low temperature cooler 1420, and difference in temperature and pressure causes a turbulent flow, so that the second operating gas g2 can be cooled and expanded to thereby rapidly decrease in pressure. Therefore, the rectilinear reciprocating motion of the piston can be more actively achieved. Further, the temperature of the second operating gas g2 is still higher than that of the second low temperature cooler 1420, so that some of inner thermal energy Q2 is discharged to the outside (refer to low-temperature cool expanding process ②'→③ of FIG. 19). This process is not the same as but approximately equal to the thermodynamic cycles of the Carnot and Stirling engines.

Figure 67:
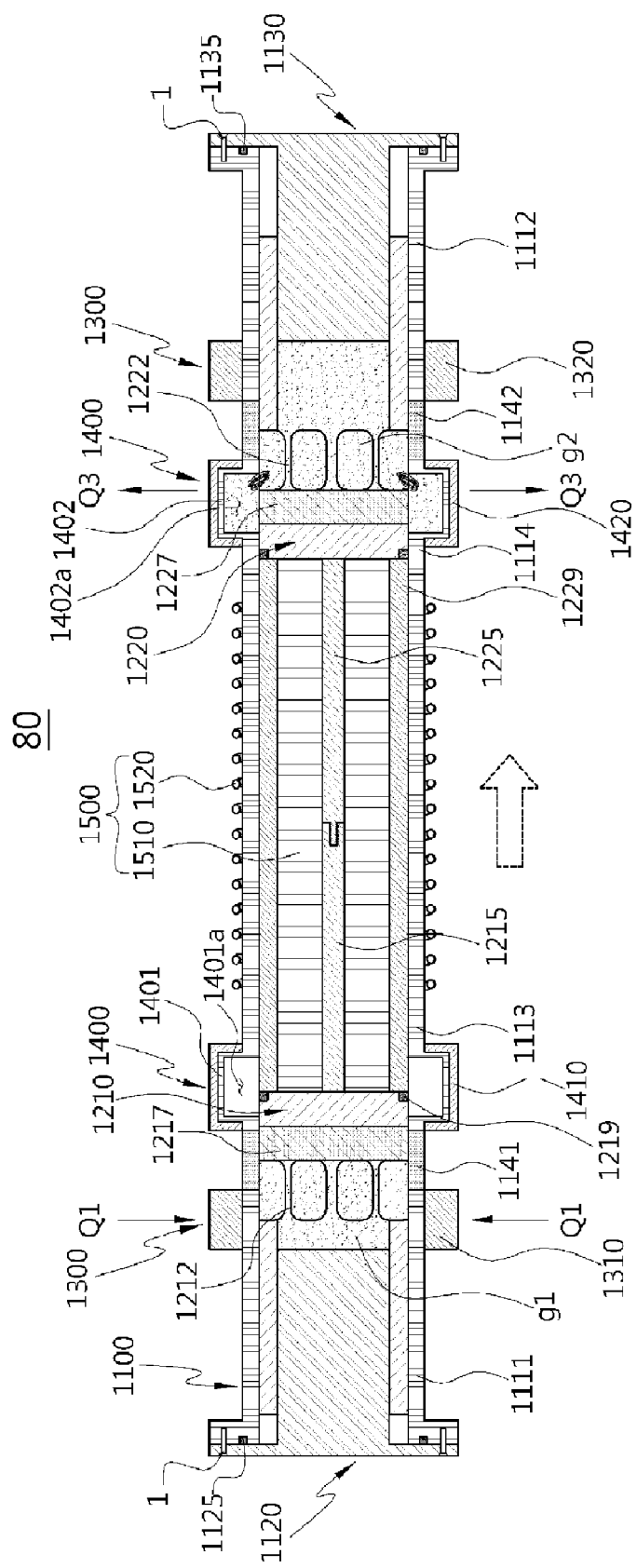

Next, as shown in FIG. 67, while thermal energy Q1 from the first high temperature heater 1310 is continuously absorbed in the first operating gas g1 inside the cylinder 1100, molecules of the first operating gas g1 increases in molecular motion and their speed increases. The number of times the molecules of the first operating gas g1 collide the inner wall of the cylinder 1100 increases in accordance with the molecular motion. Thus, if the volume is fixed, even pressure increases within the volume. This pressure pushes rightward the first piston 1210 installed inside the cylinder 1100 and causes the first operating gas g1 to thermally expand at high temperature (refer to high-temperature heat expanding process ①→② of FIG. 19). Also, the second operating gas g2 expanded until having the maximum volume is insulated from the second high temperature heater 1320 and contacts only the second cooling chamber 1402 of the second low temperature cooler 1420, and the difference in temperature and pressure continuously causes a turbulent flow, so that the second operating gas g2 can be cooled and contracted to thereby move the second piston 1220 rightward. At this time, the inner thermal energy Q3 of the second operating gas g2 is discharged to the outside (refer to low-temperature cool contracting and expanding process ③→④' of FIG. 19). This process is the same as the thermodynamic cycle of the Carnot and Stirling engines.

Figure 68:
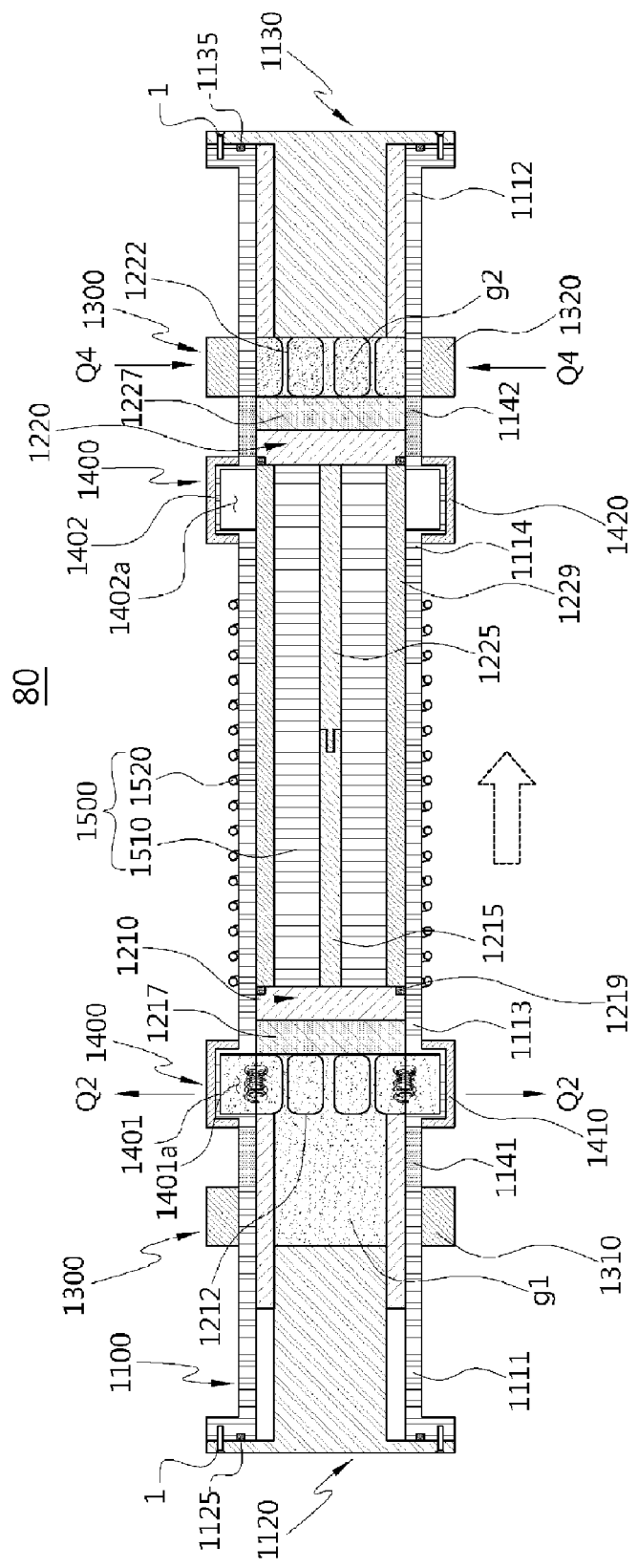

Next, as shown in FIG. 68, the first piston 1210 moves rightward and the first heat opening 1212 of the first piston 1210 is positioned on the first low temperature cooler 1410 when the first operating gas g1 has the maximum volume. The first operating gas g1 directly contacts the first cooling chamber 1401 of the first low temperature cooler 1410 through the first heat opening 1212. At this time, the first operating gas g1 having high temperature inside the cylinder 1100 meets the operating gas cooled to have low temperature in the first cooling chamber 1401 by the first low temperature cooler 1410, and difference in temperature and pressure causes a turbulent flow, so that the first operating gas g1 can be cooled and expanded to thereby rapidly decrease in pressure. Also, the temperature of the first operating gas g1 is still higher than that of the first low temperature cooler 1410, so that some of inner thermal energy Q2 is discharged to the outside (refer to low-temperature cool expanding process ②'→③ of FIG. 19). When the second piston 1220 moves rightward and the front end part 1221 of the second piston 1220 is inserted in the guide groove 1133a formed between the other end inner wall of the cylinder 1100 and the cylinder head unit 1130, that is, if the piston 1200 moves until the second operating gas g2 hermetically filled in the space between the cylinder 1100 and the second piston 1220 has the minimum volume, the second heat opening 1222 of the first piston 1220 is positioned on the second high temperature heater 1320 of the cylinder 1100. At this time, the second operating gas g2 directly contacts the second high temperature heater 1320 through the second heat opening 1222 and is thermally compressed at high temperature while absorbing thermal energy Q4 from the second high temperature heater 1320 (refer to high-temperature heat compressing process ④→① of FIG. 19). This process is not the same as but approximately equal to the thermodynamic cycle of the Carnot and Stirling engines.

Figure 69:
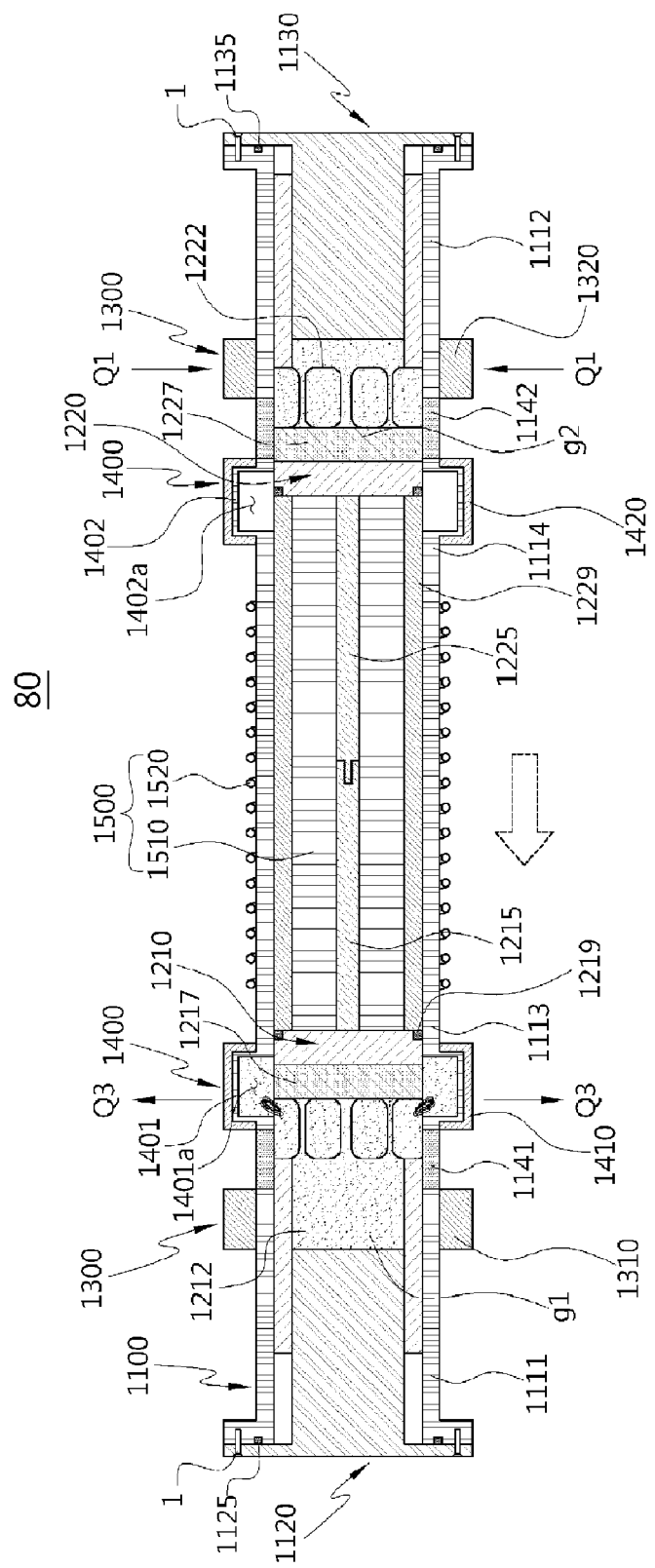

Next, as shown in FIG. 69, the first operating gas g1 expanded until having the maximum volume is insulated from the first high temperature heater 1310 and contacts only the first cooling chamber 1402 of the first low temperature cooler 1410. Therefore, difference in temperature and pressure causes a turbulent flow, so that the first operating gas g1 can be cooled and expanded to thereby move the first piston 1210 leftward. At this time, the inner thermal energy Q3 of the first operating gas g1 is discharged to the outside (refer to low-temperature cool contracting and expanding process ③→④' of FIG. 19). Also, while thermal energy Q1 from the second high temperature heater 1320 is continuously absorbed in the second operating gas g2 inside the cylinder 1100, molecules of the second operating gas g2 increases in molecular motion and their speed increases. The number of times the molecules of the second operating gas g2 collide the inner wall of the cylinder 1100 increases in accordance with the molecular motion. Thus, if the volume is fixed, even pressure increases within the volume. This pressure pushes leftward the second piston 1220 installed inside the cylinder 1100 and causes the second operating gas g2 to thermally expand at high temperature (refer to high-temperature heat expanding process ①→② of FIG. 19). This process is the same as the thermodynamic cycle of the Carnot and Stirling engines.

If each length of the first and second cylinder insulating units 1141 and 1142 between the first and second high temperature heaters 1310 and 1320 and the first and second low temperature coolers 1410 and 1420 is longer than each length of the first and second heat openings 1212 and 1222 of the piston 1200, an instant adiabatic process exists (refer to processes ②→②', ④'→④ of FIG. 19), thereby completing the whole thermodynamic cycle of ①→②→②'→③→④'→④→① as shown in FIG. 19. If each length of the first and second cylinder insulating units 1141 and 1142 is equal to each length of the first and second heat openings 1212 and 1222 of the piston 1200, an ideal thermodynamic cycle having no adiabatic process (②=②', ④'=④) follows as shown in FIG. 20. If each length of the first and second cylinder insulating units 1141 and 1142 is shorter than each length of the first and second heat openings 1212 and 1222 of the piston 1200, the first and second heat openings 1212 and 1222 contacts both the first and second high temperature heaters 1310 and 1320 and the first and second low temperature coolers 1410 and 1420, so that the operating gas is both heated and cooled and thus has an effect similar to an adiabatic effect. At this time, a thermodynamic cycle (not shown) is similar to a cycle of ①→②→②'→③→④'→④→① of FIG. 19.

In the foregoing heat engine 80 according to an exemplary embodiment of the present invention, the space formed by the cylinder 1100 and the piston 1200 is hermetically filled with the operating gas such as hydrogen, helium, etc., and heated and cooled at the exterior, so that the operating gas can be thermally expanded or contracted while repeating the processes as shown in FIGS. 66 to 69, thereby rectilinearly reciprocating the piston 1200.

Although some embodiments have been provided to illustrate the present invention, it will be apparent to those skilled in the art that the embodiments are given by way of illustration, and that various modifications and equivalent embodiments can be made without departing from the spirit and scope of the present invention. Accordingly, the scope of the present invention should be limited only by the accompanying claims and equivalents thereof.

What is claimed is:

1. A heat engine comprising
a cylinder in which operating gas is filled;
a high temperature heater which heats a front end part of the cylinder and thermally expands the operating gas;
a low temperature cooler which cools a rear end part of the cylinder and contracts the operating gas; and
a piston which is accommodated inside the cylinder to rectilinearly reciprocate as the operating gas is thermally expanded and contracted, and comprises a heat opening to be positioned at the high temperature heater or the low temperature cooler,
wherein the operating gas directly contacts the high temperature heater or the low temperature cooler through the heat opening.

2. The heat engine according to claim 1, further comprising a generator to transform mechanical energy based on a rectilinear reciprocating motion of the piston into electric energy.

3. The heat engine according to claim 2, wherein the generator comprises a magnet installed on an outer circumference of the piston along a lengthwise direction; and a coil wound on an outer circumference of the cylinder along a lengthwise direction, and generating an induced electromotive force as the magnet rectilinearly reciprocates.

4. The heat engine according to claim 1, further comprising a converter to change a rectilinear reciprocating motion of the piston into a rotary motion, and provide the rotary motive force to an outside.

5. The heat engine according to claim 1, wherein the cylinder comprises a cylinder insulating unit placed between the high temperature heater and the low temperature cooler.

6. The heat engine according to claim 1, wherein the cylinder comprises the front end part opened outward, and the heat engine further comprises a cylinder head unit coupled to and hermetically closing up the front end part of the cylinder.

7. The heat engine according to claim 6, wherein the piston comprises a hollow in a front end part thereof, and the cylinder head unit comprises a head cover coupled to the front end part of the cylinder; and a head protrusion protruding from the head cover and formed with a guide groove spaced apart at a predetermined distance from an inner surface of the cylinder and receiving the front end part of the piston therein.

8. The heat engine according to claim 1, wherein the high temperature heater comprises a combustion chamber arranged in the form of a ring on the outer circumference of the front end part of the cylinder; and a fuel supplying unit supplying fuel to the combustion chamber.

9. The heat engine according to claim 1, wherein the high temperature heater comprises a housing arranged in the form of a ring on the outer circumference of the front end part of the cylinder; a hot-wire member wound on the outer circumference of the front end part of the cylinder and placed inside the housing; and a power unit supplying electricity to the hot-wire member.

10. The heat engine according to claim 1, wherein the high temperature heater comprises a sunlight concentrating module for concentrating the light of the sun; and a light transmission window formed in the front end part of the cylinder so that the operating gas can be directly exposed to the light of the sun concentrated by the sunlight concentrating module.

11. The heat engine according to claim 1, wherein the low temperature cooler comprises a cooling fin formed on the outer circumference of the rear end part of the cylinder; and a cooling fan for blowing air to and cooling the cooling fin.

12. The heat engine according to claim 1, wherein the low temperature cooler comprises a cooling tube wound on the outer circumference of the rear end part of the cylinder; and a cooling pump supplying cooling water to the cooling tube.

13. The heat engine according to claim 1, wherein the heat opening is formed in plural along the outer circumference in front of the rear end part of the piston.

14. The heat engine according to claim 1, wherein the front end part of the piston comprises an insulating material.

15. The heat engine according to claim 1, further comprising a restoration unit to provide a restoration force to the piston so that a rectilinear reciprocating motion of the piston can be continuously maintained.

16. The heat engine according to claim 1, wherein the low temperature cooler comprises a cooling chamber placed in the rear end part of the cylinder and formed with a cooling space communicating with an inside of the cylinder to cool the operating gas.

17. The heat engine according to claim 16, wherein the cooling space is formed to have the same length as the heat opening.

18. The heat engine according to claim 16, wherein the cooling chamber is formed integrally with the cylinder by extending a part of the outer circumference of the rear end part of the cylinder in a radius direction.

19. The heat engine according to claim 16, wherein
the cooling chamber is installed in the form of a ring on the outer circumference of the rear end part of the cylinder, and
at least one chamber communicating hole is formed in the rear end part of the cylinder and communicates the cooling space inside the cooling chamber with the inside of the cylinder.

20. The heat engine according to claim 19, wherein
the low temperature cooler further comprises at least one sealing member installed in a contact part between the cylinder and the cooling chamber.

21. The heat engine according to claim 16, wherein the low temperature cooler comprises
   a housing formed to surround an outside of the cooling chamber and formed with a plurality of cooling fins; and
   a cooling fan blowing air to and cooling the housing.

22. The heat engine according to claim 16, wherein the low temperature cooler comprises
   a tube housing formed to surround an outside of the cooling chamber;
   a cooling tube placed inside the tub housing and wound on an outer wall of the cooling chamber; and
   a cooling pump supplying cooling water to the cooling tube.

23. The heat engine according to claim 16, further comprising a restoration unit to provide a restoration force to the piston so that a rectilinear reciprocating motion of the piston can be continuously maintained.

* * * * *